United States Patent
Saucier et al.

(10) Patent No.: US 10,945,896 B1
(45) Date of Patent: Mar. 16, 2021

(54) PLATFORM LIFT WITH ENHANCED OCCUPANT SENSING, PLATFORM LIGHTING AND LOCKING

(71) Applicant: MPOWER MOBILITY, INC, Tarzana, CA (US)

(72) Inventors: Stanton David Saucier, Tarzana, CA (US); Mark Gregory Montgomery, Camarillo, CA (US)

(73) Assignee: MPOWER MOBILITY, INC, Tarzana, CA (US)

( * ) Notice: Subject to any disclaimer, the term of this patent is extended or adjusted under 35 U.S.C. 154(b) by 0 days.

(21) Appl. No.: 16/858,616

(22) Filed: Apr. 25, 2020

Related U.S. Application Data

(60) Provisional application No. 62/838,567, filed on Apr. 25, 2019.

(51) Int. Cl.
*A61G 3/06* (2006.01)
*F16H 25/14* (2006.01)
*F16H 21/16* (2006.01)

(52) U.S. Cl.
CPC ............. *A61G 3/062* (2013.01); *F16H 21/16* (2013.01); *F16H 25/14* (2013.01)

(58) Field of Classification Search
None
See application file for complete search history.

(56) References Cited

U.S. PATENT DOCUMENTS

| | | |
|---|---|---|
| 4,534,450 A | 8/1985 | Savaria |
| 5,261,779 A | 11/1993 | Goodrich |
| 5,308,215 A | 5/1994 | Saucier |
| 5,445,488 A | 8/1995 | Saucier et al. |
| 5,944,473 A | 8/1999 | Saucier et al. |
| 6,043,741 A | 3/2000 | Whitmarsh |
| 6,086,314 A | 7/2000 | Savaria |
| 6,203,266 B1 | 3/2001 | Savaria et al. |
| 6,379,102 B1 | 4/2002 | Kameda |
| 6,599,079 B1 | 7/2003 | Hermanson et al. |

(Continued)

OTHER PUBLICATIONS

Operating Instructions, Ricon Mirage F9B Series Personal Use Wheelchair Lift.

(Continued)

*Primary Examiner* — Gerald McClain
(74) *Attorney, Agent, or Firm* — AP Patents

(57) ABSTRACT

A lift for a vehicle includes a platform configured to support an occupant thereon, a parallelogram mechanism to move the platform between a stowed position and a deployed position, a base to mount the parallelogram mechanism to a vehicle floor, a hydraulic system to move the platform through the parallelogram mechanism, a mechanism to fold and unfold the platform, an occupant retention device, a control unit to control a movement of the platform. The occupant retention device can include any one of a belt, a bridgeplate and a roll stop. The lift can also include a platform movement control device that can be provided as an acoustic sensor array, a bridgeplate lock and a platform stow lock. A light assembly can be mounted on the platform as a visual warning of the platform operation. The power connection to the control unit can include an encapsulated decouplable power interface.

20 Claims, 28 Drawing Sheets

(56) References Cited

U.S. PATENT DOCUMENTS

| | | | | |
|---|---|---|---|---|
| 7,509,187 | B2* | 3/2009 | Hayes | A61G 3/06 187/200 |
| 8,816,225 | B2 | 8/2014 | Deleo et al. | |
| 9,149,397 | B2* | 10/2015 | Gallingani | A61G 3/06 |
| 10,195,977 | B2 | 2/2019 | Bettcher, III et al. | |
| 2005/0238471 | A1* | 10/2005 | Ablabutyan | A61G 3/06 414/546 |
| 2007/0224025 | A1* | 9/2007 | Ablabutyan | A61G 3/062 414/546 |

OTHER PUBLICATIONS

Ricon a Wabtec Company, S-Series and K-Series Dot-Public Use Lift, Operator Manual, Jan. 24, 2008.

Ricon a Wabtec Company, S-Series and K-Series Export Use Wheelchair and Standee Lift With Folding Platform, Operator Manual, Apr. 12, 2010.

Ricon a Wabtec Company, S-Series and K-Series Export Use Wheelchair and Standee Lift, Service Manual, Sep. 30, 2010.

Ricon a Wabtec Company, Titanium Line S-Series and K-Series Dot-Public Use Lifts, Operator Manual, May 15, 2012.

\* cited by examiner

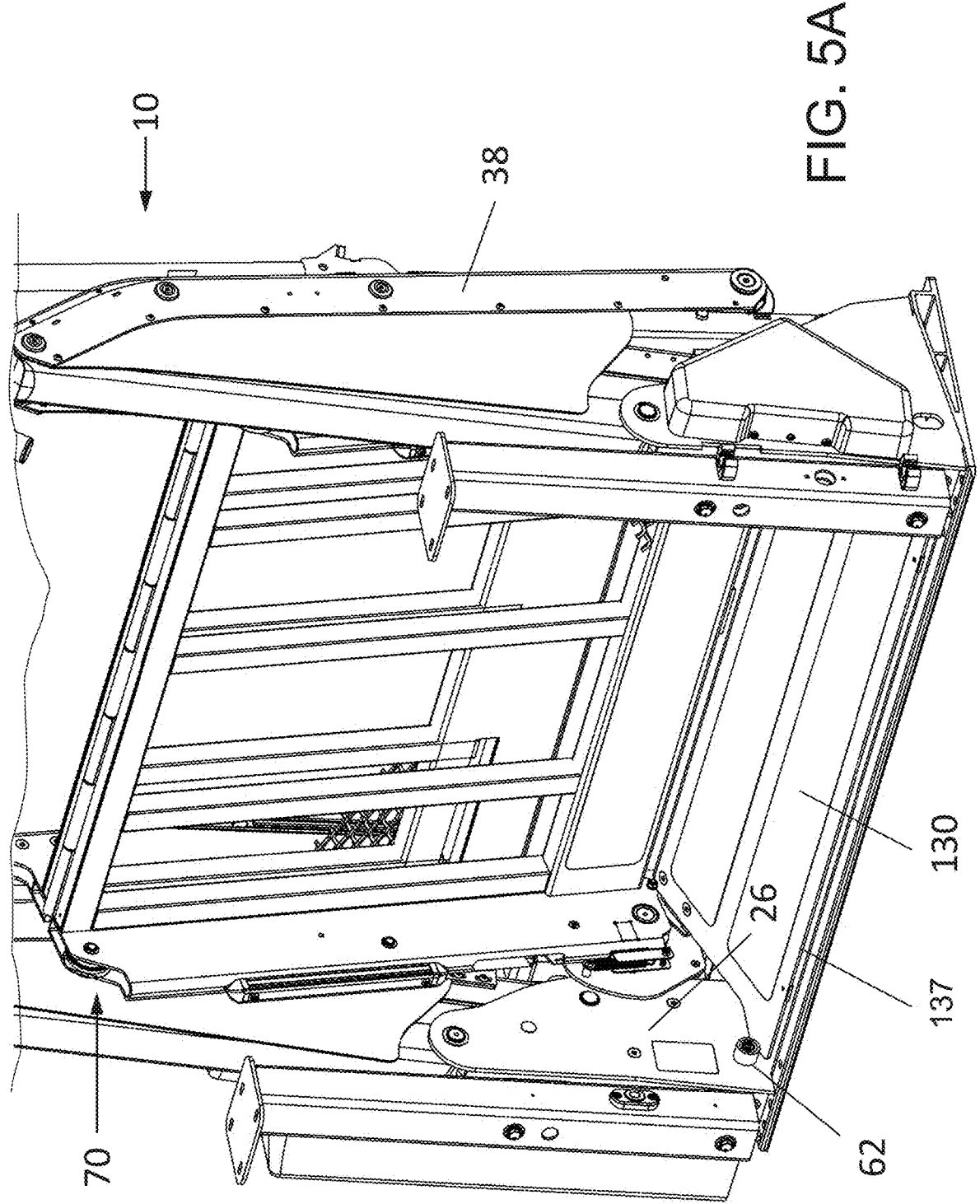

PLATFORM LIFT WITH ENHANCED OCCUPANT SENSING, PLATFORM LIGHTING AND LOCKING

CROSS-REFERENCE TO RELATED APPLICATIONS

This present nonprovisional application is related to and claims benefit of and priority from U.S. Provisional Patent Application Ser. No. 62/838,567 filed on Apr. 25, 2019, the entire contents of which are hereby incorporated by reference thereto.

TECHNICAL FIELD

The subject matter relates to platform lifts. It further relates to wheelchair lifts that are configured to lift a wheelchair from a ground level position to a floor level position in a vehicle and inversely.

BRIEF DESCRIPTION OF THE DRAWINGS

The accompanying drawings are incorporated in and constitute part of the specification and illustrate various embodiments. In the drawings:

FIG. 5A illustrates a partial perspective view of the lift, particularly showing lift platform and bridgeplate being disposed in the stowed position;

DETAILED DESCRIPTION OF EXEMPLARY EMBODIMENTS

Figure 1:
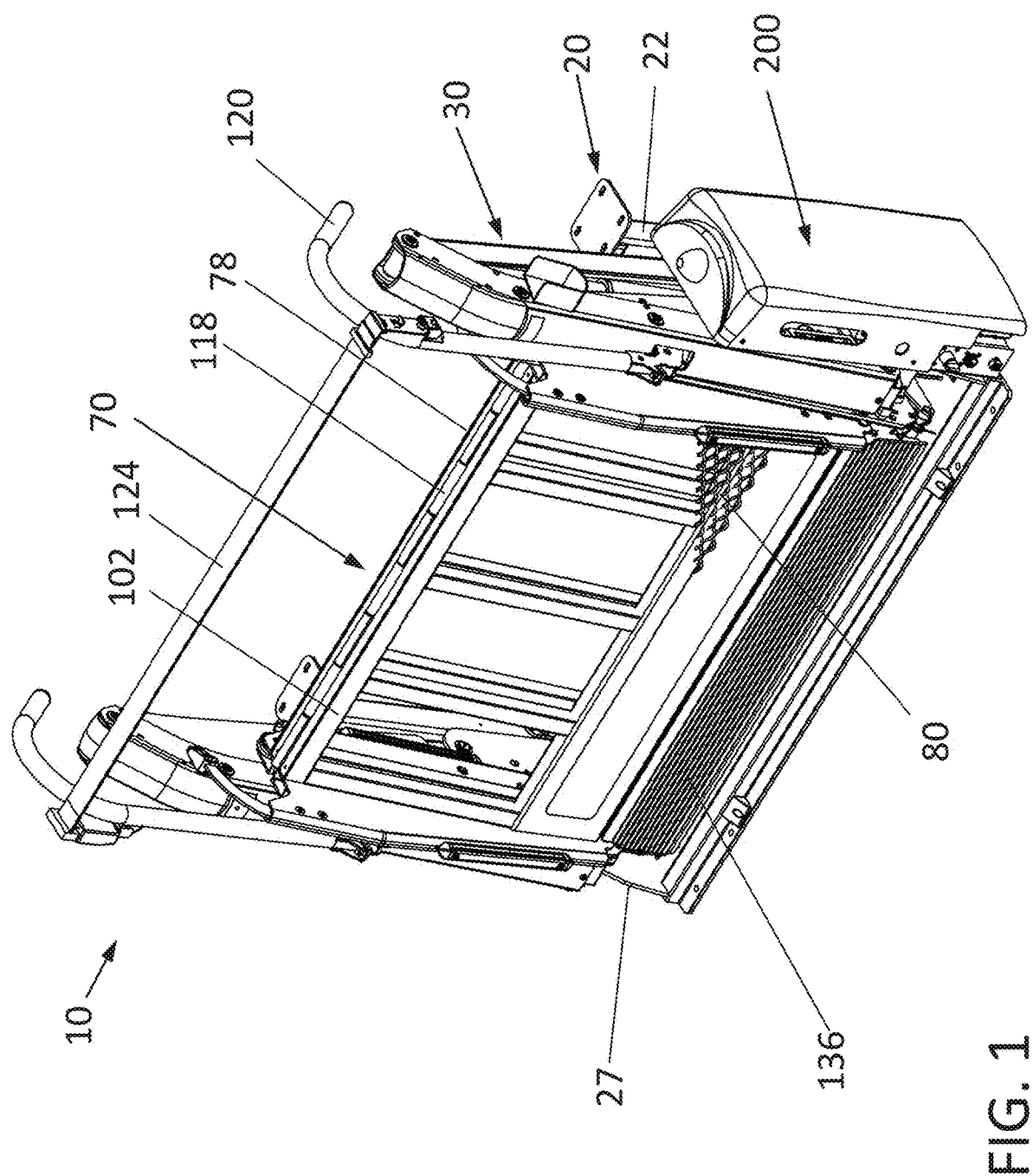
FIG. 1 illustrates a perspective view of a lift with the lift platform being in a stowed position.

Prior to proceeding to the more detailed description of the present disclosure, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As may be used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

The terms and words used in the following description and claims are not limited to the bibliographical meanings, but, are merely used to enable a clear and consistent understanding of the disclosure. Accordingly, it should be apparent to those skilled in the art that the following description of exemplary embodiments of the present disclosure are provided for illustration purpose only and not for the purpose of limiting the disclosure as defined by the appended claims and their equivalents.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Furthermore, there is no intention to be bound by any expressed or implied theory presented in the preceding technical field, background, or the following detailed description. It is also to be understood that the specific devices and processes illustrated in the coupled drawings, and described in the following specification, are simply examples of the inventive concepts defined in the appended claims. Hence, specific dimensions and other physical characteristics relating to the examples disclosed herein are not to be considered as limiting, unless the claims expressly state otherwise.

References in the specification to "one embodiment", "an embodiment", "an exemplary embodiment", "another embodiment", "a presently preferred embodiment", "an alternative embodiment", "one variation", "a variation" and similar phrases mean that a particular feature, structure, or characteristic described in connection with the embodiment or variation, is included in at least an embodiment or variation of the disclosure. The phrase "in an embodiment", "in one variation" or similar phrases, as may be used in various places in the specification, are not necessarily meant to refer to the same embodiment or the same variation.

For purposes of description herein, the directional and/or relationary terms such as "upper", "top", "lower", "bottom", "left", "right", "rear", "back", "front", "apex", "vertical", "horizontal", "lateral", "exterior", "interior" and derivatives thereof are relative to each other and are dependent on the specific orientation of an applicable element or article, and are used accordingly to aid in the description of the various embodiments and are not necessarily intended to be construed as limiting. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

The term "couple" or "coupled", when used in this specification and appended claims, refers to an indirect or direct physical connection between the identified elements, components, or objects. Often the manner of the coupling will be related specifically to the manner in which the two coupled elements interact.

The term "directly coupled" or "coupled directly," when used in this specification and appended claims, refers to a physical connection between identified elements, components, or objects, in which no other element, component, or object resides between those identified as being directly coupled.

The terms "removable", "removably coupled", "removably disposed," "readily removable", "readily detachable", "detachably coupled", "separable," "separably coupled," and similar terms, as used in this specification and appended claims, refer to structures that can be uncoupled, detached, uninstalled, or removed from an adjoining structure with relative ease (i.e., non-destructively, and without a complicated or time-consuming process), and that can also be readily reinstalled, recoupled, or coupled to the previously adjoining structure.

Moreover, the ordinary and customary meaning of term "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010). The term "substantially" is used in this document to accommodate minor variations that may be appropriate, for example due to a manufacturing process.

For example, the term "substantially horizontally" as used herein when referring to elements or features of the conveyor(s) should be understood to mean that such elements or features are positioned with respect to a vertical line extending there above at an angle of 90°, except for manufacturing tolerances. The angle can be in the range of from about 89° to about 91°, in the range of from about 88° to about 92°, in the range of from about 87° to about 93°, or in the range of from about 85° to about 95°. In other words, the term "substantially horizontally" should be also understood to mean that, if deviating from absolutely horizontal, the conveyor is operable to convey material completely or partially between ends of the conveyor.

The term "generally horizontal(ly)" or "generally vertical(ly)" should be also understood to mean respectively horizontally or vertically disposed element or surface but the term does not exclude the possibility of orienting such feature or surface at a small angle relative to respectively absolute horizontal or vertical plane.

As may be used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

Anywhere the term "comprising" is used, embodiments and components "consisting essentially of" and "consisting of" are expressly disclosed and described herein."

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes here, the words "comprising," "including," "having," and variants thereof, wherever they appear, shall be construed as open-ended terminology, with the same meaning as if the phrase "at least" were appended after each instance thereof.

It is to be understood that the singular forms "a," "an," and "the" include plural referents unless the context clearly dictates otherwise. Thus, for example, reference to "a component surface" includes reference to one or more of such surfaces.

The particular embodiments of the present disclosure generally provide platform lifts that are designed to carry occupants with limited mobility, including those who rely on wheelchairs, scooters, canes and other mobility aids, so that they can move into and out of motor vehicle.

The particular embodiments of the present disclosure generally provide device and method directed to platform lifts for vans, busses, trains and the like vehicles. Lift can be also referred to as wheelchair loading and unloading apparatus or a lift assembly. The wheelchair can be occupied by a person or can be without the person.

In particular embodiments, the lift incorporates a mobile platform for receiving a wheelchair or an occupant with limited mobility who does not use wheelchair, a parallelogram mechanism to carry the platform, a base to mount the parallelogram mechanism, a hydraulic system for actuating the platform through the parallelogram mechanism, and roll stop and a mechanism to pivot the roll stop between two terminal positions, a bridgeplate and a control unit to accomplish different motion patterns.

In an embodiment, the lift incorporates a threshold safety warning system, for example such as an acoustic sensor array, to detect the presence of occupants and to enable interlocks and warning systems for enhanced operational safety. A combination of an electronic control, platform position sensor and acoustic sensor array monitors the bridgeplate and threshold areas providing both a visual and/or audible alert to passengers approaching an open threshold area from inside the vehicle and an interlock to prevent the lift platform from descending from vehicle floor level when the areas are occupied.

In an embodiment, the lift comprises a decouplable power interface with enhanced protection against high power short circuits, resulting in enhanced safety.

In an embodiment, the lift comprises an LED light assembly affixed to the top of the platform side barriers. The modular construction of the light assembly facilitates the lighting of the platform surface and/or the provision flashing side lights to warn on-coming traffic that the lift is in operation.

In an embodiment, the lift incorporates a replaceable ground contact that protects the lower extremities of the vertical arms from the damage associated with repeated contact with the ground.

In an embodiment, a lift comprises a combination bridging and lockable inner barrier plate which is operated by a cable.

In an embodiment, the lift comprises a platform storage locking device integrated into the control enclosure such that it can be pre-assembled apart from the main structure of the unit and such that the same bill of material can be assembled to enable the lock to be used on either side of the lift. The control enclosure incorporates a controller and hydraulic components. The controller can be any one of a microprocessor based, a programmable logic controller, a relay logic and any combinations thereof. The controller can comprise on or more printed circuit boards (PCBs).

Now in a reference to FIGS. 1-5A, therein is illustrated a lift 10 that can be configured to meet Federal Motor Vehicle Safety Standard (FMVSS) 403. FMVSS 403 affects both privately owned automotive vehicles, such as family vans and minivans, as well as automotive vehicles designed for commercial uses, such as school and public buses. Further, FMVSS 403 is applicable specifically to the equipment that raises and lowers the wheelchair. The installation of 403 compliant equipment is controlled by FMVSS 404.

In particular embodiments, the lift 10 comprises a base 20, a parallelogram mechanism 30 mounted on the base 20, a lift platform 70 that is carried by the parallelogram mechanism 30, a control assembly 200 for actuating the lift platform 70 through the parallelogram mechanism 30, a platform folding and unfolding mechanism, including an elbow assembly 40, an occupant retention device that can incorporate any one of a belt 124, a bridgeplate 130, and a roll stop 136 pivotally coupled to the lift platform 70, a lift platform movement control device, and an electrical control circuit 159 to accomplish different motion patterns and annunciations.

The base 20 comprises a baseplate 21. The baseplate 21 is affixed, for example by fasteners, to a vehicle floor surface (not shown). The base 20 also comprises two towers. Each tower comprises a pair of supports 26 and 27. Each support 26 and 27 upstands, in a vertical direction, on the baseplate 21. Each support 26 and 27 is rigidly attached to the top surface 21A of the baseplate 21. The support 26 is illustrated as an inner support and the support 27 is illustrated as an outer support. The distance between inner supports 26 defines an operable width of the lift 10, that is sufficient to pass the wheelchair (not shown) therethrough. The baseplate 21 also defines a threshold area 28.

The base 20 can also comprise two optional uprights 22 upstanding, in a spaced apart relationship with each other, on a respective end of the baseplate 21. Each upright 22 can be terminated with a mounting plate 24. During use, the upright 22 with the mounting plate 24 can be used to fasten the lift 10 to a vehicle structure, for example such as a door post (not shown) so as to not rely solely onto the floor structure of the vehicle. When the uprights 22 are provided, each tower is generally disposed adjacent a respective upright 22.

The parallelogram mechanism 30 comprises at least a four-bar linkage mechanism with upper arms 32, lower arms 34, vertically disposed arms 38, and a cylinder 36. Each of the upper arms 32, lower arms 34, and vertically disposed arms 38 can be provided with a U-shaped cross-section in a plane normal to a length of each arm. One end of the upper arm 32 is pivotally coupled to each pair of supports 26 and 27 at a pivot 32A. In an example, the pivot 32A can comprise a shaft being rigidly secured to the supports 26 and 27 and at least an aperture in the arm 32. In an example, the pivot 32A can comprise a shaft being rigidly secured to the arm 32 and an aperture in each of the supports 26 and 27. In an example, the pivot 32A can comprise a tubular member disposed within U-shaped arm 32 or the shaft can be enlarged within the U-shaped arm 32. The pivot 32A can also comprise a bearing. The other end of the arm 32 is pivotally coupled to each arm 38 at a pivot 32B. The pivot 32B can be constructed identically to the pivot 32A. One end of the arm 34 is pivotally coupled, at one end thereof, to each pair of supports 26 and 27 at a pivot 34A. The pivot 34A can be constructed identically to the pivot 32A. The other end of the arm 34 is pivotally coupled to each vertically disposed arm 38 at a pivot 34B. The pivot 34B can be constructed identically to the pivot 32A. The cylinder 36 is pivotally mounted at a stationary end thereof to the arm 34 at a pivot 34A and is pivotally mounted at a movable end thereof to the pivot 32B. The cylinder 36 that can be pneumatically or hydraulically operated. The cylinder 36 is of a telescopic single-action type and converts pneumatic or hydraulic pressure into the platform lifting and folding force. The vertically disposed arms 38 are also pivotally connected, at their lower ends to the lift platform 70 at pivots 38A. The pivot 38A can be constructed identically to the pivot 32A.

The platform folding and unfolding mechanism is represented by the elbow assembly 40. The lift 10 comprises two elbow assemblies 40, one at a respective side of the lift platform 70. In a particular reference to FIG. 5, each elbow assembly 40 comprises a substantially vertical elbow link 42, a substantially horizontal elbow link 44, a spring 46 and a roller 48. One end of the vertical elbow link 42 is pivotally connected to one end of the horizontal elbow link 44 at a pivot 42A. A longitudinally opposite end of the vertical elbow link 42 is pivotally connected to a rear end of the platform 70 at a pivot 42B. The other end of the horizontal elbow link 44 is pivotally connected to the vertical arm 38 at a pivot 44A. The spring 46 is connected to each of the vertical elbow link 42 and the horizontal elbow link 44. The roller 48 is mounted for a rotational movement about the pivot 42A. During operation, the peripheral edge surface of the roller 48 contacts the lower parallel arm 34, as is best shown in FIG. 5, when the lift platform 70 moves between the stowed position and floor level position. The roller 48 improves motion by reducing friction, although the roller 48 can be replaced by a stationary member with a smooth service (not shown). During operation, the motions of the lift platform 70 are well controlled and especially prevent the lift platform 70 from free falling or free deploying movement during the lift's swing-up and swing-down motions. When the lift platform 70 is away from its floor level position to the ground level position of FIGS. 2 and 4, the roller 48 is disengaged with the underneath sides of the lower arm 34. As the lift platform 70 is lifted up from its floor level position towards its stowed position, the roller 48 comes into a contact with the lower arm 34 which pushes down the vertical elbow link 42, and the inner lift platform section 74 is raised through the pivot connection. This action facilitates folding of the lift platform 70. Additional features of the platform folding and unfolding mechanism are disclosed in U.S. Pat. No. 9,149,397 B2 issued to Gallingani et al. which is incorporated in it's entirety herewithin. The detail description of such additional features of the platform folding and unfolding mechanism are omitted herewithin for the sake of brevity. Accordingly, the lift platform 70 is to be understood as including such platform folding and unfolding mechanism.

The lift platform 70 is configured to receive the occupant. The occupant can be seated in a wheelchair or a mobility scooter (not shown) or standing. The standing occupant may or may not use a mobility aid, for example such as a cane (not shown). In a further reference to FIGS. 2 and 4, the lift platform 70 is illustrated as being comprised by a first lift platform section 74 and a second lift platform section 100. The first lift platform section 74 is being illustrated as an inner lift platform section and the second lift platform section 100 is being illustrated as an outer lift platform section. The first lift platform section 74 has one end 76 thereof being configured to pivotally mount to each vertically disposed arm 38 at the pivot 38A and, subsequently to the base 20, for a rotation between a vertical position and a horizontal position. The end 76 defines a rear of the first lift platform section 74 and the rear of the lift platform 70. The first lift platform section 74 also has an opposite end 78. The first lift platform section 74 also has a first surface 80 that becomes a top surface when the lift platform 70 is unfolded in a deployed position and a second surface 82 that is spaced apart from the first surface 80 to define a thickness of the first lift platform section 74. The first surface 80 is being illustrated as a top surface of the platform 70. This top surface receives thereon an occupant, either with or without a wheelchair (not shown). The first lift platform section 74 can be configured as a hollow frame member comprising the above described ends 76 and 78 and a pair of sides 84 and 86. The sides 84 and 86 are illustrated as extending outwardly from the top surface 80 to provide side safety rails during use of the lift 10. However, it is also contemplated that the sides 84 and 86 can be generally flush with the top surface 80. One or more optional reinforcing members 88 can be rigidly secured to either ends 76 and 78, as is illustrated, or alternatively to the sides 84 and 86 to increase rigidity and/or stiffness of the first lift platform section 74 and essentially prevent it from sagging or twisting during use. The quantity and configuration of the reinforcing members 88 will generally depend on any one of a width of the lift platform 70, a length of the lift platform 70 in the deployed position, occupant weight with and without wheelchair. The first surface 80 can be provided as an illustrated meshed member secured to the ends 76, 78 and/or sides 84, 86. Alternatively, the first surface 80 can be provided as a solid member. The opposite surface 82 can be open. Furthermore, as illustrated in various figures, the sides 84, 86 can extend outwardly from the ends 76, 78, thus defining a U-shaped configuration of the first lift platform section 74, best illustrated in FIGS. 2-3.

The second lift platform section 100 has a pair of ends 102 and 104, a first surface 106 that becomes a top surface when the lift platform 70 is unfolded and a second surface 108 that is spaced apart from the first surface 106 to define a thickness of the second lift platform section 100. The second end 104 is configured to contact the ground surface when the lift platform 70 is unfolded in the deployed position and is configured to move into a vertical position during movement of the lift platform 70. The second lift platform section 100 can be also configured as a hollow frame member comprising the above described ends 102 and 104 and a pair of sides 110 and 112. The sides 110 and 112 are illustrated as extending outwardly from the first surface 106 to provide side safety rails during use of the lift platform 70. However, it is also contemplated that the sides 110 and 112 can be generally flush with the first surface 106. One or more optional reinforcing members 114 can be rigidly secured to either ends 102 and 104, as is illustrated or alternatively to sides 110 and 112 to increase rigidity and/or stiffness of the second lift platform section 100 and essentially prevent it from sagging or twisting during use. The quantity and configuration of the reinforcing members 114 will generally depend on any one of a width of the lift platform 70, a length of the lift platform 70 in the deployed position, occupant weight with and without wheelchair. The first surface 106 can be provided as an illustrated meshed member secured to the ends 102, 104 and/or sides 110, 112. Alternatively, the first surface 106 can be provided as a solid member. The opposite surface 108 can be open. Furthermore, as illustrated in various figures, the sides 110, 112 can extend outwardly from the ends 102, 104, thus defining a U-shaped configuration of the second lift platform section 100, best illustrated in FIGS. 2 and 4. Since the second end 104 can be configured to contact the ground surface when the lift platform 70 is unfolded in the deployed position, such second end 104 can be made large relative to the first end 102 to provide a solid stepping on surface.

The lift platform 70 also comprises a hinge 118 that is configured to operatively couple the end 78 of the first lift platform section 74 to the end 102 of the second lift platform section 100. In an example, the hinge 118 can be a continuous hinge or can be provided in separate sections. In an example, a short hinge section can be mounted adjacent each side. In either example, the second lift platform section 100 is movable between a generally folded stowed position being disposed in a surface-to-surface facing arrangement with the first lift platform section 74, as is best illustrated in FIG. 1 and a deployed unfolded position being disposed in an end-to-end facing arrangement with the first lift platform section 74 and defining a planar lift platform surface during the operation of the lift platform 70, as is illustrated for example in FIGS. 2 and 4.

Figure 2:
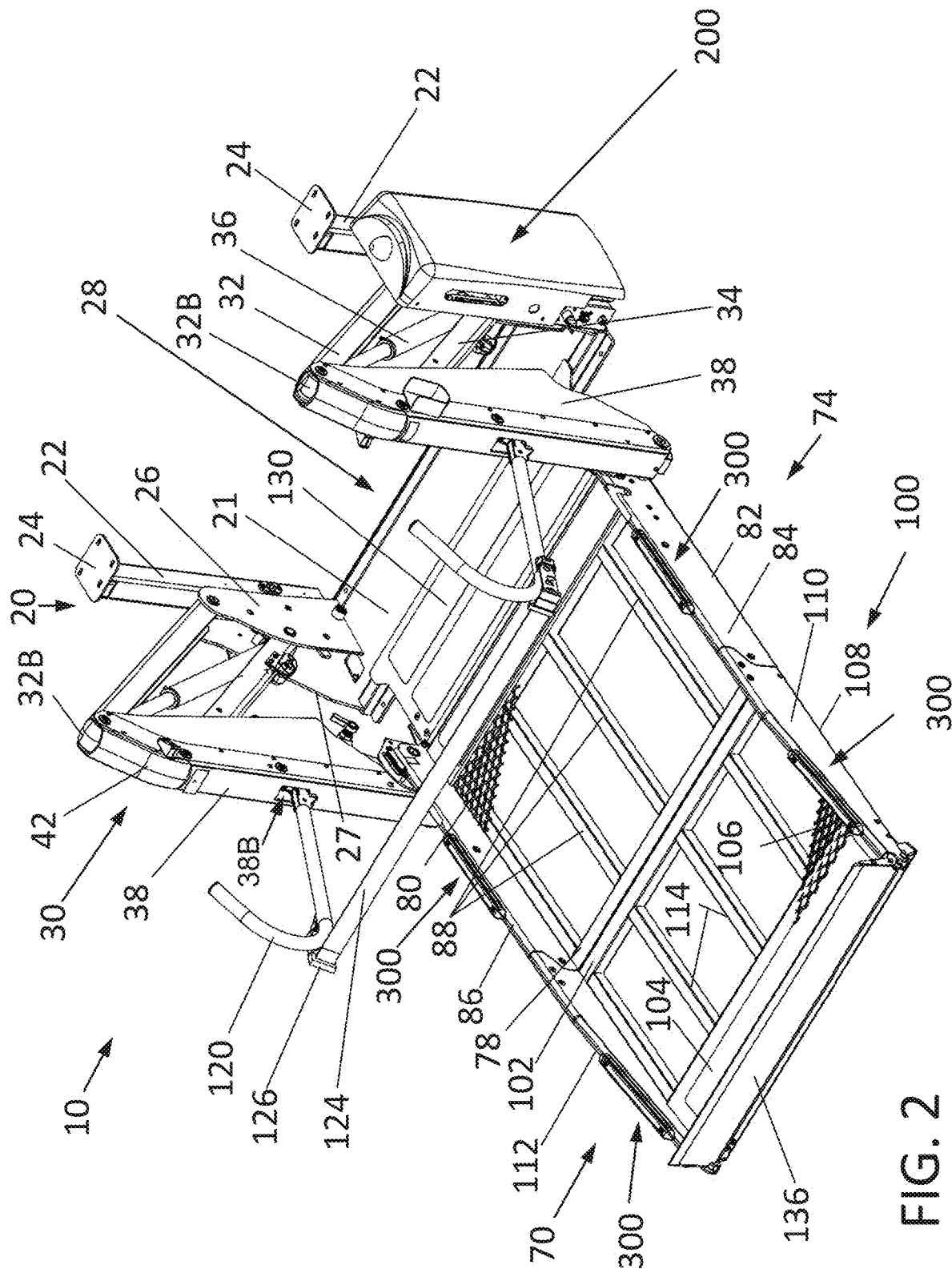
FIG. 2 illustrates a perspective view of the lift with the lift platform being in a floor level position.
Figure 3:
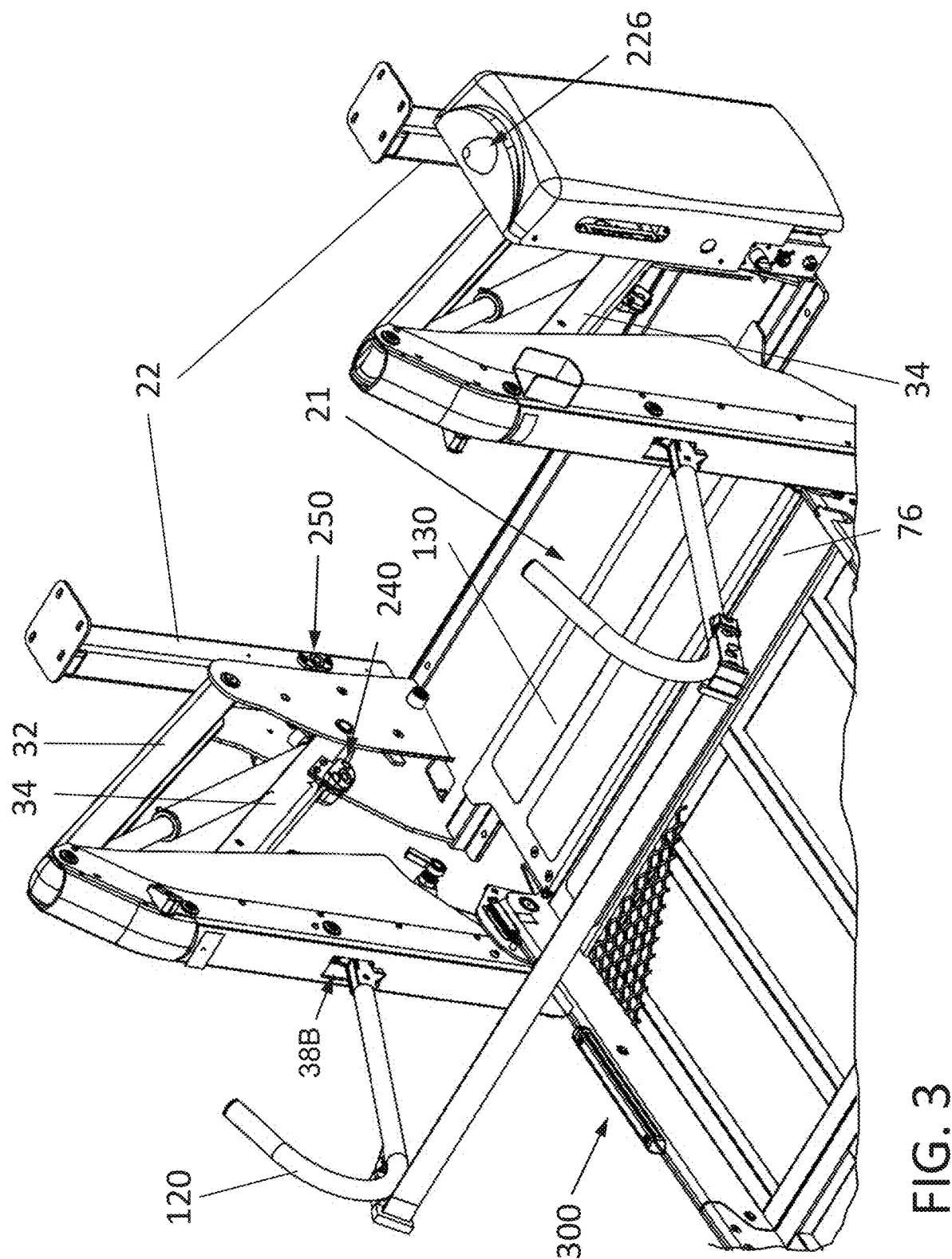
FIG. 3 illustrates a partial perspective view of the lift with the lift platform in the floor level loading position and a bridgeplate being disposed in a bridging position.
Figure 4:
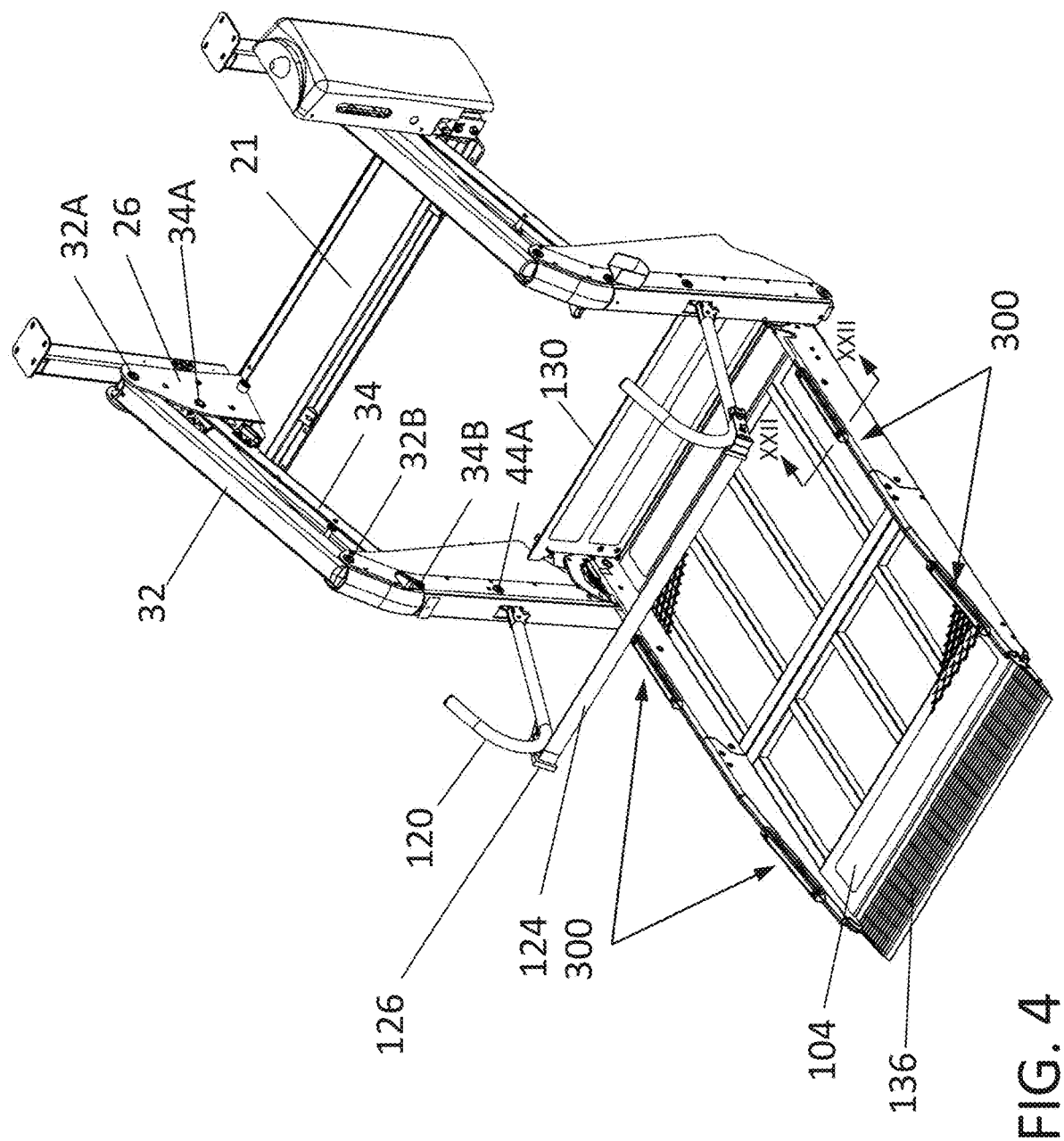
FIG. 4 illustrates a perspective view of the lift with the lift platform being in a ground level position.
Figure 5:
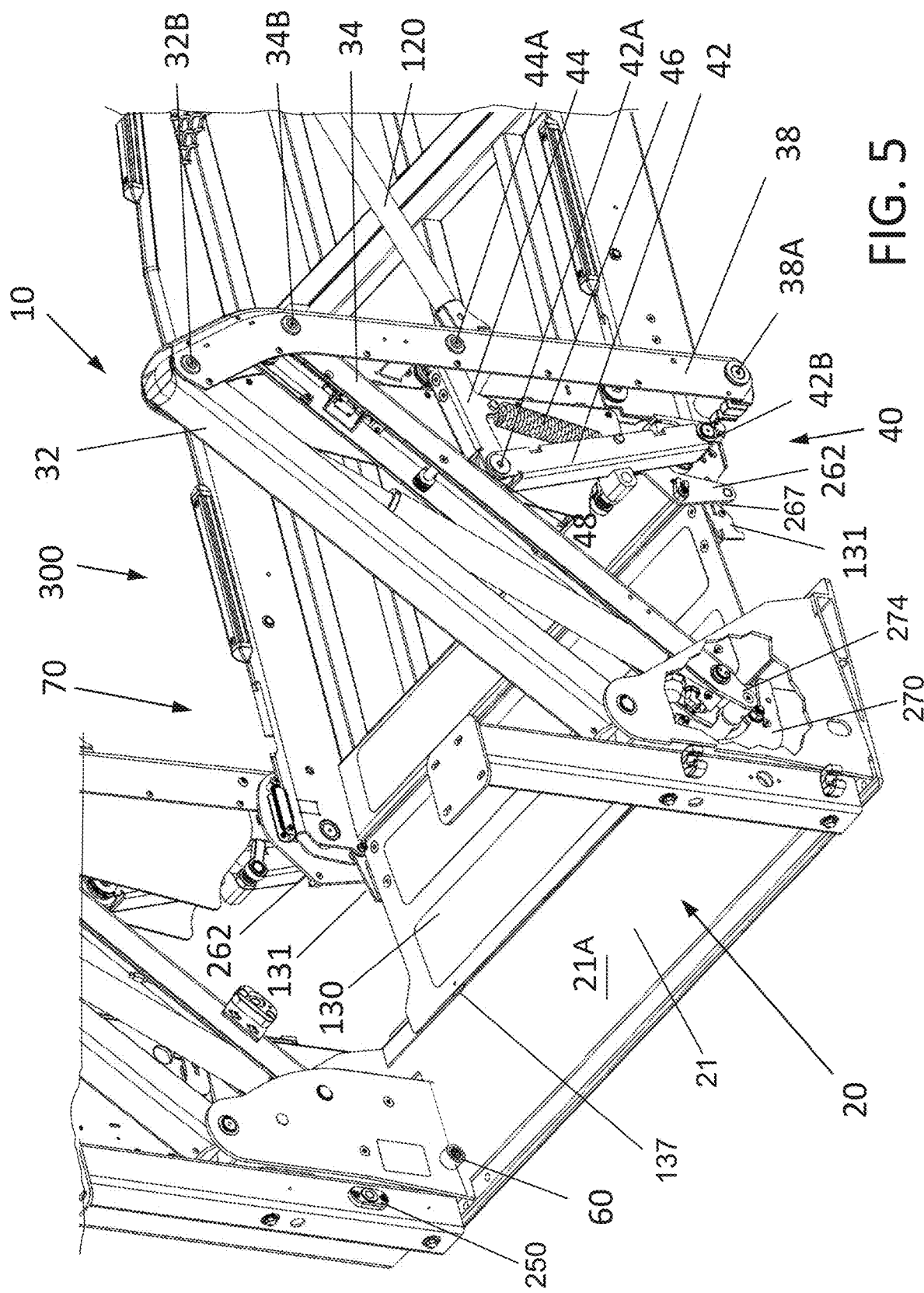
FIG. 5 illustrates a partial perspective view of the lift, particularly showing lift platform lifting and lowering mechanism with the bridgeplate being disposed in a bridging position.

During operation, the parallelogram mechanism 30 is configured to move the lift platform 70 between a (fully) stowed position of FIG. 1 and a ground level (fully deployed) position of FIG. 4, through a floor level position of FIGS. 2-3. In the floor level position of FIGS. 2-3, the lift platform 70 may be aligned, in a vertical direction with a floor of the vehicle (not shown). In the ground level position of FIG. 4, at least a portion of the lift platform 70, for example such as the second end 104, is generally resting on the ground surface (not shown) or is positioned in a close proximity to the ground surface (not shown). It will be understood that in the floor level position, the lift 10 and, more particularly, the lift platform 70 transitions occupant(s) to/from the vehicle floor (not shown) and that in the ground level position the lift platform 70 transitions occupant(s) to/from ground surface. In this document, the ground surface can also comply a low-rise ground platform. Furthermore, the stowed position can be also referred to as a stored position of the lift platform 70.

In a further reference to FIGS. 1-5A, the lift 10 comprises left and right handrails 120 that move with respect to the extension and retraction of the hydraulic cylinders 36. Each handrail 120 extends through an opening 38B in each vertical arm 38 and comprises a mount 122 with a flange 122A that is fastened to a respective horizontal elbow link 44.

FIGS. 1-5A also illustrate the occupant retention apparatus.

The occupant retention device can comprise the belt 124. The belt 124, restrains an occupant, standing on the lift platform 70, from inadvertently falling of the lift platform 70. Thus, the belt 124 can be also referred to as occupant restraint belt 124. Generally, the belt 124 will be used in commercial/transit application benefiting from presence of an attendant. However, the belt 124 may not be required and/or present on lifts 10 installed in privately used vehicles. Each end of the belt 124 is attached to each handrail 120. The ends of the belt 124 are connected by way of the releasable buckle 126. The belt 124 can be electrically interlocked, by way of a restraint belt interlock switch 186 disposed within the buckle 126, with the control system of the lift 10 so that the lift platform 70 would not move unless the occupant restraint belt 124 is securely fastened.

The occupant retention device can comprise the bridgeplate 130 that is mounted for a pivotal movement between two terminal positions. During operation, when the lift platform 70 is in the floor level position of FIG. 2 and in one terminal position, the bridgeplate 130 is pivoted to bridge a gap between the second end 78 and the baseplate 21 and permit on-boarding onto the lift platform 70 or off-boarding from the lift platform 70 onto the vehicle floor. In other words, when the lift platform 70 is in the floor level position, the bridgeplate 130 is disposed generally horizontally, resting on the baseplate 21. In this position, the wheelchair bound person or a person with a limited mobility can move from the interior compartment of the vehicle (not shown) onto the lift platform 70 or can move from the lift platform 70 into the interior compartment of the vehicle (not shown). In other words, the occupant of the lift platform 70 can on-board or off-board the lift platform 70. Prior to a movement of the lift platform 70 from the floor level position of FIGS. 2-3 toward the ground level position of FIG. 4, the bridgeplate 130 is pivoted into a generally vertical plane. Thus, in another terminal position, the bridgeplate 130 is disposed generally vertically to provide an internal roll stop of the lift 10. Such internal roll stop can be also referred to as an inner barrier or a rear roll stop. As the lift platform 70 moves between the floor level position of FIGS. 2-3 and the ground level position of FIG. 4, the bridgeplate 130 remains in the vertical position so as to prevent unintended movement of the wheelchair from the lift platform 70. The mechanism to pivot and lock the bridgeplate 130 will be described later in this document.

When the lift platform 70 is stowed, a free edge 137 of the bridgeplate 130 rests on the surface of the baseplate 21, as is best shown in FIG. 5A. When the lift platform is moved from the floor level position of FIGS. 2-3 into a stowed position of FIG. 1, the free edge 137 slides on the upper surface 21A of the baseplate 21 toward the rear of the base 20. When the lift platform 70 is fully stowed, such free edge 137 is allowed to move away and toward the upper surface 21A as the vehicle (not shown) travels over uneven surfaces including without limitations railroad tracks, road surface cracks, bumps, potholes, and the like. Since both the bridgeplate 130 and the baseplate 21 are generally manufactured from metal, such movement of the free edge 137 is generally associated with a rattling sound. Such rattling sound can be an annoyance to vehicle occupants. The lift 10 can overcome such disadvantage of conventional lifts by employing a stop 60 at one or both inner supports 26. Now in a further reference to FIG. 5A, the stop 60 is so mounted at a distance from the upper surface 21A that a portion of the free edge 137 is disposed under a peripheral surface 62 of the stop 60. In other words, it can be said that the portion of the free edge 137 is wedged under the stop 60 when the lift platform 70 is being in the stowed position. The peripheral surface 62 can be provided as a resiliently compressible material that would compress under contact with the portion of the free edge 137. Thus, a method of operating the lift 10 or the method of stowing the lift platform 70 can also include a step of at least restricting if not completely eliminating a movement of the free edge 137 of the bridgeplate 130 away from and toward the upper surface 21A of the baseplate 21.

The stop 60 can be also provided as a roller and, more particularly, as an elastomeric roller. The elastomeric roller is strategically positioned to capture and hold the outboard edge 137 of the bridgeplate 130 when the lift platform 70 is in the stowed position. By capturing the outboard edge 137 of the bridgeplate 130 when the lift platform 70 is stowed and the vehicle is moving, the significant source of rattling is at least reduced if not eliminated, resulting in a more comfortable driver and passenger experience.

The occupant retention device can comprise the roll stop 136. The roll stop 136 also pivots, during operation, between two terminal positions. The mechanism that pivots the roll stop 136 is disposed under the lift platform 70 can be of a type as described in U.S. Pat. Nos. 4,534,450 or 6,086,314, both issued to Savaria, which are being incorporated by reference in their entirety herewithin. The detail description of such mechanism is omitted herewithin for the sake of brevity. Accordingly, the illustrated roll stop 136 is to be understood as including such mechanism. In one terminal position when the lift platform 70 is in the ground level position, the roll stop 136 is pivoted into a generally coplanar position with the lift platform 70 to allow one of loading onto the lift platform 70 from a ground level (and off-loading from the lift platform 70 onto the ground level. Prior to movement of the lift platform 70 between the ground level position of FIG. 4 and the floor level position of FIGS. 2-3, the roll stop 136 is pivoted into another terminal position and is disposed in a plane being traverse to a plane of the lift platform 70. The roll stop 136 remains in such another terminal position until the lift platform 70 is ready to be moved into a stowed position of FIG. 1. In such another terminal position, the roll stop 136 is disposed generally vertically and traverse to the plane of the lift platform 70 to prevent unintentional discharge from the lift platform 70 during movement of such lift platform 70 between ground level and floor level. The roll stop 136 can be also referred to as an outer barrier.

The occupant restraint belt 124 and the roll strop 136 do not have to be used in a combination with each other. The occupant restraint belt 124 is suitable for use on commercial/public DOT-compliant vehicles that require a presence of operator or attendant to aid occupants in wheelchair or occupants with limited mobility. The roll stop 136 is common on private vehicles that do not enjoy benefit of an external operator or attendant. Thus, although the lift 10 of FIGS. 1-5A has been illustrated as employing both the occupant restraint belt 124 and the roll stop 136, only one device can be used.

Figure 6:
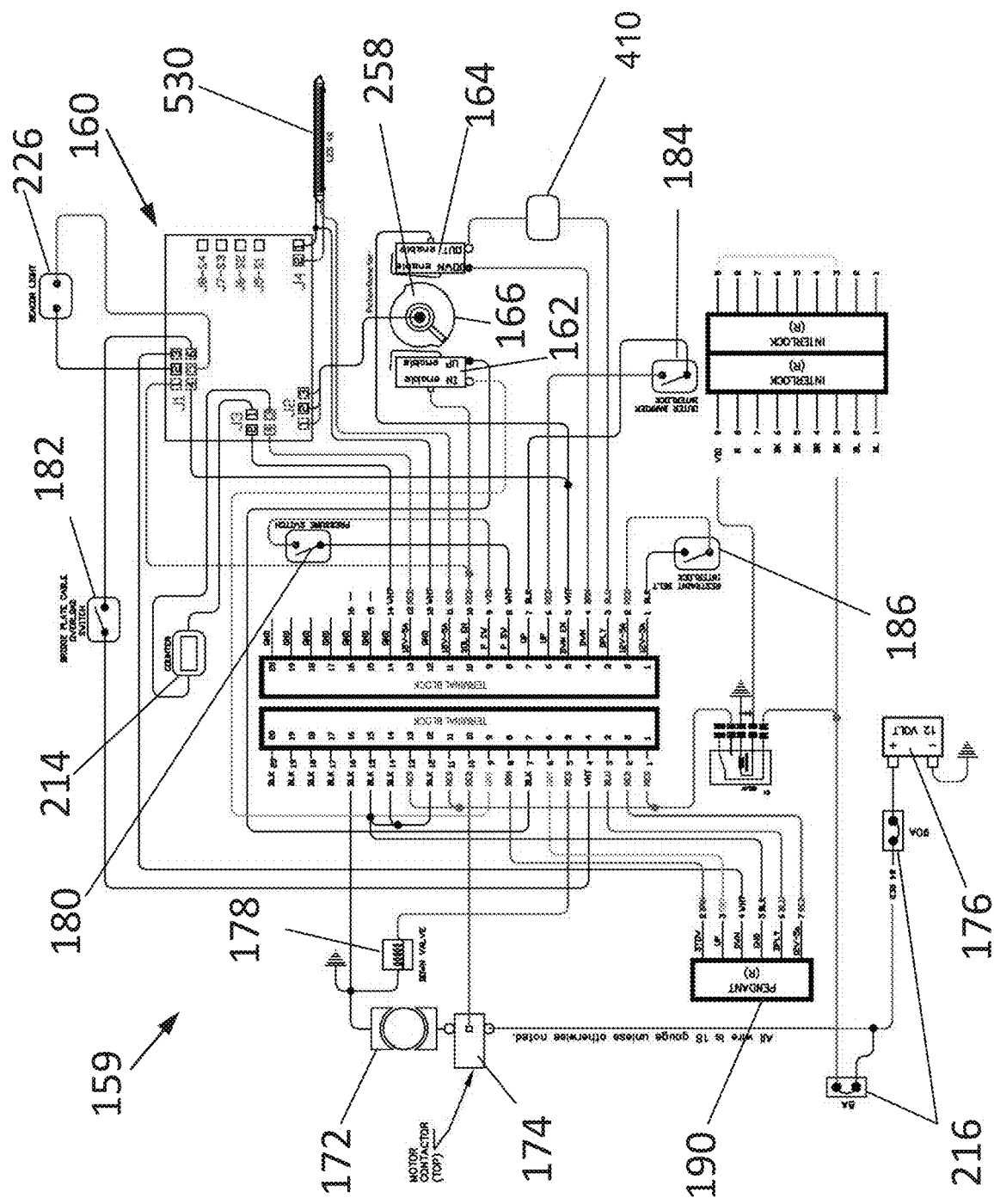
FIG. 6 illustrates an exemplary control circuit employed within the lift of FIGS. 1-5A.

Now in a reference to FIG. 6, the electrical control circuit 159 comprises an electric motor 172 that is coupled through a motor contactor 174 with a battery 176 that functions as a source of electrical power. A down valve 178 is also provided. During operation, the electric motor 172 operates the hydraulic pump 204 to move the lift platform from the ground level position of FIG. 4 to the stowed position of FIG. 1 through the floor level position of FIGS. 2-3. The down valve 178 is provided to move the lift platform 70 from the stowed position of FIG. 1 into the ground level position of FIG. 4. The electrical control circuit 159 also incorporates a plurality of control switches. For example, limit switches 162 and 164 control stow and deploy movements of the lift platform 70. The limit switches 162 and 164 are interlocked, by wires, with a manually operable pendant 190 and are essentially coupled to the battery 176. The limit switches 162 and 164 are employed to annunciate positions of the lift platform 70. One of the limit switches, for example, such as limit switch 162 can be positioned to cooperate with the exterior surface of a switch cam 166, best shown in FIGS. 11-12, so as to control stowed position of the lift platform 70 of FIG. 1. The other one of the limit switches, for example, such as limit switch 164 can be positioned to cooperate with the exterior surface of the switch cam 166 so as to control deployed position of the lift platform 70 of FIG. 4. A pressure switch 180 is mounted on a pump body and is operable to determine a pressure of stowing lift platform 70 with a load on it. When the roll stop 136 is provided, a roll stop interlock switch 184 is mounted under the rolls stop 136 and is operable to detect the position of the roll stop 136. As has been disclosed above, the restraint belt interlock switch 186 is mounted within the buckle 126 and is operable to output a signal, controlling movement of the lift platform 70 should the belt 124 being unbuckled during occupant transport. The electrical control circuit 159 also incorporates a controller 160. Additional components within the electrical control circuit 159 may include a counter 214 configured to count movement cycles of the lift platform 70 between below floor level and stow position, fuse/circuit breaker(s) 216 and a threshold warning device light 226 that provides a visible annunciation/warning. The lift 10 is configured to also provide an audible warning by way of a buzzer device (not shown) that can be mounted on the back of the controller 160 or the control enclosure 202.

Figure 7:
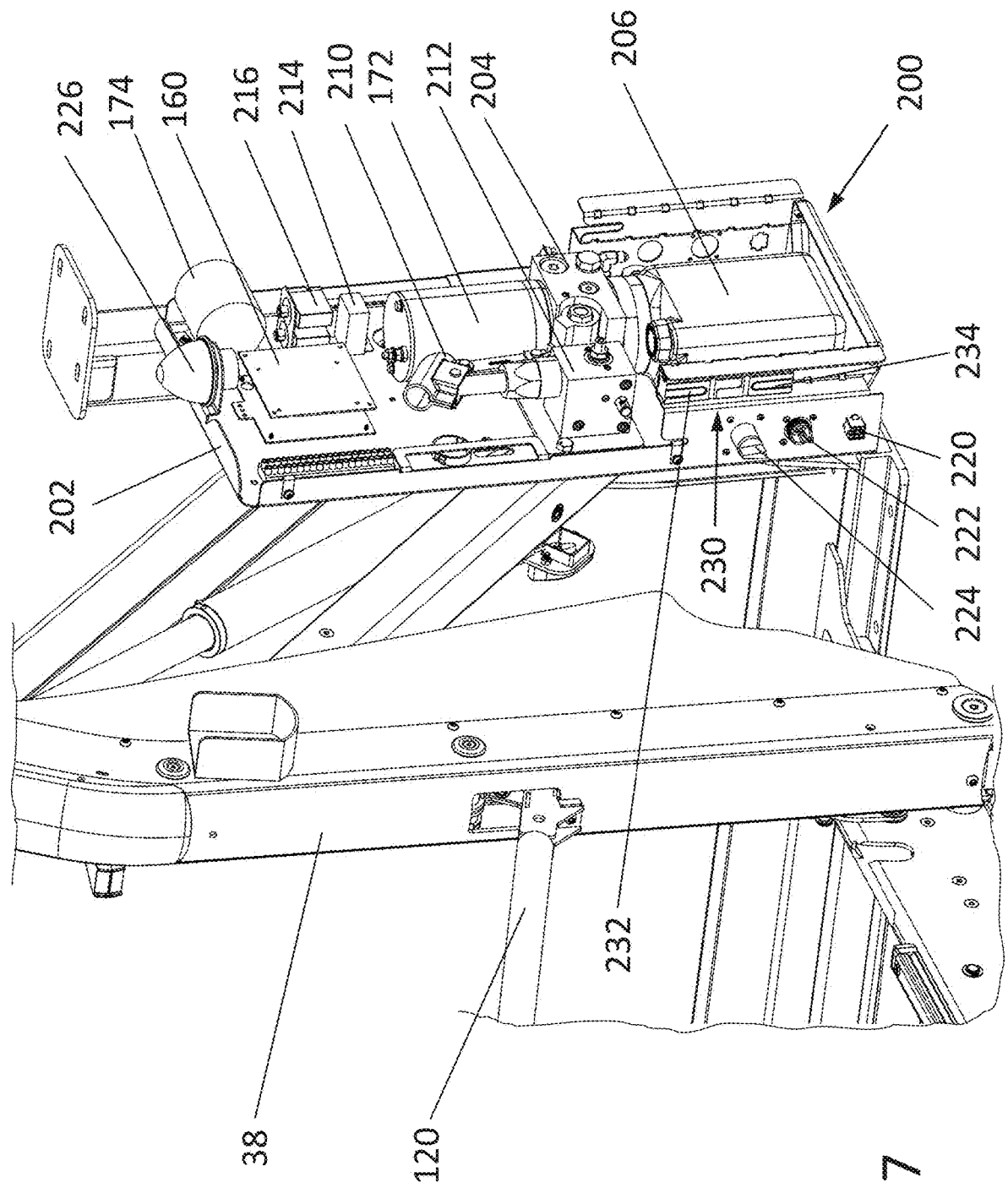
FIG. 7 illustrates a partial perspective view of the lift of FIGS. 1-5A, particularly showing a hydraulic system.

Now in a reference to FIG. 7, therein is illustrated the control assembly 200. The control assembly 200 comprises a control enclosure 202. Various controls and annunciators are mounted on or within the control enclosure 202. As it is best shown in FIG. 7, the controller 160 is mounted within the control enclosure 202. Also mounted within the control enclosure 202 is a hydraulic pump 204 that is operable by the electric motor 172. The hydraulic pump 204 is connected to the reservoir 206. The reservoir 206 contains hydraulic fluid. There is also a manually operable handpump 210 with a pressure relieve valve module 212. A handle 210A of the manually operable handpump 210 is generally mounted on an exterior surface of the control enclosure 202. Also provided on the exterior surface of the control enclosure 202 are interface/interlock connector 220, pendant connector 222 and ON/OFF switch 224. The interface/interlock connector 220 can electrically connect at least the controller 160 with another system within the vehicle (not shown), for example such as a door system (not shown) and/or In an example, the hydraulic pump 204 with the electric motor 172 can comprise a prime moving system of the lift 10. In an example, the hydraulic pump 204 with the electric motor 172 and down valve 178 can comprise a prime moving system of the lift 10

Figure 8:
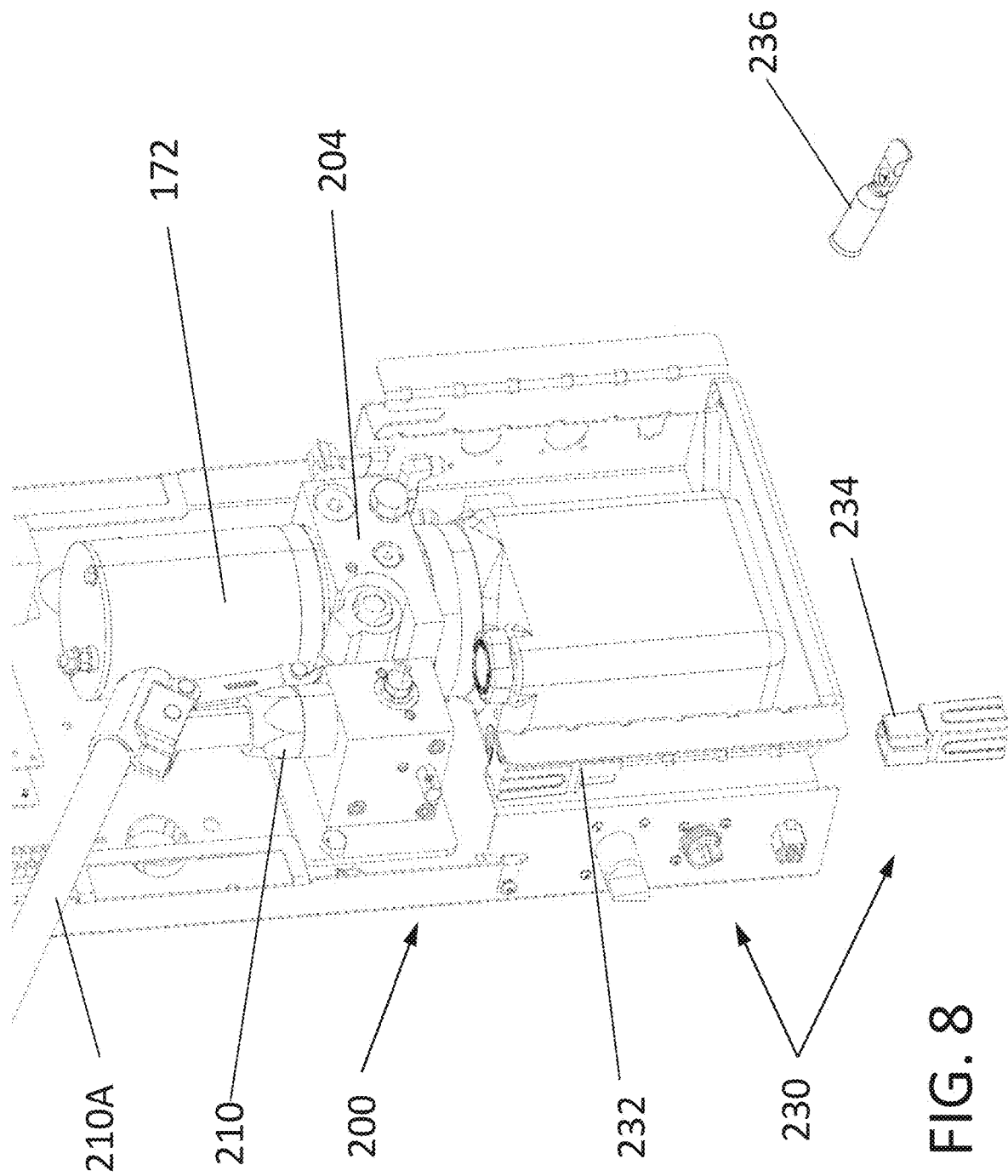
FIG. 8 illustrates a partial perspective view of the hydraulic system showing encapsulated, decouplable power interface.

Now in a reference to FIGS. 7-8, therein is illustrated a power interface to the control assembly 200. Such power interface is being best illustrated in FIG. 8 as an encapsulated decouplable power interface. Such encapsulated decouplable power interface can be provided by a high capacity, power connector 230 that can be manufactured by Anderson Power Products under a Cat. No. 1321G or any other suitable electrical power connector. Such power connector 230 comprises a first (control assembly mounted) part 232 and a second (cable mounted) part 234. The power connector 230 is incorporated into control enclosure 202 and provides a decouplable power connection combined with keeping the "live" end of the cable protected in the event it is decoupled. Both the lift part 232 and the cable part 234 of the power connector 230 are protected with the control enclosure 202 that cannot be lost and nearly impossible to improperly install. The integral cover overcomes disadvantages of separate covers that protect power interface from ground sources as a risk of a high current short circuit exists but that can be improperly installed or lost, thus amplifying the risk of a high current short circuit. Moreover, in the event the power interface is disconnected for service, power lug 236 is protected by the first part 232 and/or the second part 234, to ensure that the end of the cable is protected. As such, the risk of a high current short circuit either during normal service or during service is at least substantially reduced if not eliminated.

On some conventional platform lifts, a power interface is provided external to the control (pump) enclosure. Further, such power interface relies on the use of an insulating, elastomeric "boot" to cover the power lug. In the event the "boot" is not properly installed and a conductive object is placed across the powerlug and an otherwise "grounded" part of the vehicle (as most vehicles are configured with a "chassis ground"), nearly any metallic object inside the vehicle will represent a ground. Such contact can result in a very high current short circuit which can cause a fire.

With the above described power interface, both sides of the power cable are protected by a plastic housing. When the connection is made, there is literally no way to contact the power lug 236 inside the housing. Further, even when the power interface is disconnected, both ends of the cable are individually protected at least further reducing if not completely eliminating the possibility of a short circuit.

The lift 10 can be adapted with a device configured to control movement of the lift platform 70. The device can be also referred to as a lift platform movement control device. The lift platform movement control device can be provided as a bridgeplate and threshold area monitoring system 239. The bridgeplate and threshold area monitoring system can be also referred to as a bridgeplate and threshold safety warning system. The bridgeplate and threshold area monitoring system comprises a distributed sensor array. More specifically, in the exemplary embodiment of FIGS. 3 and 9-10, the distributed sensor array is illustrates as comprising a first sensor array with two sensors 240 and a second sensor array with two sensors 250. The first and second sensor arrays are being further illustrated as acoustic sensor arrays.

Figure 9:
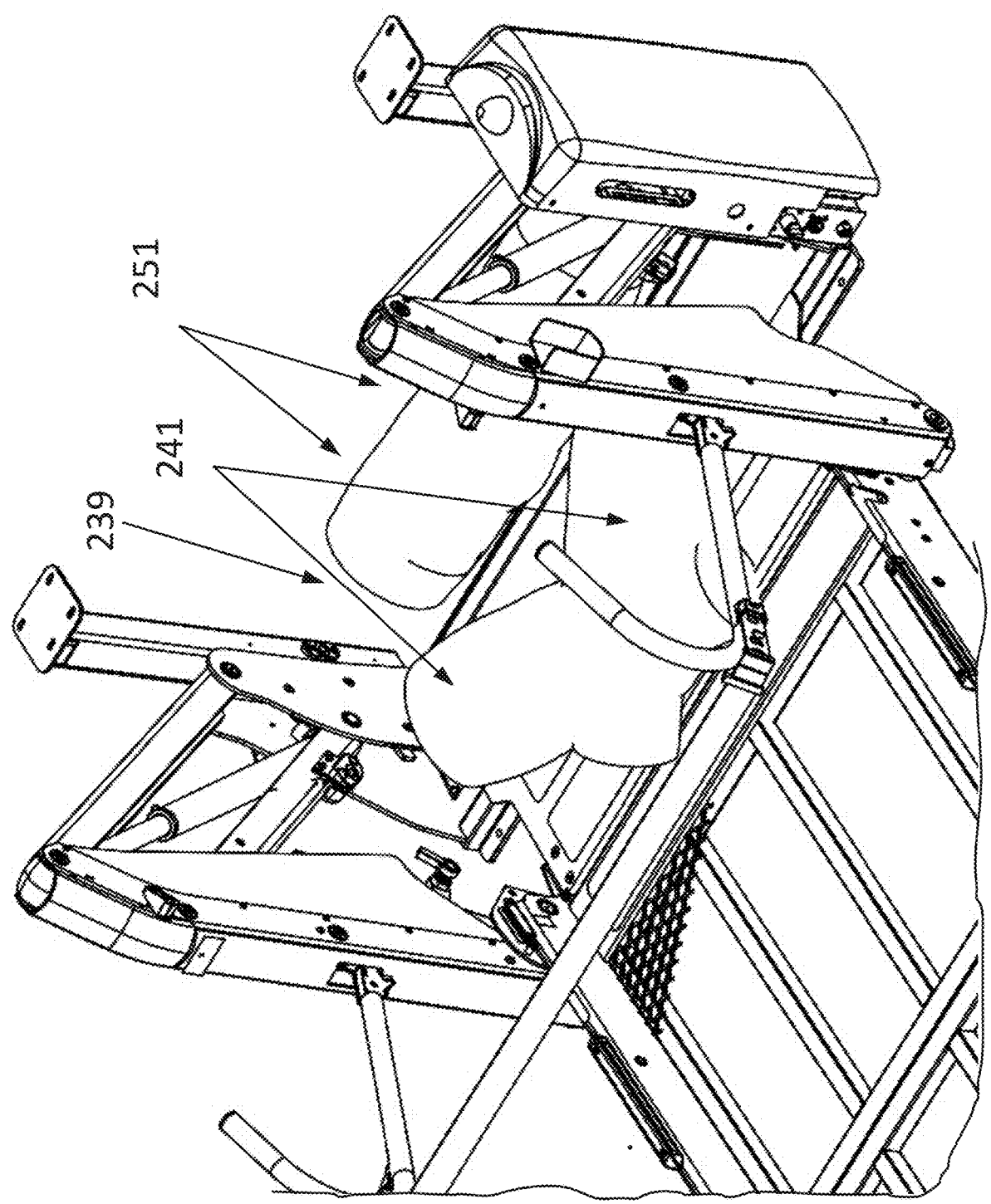
FIG. 9 illustrates a partial perspective view of the lift with the lift platform in the intermediate floor level position, particularly showing an exemplary lift platform movement control device that includes detection plume volumes from acoustic sensor arrays.

The two sensors 240 are configured to monitor the threshold area 28 by way of a sensor detection plume 241. Two sensors 250 are configured to monitor transfer bridgeplate area by way of sensor detection plume 251 while the lift platform 70 is in the floor level position. The sensor detection plumes 241, 251 are best shown in FIG. 9. A controller 160, to be described later in this document, is configured to prevent operation (movement of the lift platform 70) while this area is occupied by any one of the wheelchair (not shown) and a standing occupant, resulting in an interrupted detection plume 241 and/or 251.

While the lift platform 70 is in the stowed position of FIG. 1, the sensor pairs can be in a de-activated state. In an example, such de-activated state can include the sensors being in a power-off state. In an example, such de-activated state can include a condition where the output signals from the sensors are being essentially ignored by the controller 160. In other words, in this state, the sensors 240, 250 may not generate a respective sensor detection plume 241, 251 and may not generate an output electrical signal when, thus indicating absence of an object, for example such as the wheelchair. As the lift platform 70 moves from the stowed position into the floor level position, the controller 160 activates sensors 240, 250 and causes the sensors 240, 250 to generate the respective sensor detection plumes 241 and 251. The controller 160 can activate the sensors 240, 250 upon receipt of a deployed command ("Down" function) from the pendant 190 even before the lift platform 70 starts to move. This means that in this state either one or both of the two sensors 240 and two sensors 250 will generate an electrical output signal when the object breaks the respective sensor detection plume 241, 251. The controller 160 can be configured such that when the lift platform 70 reaches floor level position, an object detected by any of the first and second sensor arrays will result in the "Down" function being disabled. When no objects are detected and the "Down" function is selected, the front sensors 240 can be configured to cease function, i.e. stop generating the output signal, while the rear sensors 250 can continue to monitor the threshold area 28. In the event, an object is detected in the threshold area 28 while the lift platform 70 is below the floor level position, an audible and visual warning system can be activated.

The front sensors 240 are illustrated as being mounted to the lower parallel arms 34, while the rear sensors 250 are illustrated as being located in the structure at the rear of the baseplate 21 and, more particularly, being mounted within the uprights 22. Each sensor 240 is mounted in a collar 242A. Each sensor 250 is mounted in a collar 242B. Collars 242A and 242B orient the sensor 240, 250 so that its respective sensor detection plume 241, 251 is optimal. The collar 242B for each rear sensor 250 is arranged on a slight forward-facing angle and mounted directly in the structure. Each front sensor 240 is suspended, by way of the collars 242A, in a sensor mounting brackets 244A, 244B that serve a dual purpose of holding and protecting the sensor 240 as each lower parallel arm 34 moves through its normal motion. The collars 242A, 242B and sensor mounting brackets 244B are best shown in FIG. 10.

The orientation of the front sensors 240 is such that the collar 242A is angled in two directions, the combination of which maintains the orientation of the sensor detection plume 241 as the lower area (below sensor) begins to move.

Figure 10:
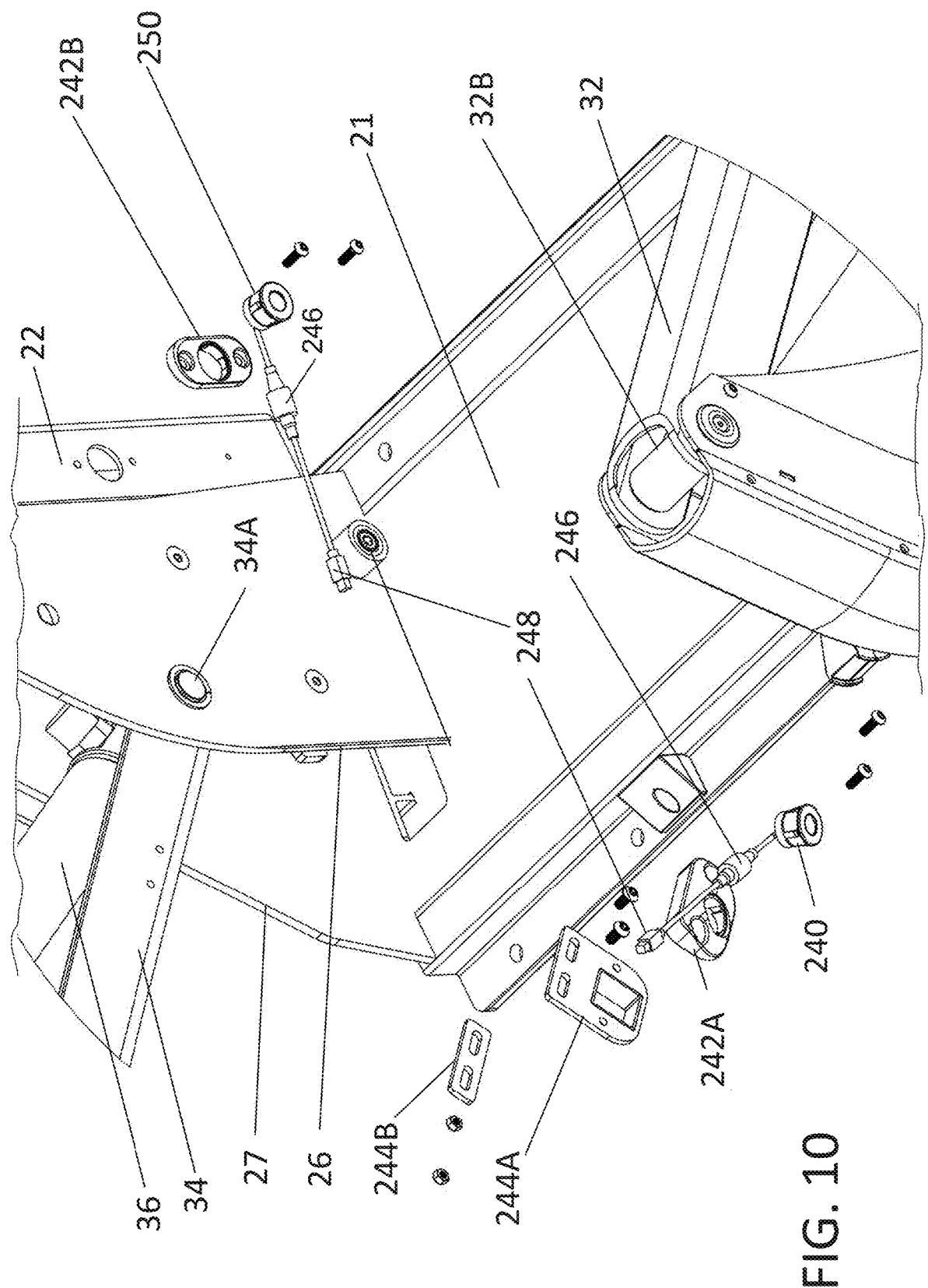
FIG. 10 illustrates a partial perspective view of the lift with the acoustic sensor arrays being illustrated in exploded view.

Each exemplary sensor 240, 250 can be a two-wire, piezoelectric device of the type shown in FIG. 10, being equipped with a cable 246 and a connector 248 for ease of installation and wiring connection. This type of sensor is inexpensive, plentiful in terms of procurement from different manufacturers and reasonably reliable in terms of mean time between replacements due to sensor failure. This type of sensor works as both a speaker and a microphone depending on the polarity of the voltage applied. Accordingly, the controller 160 connects different polarity voltage to each sensor with a pair of sensors.

The above described sensors 240, 250 provide acoustic sensor arrays. Though the detection volume for these types of devices are specified with an angle and a maximum distance, it has been determined that the practical detection volume is shaped more like a watermelon rather than a cone. Accordingly, it is possible to locate these sensors quite close to the ground without fear of false detection.

Further, the acoustic sensor array also covers the area over the transition area over the transfer plate between the vehicle floor and the lift platform 70. In a combination with the controller 160, movement of the lift platform 70 can be disabled (i.e. controlled) in the event the transition area is occupied, thus significantly reducing the possibility of accidents caused by operator error.

Thus, it would be understood that the above described acoustic sensor array provides a non-contactless object detection method.

In an example, the above described acoustic sensor array overcomes difficulties of other sensing approaches that are either not comprehensive in their coverage of the threshold area 28 or are prone to malfunction in the event of contamination. For example, a system of infrared beams to cover the vehicle threshold area 28 while leaving the transition area unprotected operates on a "line of sight" basis. Such system works on a "line-of-sight" basis. Though it is difficult to park a wheelchair in the threshold area without being detected, thinner objects like crutches, canes and some prosthetics can fit "between" the beams and avoid being detected. As such, an object that does not appear on the line between an emitter and receiver pair will not be detected. The above acoustic sensor array monitors a volume in front of the sensor rather than aligned with sensors in a linear path, thereby increasing an ability to detect objects in the monitored area. As a volume, it is much easier to reliably detect a wider range of objects.

In an example, the above described acoustic sensor array overcomes difficulties of monitoring the threshold and transition plate areas with a pressure sensitive mat on the surface of the lift platform 70 or on the surface of the baseplate 21. Though this technology/technology can be efficient in terms of area size, it is susceptible to foreign matter intrusion under the plate. Objects like pebbles or hard candy can become lodged between the pressure plate and the lift's base plate rendering the system inactive and prone to "false positive" readings. Such foreign matter intrusion is of special consideration in areas where sand is used to counter the effects of snow and ice. Once the foreign matter is stuck under the pressure mat, operation of the lift platform can be prevented. Additionally, the detection sensitivity of the pressure sensitive mat reduces away from area were load is directly applied.

In an example, the above described acoustic sensor array does not require internal component motion as in a case with tension devices employed to monitor the bridgeplate area. Such device needs to move to load the tension device so that the detection can occur. Accordingly, some standee occupants who might not be very surefooted may be startled by the movement and may fall.

In an example, the above described acoustic sensor array can be a cost-effective alternative solution to a video-based monitoring system at least for the reason that it does not require the computing power to monitor the target area over a wide range of operating conditions.

In an example, the described acoustic sensor array does not require adjustments by an operator to set the size of the operating plume volume to a size that is too small to be effective in an effort to avoid "false negative" condition. Such adjustments are generally necessary for a single senor system generating a conical sensing shape.

In an example, the described acoustic sensor array is integrated into the lift structure, enabling the entire system to be tested prior to shipment. Moreover, as it is integrated into the lift structure, the time required to install the lift is significantly less as compared with the conventional wheelchair lifts. Furthermore, the integrated sensor array does not require a separate field installation remotely from the wheelchair lift, generally in the vehicle header over the doorway, and a subsequent adjustment by others.

Multiple sensors in the above described acoustic sensor array not only cover the area to be monitored more effectively, the possibility of a single point failure resulting is a "false positive" is significantly reduced.

Thus, in summary, the above described bridgeplate and threshold area monitoring system 239 is configured to monitor both the transition area as well the threshold area 28. The above described bridgeplate and threshold area monitoring system 239 is also configured to control the downward motion of the lift platform 70 from the floor level position and stop such downward motion when an object is detected in the transition area. Thus, the above described bridgeplate and threshold area monitoring system 239 can be referred to as a platform movement control device. The above described bridgeplate and threshold area monitoring system 239 is additionally configured, through the controller 160 and annunciators, to annunciate object detection. The annunciation can comprise at least one of audible and visible annunciation.

Figure 11:
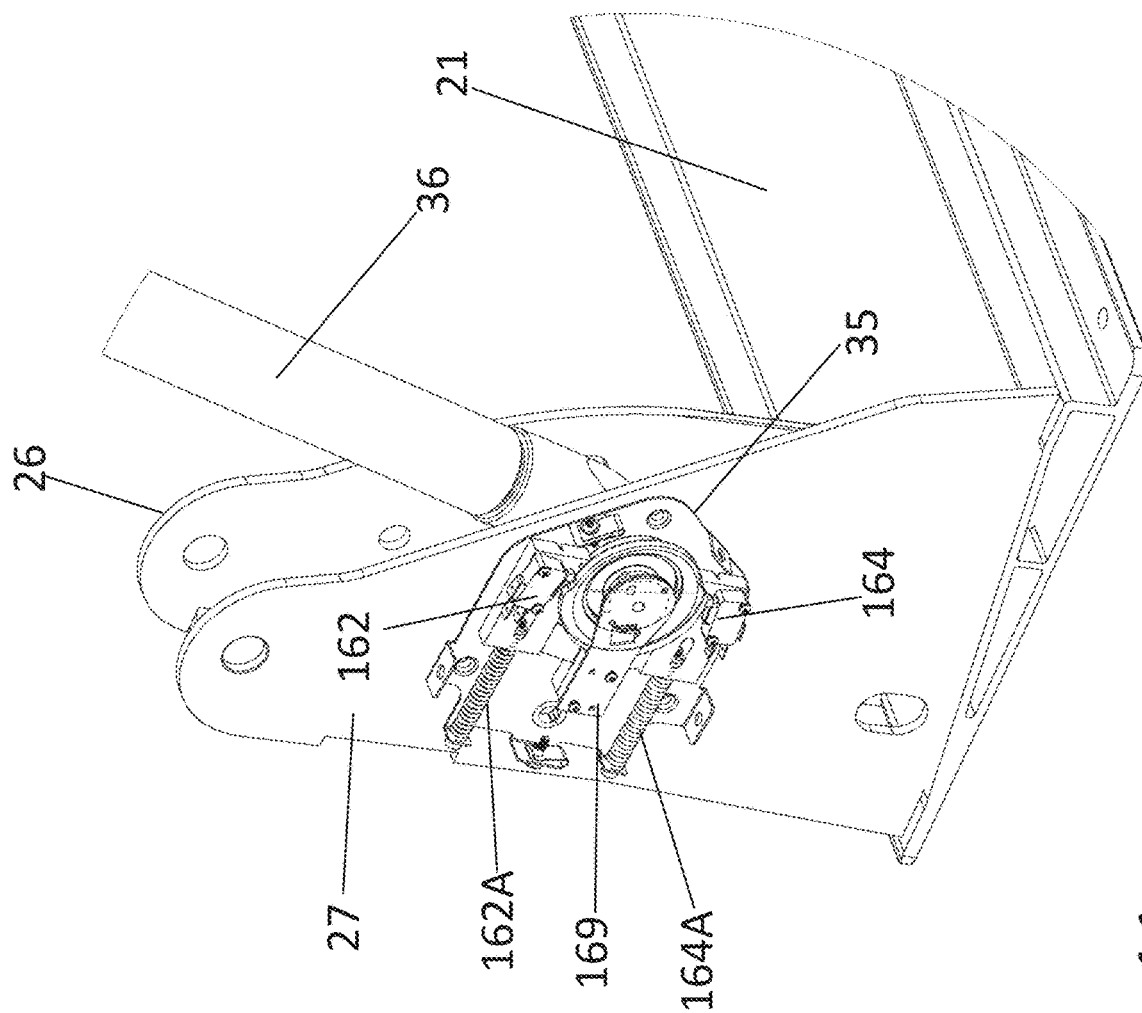
FIG. 11 illustrates a partial perspective view of a switch and potentiometer assembly employed within the lift of FIGS. 1-5A.
Figure 12:
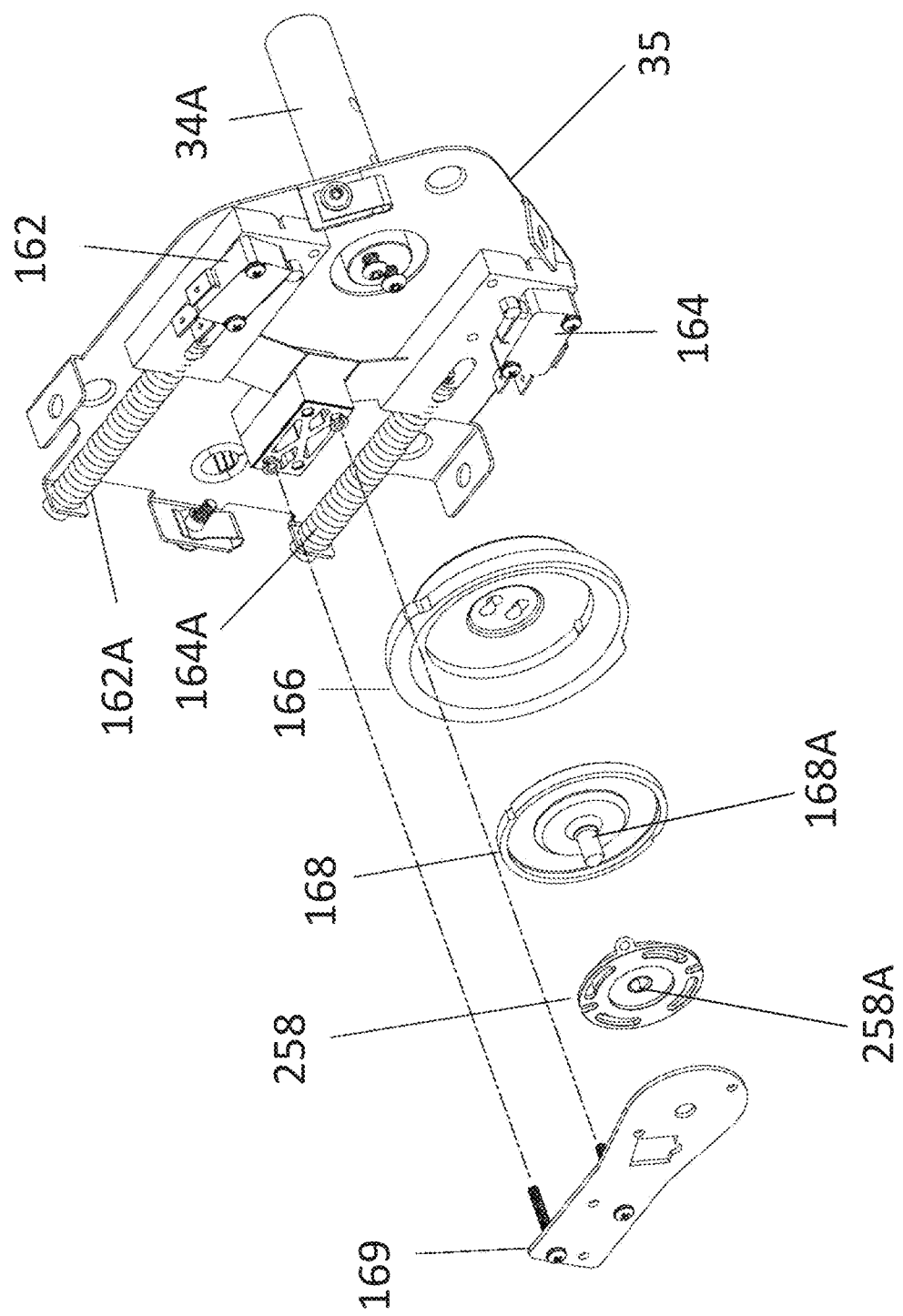
FIG. 12 illustrates an exploded view of the switch and potentiometer assembly of FIG. 11.
Figure 13:
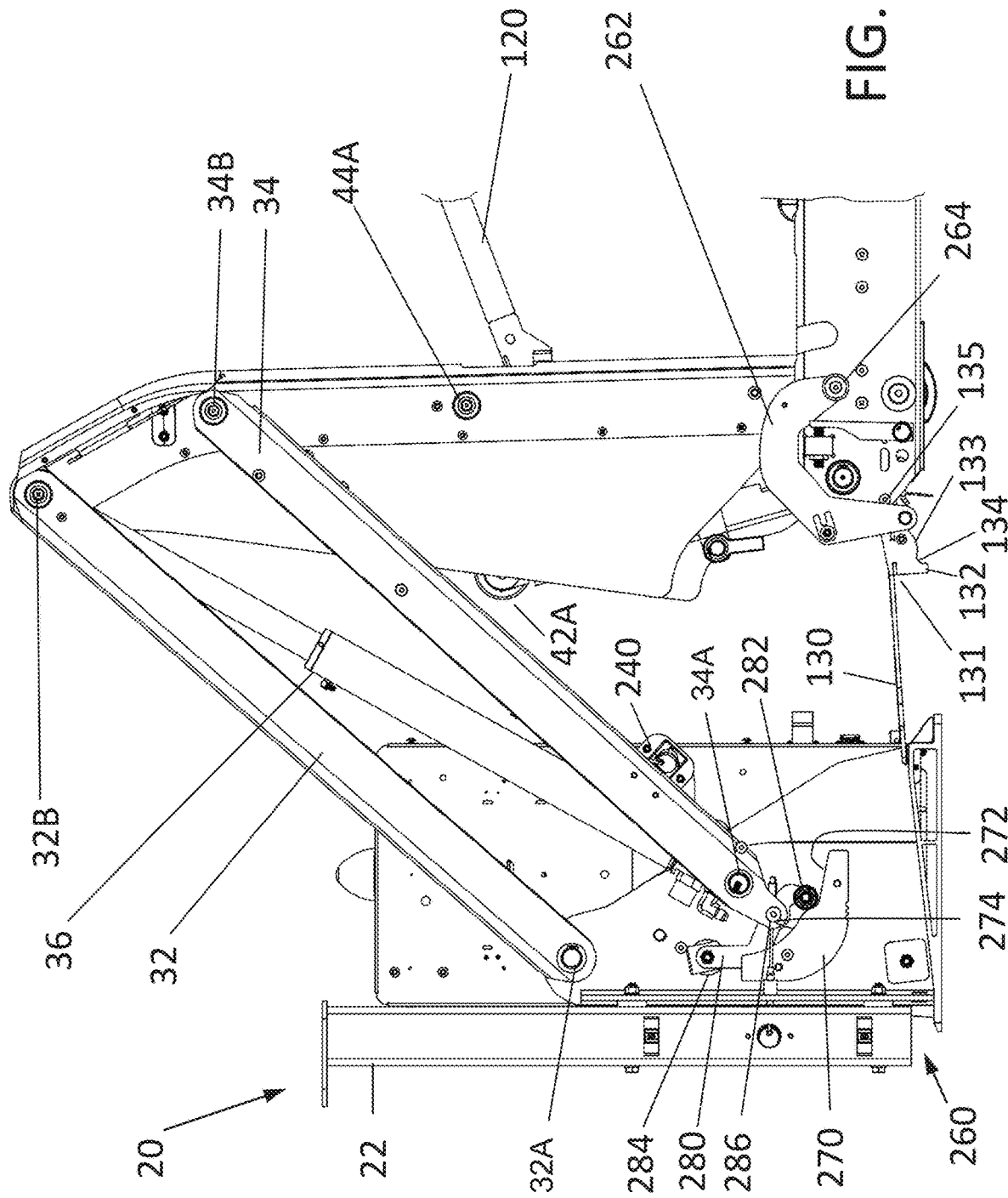
FIG. 13 illustrates a partial elevation view of the lift showing bridgeplate locking device with the bridgeplate being disposed in a bridging position.
Figure 14:
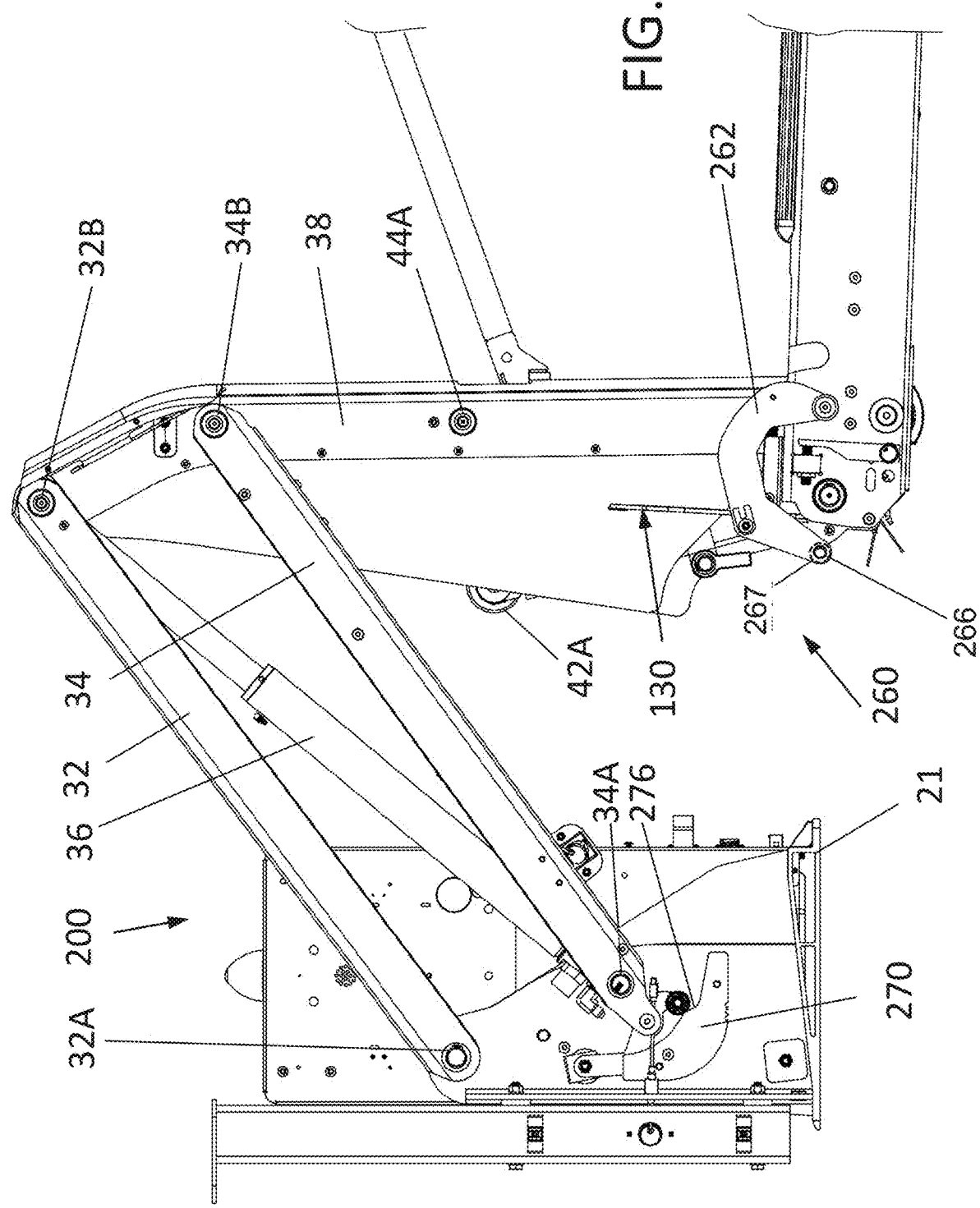
FIG. 14 illustrates a partial elevation view of the lift showing bridgeplate locking device with the bridgeplate being disposed in a barrier position.

Now in a particular reference to FIGS. 11-12, the bridgeplate and threshold area monitoring system 239 also comprises a platform position sensor. Such platform position sensor is being illustrated as a potentiometer 258 that provides inputs to the controller 160 in order to control operation of the sensors 240, 250. The operation of the potentiometer 258 is independent from the operation of the limit switches 162 and 164. The output signals from the potentiometer 258 are thus used by the controller 160 to determine the position of the lift platform 70. Moreover, as the lift platform 70 moves away from the floor level position and toward the ground, the controller 160 can be configured to provide at least one of a visual and an audible signal to warn oncoming occupants inside the vehicle that the lift platform 70 is not at the occupant floor level position.

The potentiometer 258 comprises a through aperture 258A that is sized and shaped to receive a pin 168A of a mounting member 168. The mounting member 168 is inserted into a cavity of a switch cam 166. The switch cam 166 is fastened to the end of the pivot 34A that the stationary end of the cylinder 36 pivots on. The above members are fastened to a stationary mounting bracket 35 with the plate 169. In this arrangement, the potentiometer 258, the mounting member 168 and the switch cam 166 are pivoting together with the pivoting of the pivot 34A.

In a further reference to FIGS. 11-12, the mounting and actuation of the potentiometer 258 is integrated with the mounting and actuation of the limit switches 162 and 164. However, as has been described above, the potentiometer 258 is electrically separated from the limit switches 162 and 164 within the control circuit 159. The limit switches 162 and 164 control end positions of the lift platform 70, while potentiometer 258 determines the position of the lift platform 70. When the lift platform 70 is fully stowed, pressing the "Deploy" function on the handheld control pendant 190 will unfold the lift platform 70 to a point where the lower limit switch 164 changes state. Similarly, when the lift platform 70 is at the ground level, pressing the "Up" function on the handheld control pendant 190 will raise the lift platform 70 to the point where the upper limit switch 162 changes state.

It can also be seen from FIGS. 11-12 that the limit switch 162 can be connected with a spring and screw arrangement 162A so as to adjust position of the limit switch 162 relative to the exterior surface of the switch cam 166. Likewise, the limit switch 164 can be connected with a spring and screw arrangement 164A so as to adjust position of the limit switch 164 relative to the exterior surface of the switch cam 166. Although, limit switches 162 and 164 have been illustrated as mechanical type roller switches, other switch types, for example such as proximity type switches, reed type switches, etc, can be used within the lift 10.

During the development of the monitoring system, it became apparent that the areas the required monitoring to affect a suitable threshold warning device and a suitable transition area monitor were not the same. Moreover, the timing of these systems related to the position of the lift platform 70 were quite different as well. Accordingly, it became apparent that a means of determining multiple positions as well as the ability to monitor different areas would be necessary as well. Though it would be possible to affect such monitoring with cam operated switch(s), the potentiometer 258 can ensure maximum flexibility in establishing the range over which the sensors 240, 250 must be active during operation.

Any potential issues related to backlash in the rotating mechanism, comprising the mounting member 168 and the switch cam 166, driving the potentiometer 258 and the unit-to-unit repeatability of assigning a resistance value to the vehicle floor level loading position can be overcome with an onboard memory and the software used in the controller 160 that monitors operation of the lift 10. In an example, backlash can be addressed during design phase, by measuring multiple units in order to determine the average value of the backlash in the system. In an example, backlash can be determined after the lift 10 is assembled and the offset required for a specific lift 10 can be set in the initial programming of the controller 160. As the "effect" of the backlash is dependent on the direction the platform is moving, inputs to the controller 160 can be configured to read direction of the lift platform 70 as being selected by the operator through a handheld control pendant 190 that essentially comprises control switches that can be of a pushbutton type.

The operation of the controller 160 is best illustrated in a combination with the electrical control circuit 159 of FIG. 6. The controller 160 can be a microprocessor-based controller. The controller 160 can be a programmable logic (PLC) controller. The controller 160 can be configured as a relay circuit. The controller 160 is configured to control operation of the sensors 240, 250 based on inputs from the potentiometer 258 and control operation of the light assembly 500. The controller 160 can be also configured to receive various input signals from limit switches and potentiometer 258, process the inputs in accordance with position and motion defining logic and output signals to control operation of the lift 10, including control of the motion of the lift platform 70 and control of various annunciators employed within the lift 10.

For monitoring operation of the sensors 240, 250, the logic within the controller 160 incorporates use of the resistance values from the potentiometer 258. In a non-limiting example, the method of monitoring motion of the lift platform 70 can comprise a step of dividing the motion of the lift platform 70 into four zones, as shown in Table 1 below, although more or less zones are also contemplated herewithin. In an example, Zone and 1 and Zone 2 can be integrated with each other, where the Amber warning light is turned on essentially when the lift platform 70 begins to move. The orientation of these zones is essentially same relative to the vehicle floor level position. Accordingly, one step involved setting up a system into which the vehicle floor level loading position can be programmed or "memorized". Accordingly, the other positions could be programmed as "fixed" values. Each zone in Table 1 is associated with resistance measured by the controller 160 from the potentiometer 258.

TABLE 1

Lift Platform Motion Zones

| Zone | Resistance Range | Controller Action |
|---|---|---|
| 1 | 0-1,300 Ω (Stowed to Partially Deployed) | No Action |
| 2 | 1,301-1,839 Ω (Floor Level) | 1. Turn on Amber warning light 2. S3 & S4 AND S1 & S2 - "Down" Interlock Only |
| 3 | 1,840-1,900 Ω (Occupied Transition range) | 1. Maintain Amber warning light 2. S3 & S4 Relay ONLY 3. S1 & S2 Buzzer and Flash 226 (Beacon Light) |
| 4 | 1,901-10,000 Ω (Below Floor Level) | 1. Maintain Amber warning light 2. S1 & S2 Buzzer and Flash 226 (Beacon Light) |

It is to be understood that potentiometer 258 can be replaced with additional limit switches and redesigned switch cam 166, as the platform position sensor, where the additional limit switches would be positioned to provide incremental position signals to the controller 160. It is to be further understood that the above described rotary potentiometer 258 can be replaced with a linear type potentiometer, as the platform position sensor, that would be mounted on the cylinder 36.

The lift platform movement control device can be provided as a device 260, particularly as the bridgeplate 130 can be a component of the lift platform 70. Briefly, the device 260 comprises a cam-shaped edge surface on each end of the bridgeplate; two arms, each arm being pivotally mounted at a rear of the platform and being spring loaded for a downward bias such that in a default state the platform can be disposed generally horizontally in a bridging position, the two arms being rigidly connected therebetween so that the two arms substantially rotate in unison with each other, the two arms being in a contact with the platform; two cables, each cable from the two cables having one end connected to a respective arm and having an opposite end connected to a lower arm of a platform moving mechanism; and a cam operated mechanism, the cam operated mechanism configured to pull the cable as the platform is being lowered, through the platform moving mechanism, from a floor level position; where each cable is configured (routed) to pull against a respective arm, as the platform is being lowered from the floor level position and raising the respective arm against the cam-shaped edge surface into a generally vertical barrier position.

Figure 15:
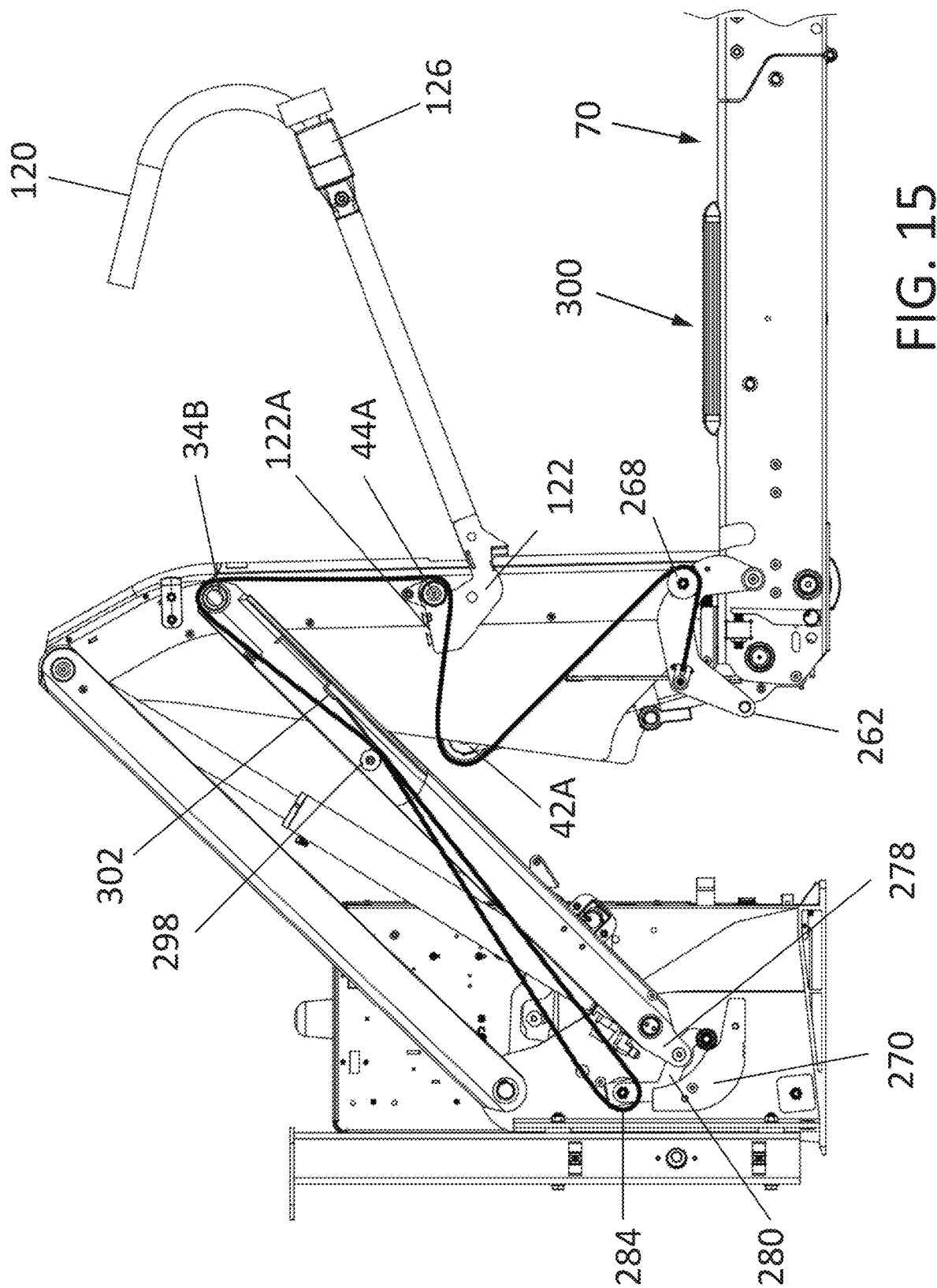
FIG. 15 illustrates a partial perspective view of the lift showing bridgeplate locking device with a cable routing.
Figure 16:
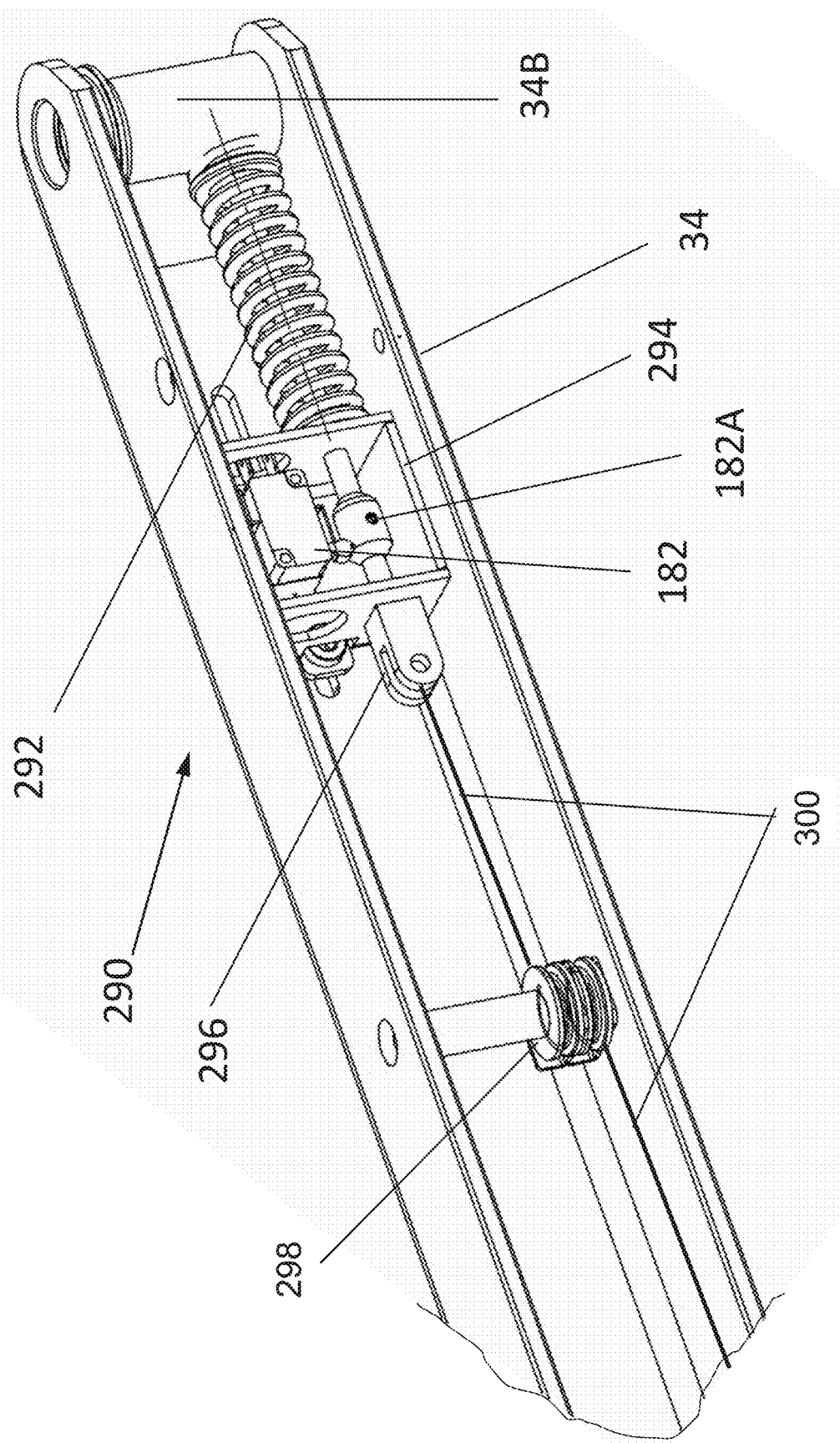
FIG. 16 illustrates a partial perspective view of the lift showing bridgeplate locking device with a cable routing and over tension assembly.

Now in reference to FIGS. 13-16 with a further reference to FIG. 5, the device 260 comprises a flange 131 on each end of the bridgeplate 130. Each flange 131 can be provided as a separated member that is fastened to the bridgeplate 130. The flange 131 has two ends. An edge abutment 132 is disposed on one end. The other end is in a pivotal connection with the platform 70 at a pivot 135. An edge surface is provided between the two ends and has a convex edge surface portion 133 and a concave edge surface portion 134 disposed between the convex edge surface portion 133 and the edge abutment 132. At least the convex edge surface portion 133 provides a cam-shaped edge surface during operation of the lift 10 as it will be explained further in this document. The edge abutment 132 extends outwardly from the convex edge surface portion 133. There is a first pivotal connection (pivot) 135 between another end of the flange 131 and the rear end of the lift platform 70. The device 260 further comprises two first arms 262. Each first arm 262 is being spring loaded for a downward bias, such that in its default state, the bridgeplate 130 is in its bridging (deployed) position. Such position can be also referred to as one terminal position of the bridgeplate 130. Each first arm 262 being disposed adjacent a respective flange 131 and has an arc shaped defining two ends. A second pivotal connection (pivot) 264 connects one end of each first arm 262 to the rear end of the lift platform 70 with. A rod 266 rigidly connects opposite ends of the two first arms 262. In other words, two first arms 262 are being rigidly connected therebetween, by way of the rod 266, so that the two arms substantially rotate in unison with each other. Two optional rollers or bearings 267 can be also provided. Each roller 267 is mounted on the rod 266 for a rotation thereabout and is being disposed adjacent a respective first arm 262. Each roller 267 contacts the convex edge surface portion 133 and the concave edge surface portion 134 of a respective flange 131 during operation of the lift 10. When the roller 267 contacts the concave edge surface portion 134, the roller 267 is stopped against the abutment 132. Rollers 267 reduce rotational friction between the first arms 262 and flanges 131. However, it is contemplated herewithin the rod 266 can directly contact the cam-shaped edge surface. The peripheral surface of the rod 266 can be also coated with a polymer to reduce friction during operation. Device 260 further comprises a cam operated mechanism that is configured to pull the cables 300 as the lift platform 70 is being lowered, through the parallelogram mechanism 30, from a floor level position, where each cable 300 is configured (routed) to pull against a respective first arm 262, as the lift platform 70 is being lowered from the floor level position and raising the respective first arm 262 against the cam-shaped edge surface into a generally vertical barrier position. The cam operated mechanism comprises two second arms 270. Each second arm 270 is mounted stationary on one end of the base 20 and, more particularly to one or both of the supports 26 and 27. Each second arm 270 comprises an upwardly disposed straight edge surface portion 272, an upwardly disposed concave edge surface portion 274 and a generally vertically disposed riser 276. The riser 276 connects the upwardly disposed straight edge surface portion 272 with the upwardly disposed concave edge surface portion 274. An extension 278 is provided on each lower arm 34 in the parallelogram mechanism 30. The extension 278 extends outwardly from the pivotal connection 34A. Two movable links 280 are also provided. Each movable link 280 comprises a Z-shaped body, a roller 282 mounted for a rotation on one end of the link 280, a sheave 284 mounted on an opposite end of the movable link 280, and a third pivotal connection 286 between a respective extension 278 and the sheave 284 mediate the ends of the movable link 280. FIGS. 15-16 also illustrates a cable spool 298, being mounted within the arm 34 at a distance from the housing 294. It would be understood that the device 260 comprises two cable spools 298, each cable spool 298 being mounted within the respective lower arm 34. Two cables 300 are spaced apart with each other about a width of the lift platform 70. Now in a particular reference to FIG. 15, each cable 300 is aligned with a respective lower arm 34. Each cable 300 has one end thereof affixed to a respective first arm 262 and has another end thereof anchored to lower arm 34, for example at an anchor 302. Each cable 300 is being wrapped around each of a respective sheave 284, the spool 298, the pivotal connection 34B between the lower arm 34 and the vertical arm 38, a sheave 268 on the respective first arm 262 and pivots 42A and 44A in the elbow assembly 40, where each pivot 42A and 44A can be also adapted with a sheave for ease of movement of the cable 300. In this position, the roller 267 is lodged within the concave edge surface portion 134 of a respective flange 131. In operation, each movable link 280 moves upwardly on a respective second arm 270 and outwardly from the one end of the lift platform 70 when the parallelogram mechanism 30 moves the lift platform 70 from the stowed position toward the deployed position. When the movable link 280 moves in this way, each cable 300 rotates a respective first arm 262 in a first direction, being a clockwise direction in FIGS. 13-15, in a response to an upward and outward movement of the respective movable link 280. Further, the respective first arm 262, when rotating in the first direction, causes, through a respective flange 131, and more particularly through the convex edge surface portion 133, a rotation of the bridgeplate 130 into a generally vertical barrier position, which is one terminal position of the bridgeplate 130. In this manner, when the bridgeplate 130 is raised to the top of its travel any force onto now generally vertical bridgeplate 130, that attempts to pivot the bridgeplate 130 in the opposite direction toward the bridging position, will only force the roller 267 against the abutment 132. In other words, the abutment 132 functions as a stop to prevent undesirable movement of the roller 267. Thus, the first arm 262 is configured to absorbs the load without transferring this load to the operating cable 300. Now, each movable link 280 moves downwardly on a respective second arm 270 and inwardly toward the one end of the lift platform 70 when the parallelogram mechanism 30 moves the lift platform 70 from the deployed position toward the stowed position. Further, each first arm 262 rotates in a second direction, being a counter-clockwise direction in FIGS. 13-15, due to the spring-load bias. Then, the respective first arm 262, when rotating in the second direction, causes, through the respective flange 131, a rotation of the bridgeplate 130 into a generally horizontal bridging position.

Thus, the bridgeplate 130 is mounted for a pivotal movement between two terminal positions: a bridging position where the bridgeplate 130 is disposed generally horizontally to bridge the gap between the baseplate 21 and the end 76 of the first lift platform section 74 when the lift platform 70 is being in the floor level position and an inboard barrier position where the bridgeplate 130 is disposed generally vertically.

Furthermore, the bridgeplate 130 deploys quickly and locks in the inboard barrier position. In this position, the bridgeplate 130 forms a barrier that is substantially vertical and is locked, by way of at least first arms 262 and flanges 131 cooperating with each other, so that the mechanism that raises and lowers the bridgeplate 130 is not be loaded in the event of impact by a wheelchair (not shown) onto the when the bridgeplate 130 when lift platform 70 is particularly in the deployed (ground level loading/off-loading) position.

Thus, the device 260 controls movement of the bridgeplate 130 in at least that failure of the bridgeplate 130 to remain in the vertical barrier position will not meet applicable standards and will prevent designed operation of the lift platform 70.

On some conventional lifts in use, the mechanism that articulates the bridgeplate is also a structure that absorbs the load in the event of an impact when the lift is at ground level. With the above described mechanism, in the event a load is applied to the bridgeplate 130 at ground level, the mechanism that articulates the bridgeplate 130 is not loaded. Accordingly, it is less likely to experience malfunctions that are the result of undetected damage to the articulation mechanism.

The lift 10 can comprise a tension overload annunciation device 290, best illustrated in FIGS. 5 and 16. The tension overload annunciation device 290, when provided, is mounted within one or both lower parallel arms 34. Each tension overload annunciation device 290 comprises a spring 292. The spring 292 is seated, at one end, on the pivot 34B. The spring 292 is connected, at the other end, to the cable 300 through a movable hollow housing 294. As is further illustrated in FIG. 16, the other end of the spring 292 rests against an exterior wall surface of the housing 294 and the cable 300 is connected to the housing 294, for example, with a clevis 296. A bridgeplate cable overload switch 182 is mounted stationary in one arm 34 and within the housing 294. In other words, a movement of the housing 294 does not move the cable overload switch 182. A switch target 182A is mounted with the housing 294 for a movement therewith. The bridgeplate cable overload switch 182 is operable to detect tension of the cable 300 based on the load disposed on the lift platform 70 during operation. The switch 182 may not detect any load with the properly operable acoustic sensors 240, 250. Without acoustic sensors 240, 250, with the occupant load on the lift platform 70, the tension onto the cable 300 increases with the target 182A moving to engage a roller arm on the bridgeplate cable overload switch 182. Thus, the bridgeplate cable overload switch 182 can be used as a redundant load monitoring (safety) device. Although, bridgeplate cable overload switch 182 has been illustrated as mechanical type limit roller switches, other switch types, for example such as proximity type switches, reed type switches, etc, can be used within the lift 10.

Thus, in an event the cable 300 is overloaded, the cable 300 pulls against the heavy spring 292 mounted at the front of one of the lower parallel arms 34. As the spring 292 compresses, the bridgeplate cable overload switch 182 is activated and generates an output signal that is used by the controller 160 to disable the "Down" function, initiated for example, through the pendant 190.

Furthermore, in an unlikely failure event of acoustic sensors 240 and 250, the tension overload annunciation device 290 can serve as a secondary means of detecting a load on the bridgeplate 130, thereby enhancing occupant safety. Further, in the event of mis-use or other unforeseen circumstances, should the cable 300 become overloaded, the tension overload annunciation device 290 stops the downward movement of the lift platform 70 preventing further loading of the cable 300 and possible cable breakage.

It will be understood that the tension overload annunciation device 290 is integrated with the device 260, in at least with the connection between the cable 300 and the housing 294. The tension overload annunciation device 290 is also configured to control movement of the lift platform 70.

The lift platform movement control device can be provided as a lift platform lock 400 of FIGS. 17-21. Such lock 400 is configured to mechanically retain the lift platform 70 in a stowed position of FIG. 1. More specifically, the lock 400 is integrated with the control enclosure 202. Since the lift platform 70 is retained in a stowed position, the lock 400 can be referred to as a stow lock or as a lift platform lock.

Briefly, the lock can comprises an actuator, the actuator mounted on a vertically disposed stationary wall, a movable portion thereof is configured to move in a vertical direction; a first arm, the first arm mounted in a pivotal connection with each of the actuator and the vertically disposed stationary wall; a second arm with a hook-shaped portion, the second arm being fastened to the first arm, the second arm configured to move linearly along a length of the first arm and to pivot with the first arm; and a spring, the spring connected to each of the second arm and the vertically disposed stationary wall; the actuator operable to pivot the first and second arms upwardly into an unlock position; the spring operable to pivot the first and second arms downwardly into a lock position; the hook-shaped portion engaging a target on a lift platform in the lock position during use of the lock.

Now in more details, the exemplary lock 400 comprises an actuator 410 that is disposed inside the main control enclosure 202. The actuator 410 serves as the prime mover for the lock 400. The actuator 410 has a stationary portion 412 that is affixed to a vertically disposed wall of the control enclosure 202. A movable portion 414 of the actuator 410 moves in a vertical direction. The lock 400 also comprises a first arm 430. The first arm 430 has a first end 432A and a second end 432B spaced apart from the first end 432A along a length of the first arm 430. There is also a first elongated slot 434 through a thickness of the first arm 430 between the first and second ends, 432A and 432B respectively. A length of the first elongated slot 434 is aligned normal to the length of the first arm 430. A first connection 424 is provided between the first end 432A and a vertical wall 203 of a stationary lift control enclosure 202. The first connection 424 is configured to allow a pivotal movement of the first arm 430 about the vertical wall 203. The first connection 424 comprises an aperture 424A through the thickness of the first arm 430 adjacent the first end 432A thereof, an aperture 424B though a thickness of the vertical wall and fasteners 424C. There is also a second arm 440. The second arm 440 has a first end 442A and a second end 442B. The second end 442B is spaced apart from the first end 442A of the second arm 440 along a length of the second arm 440. The second arm 440 also has a void 447 between two second elongated slots 446. A spring seat 452 upstands on one edge of the second arm 440 adjacent the first end 442A of the second arm 440. A notch 448 is provided in a second edge of the second arm 440 adjacent the second end 442B and a taper 449 in the second end 442B of the second arm 440, the taper 449 and the notch 448 defining a hook-shaped portion of the second arm 440. The lock 400 also comprises a second connection 426 between the first arm 430 and the second arm 440. The second connection 426 is configured to move the second arm 440 along a length of the first arm 430. The second connection 426 comprises two apertures 446A through the thickness of the first arm 430 between the first and second ends, 432A and 432B respectively, thereof, the two second elongated slots 446 through the thickness of the second arm 440 between the first and second ends, 442A and 442B respectively. A length of each second elongated slot 446 is aligned along the length of the first arm 430. Each second elongated slot 446 is aligned, during use, with a respective aperture 446A in the first arm 430, and fasteners 446B fastening the second arm 440 to the first arm 430 at each second elongated slot 446 aligned with the respective aperture 446A. A third connection 428 connects the movable portion 414 and the first end 432A of the first arm 430. The third connection 428 comprises a link 416 pivotally coupled to a free end of the movable portion 414 and to a flange 438 on the first end 432A of the first arm 430. The lock 400 additionally comprises a tension spring 450. The tension spring 450 has a first end attached to the spring seat 452 on the second arm 440 and has an opposite second end attached to a spring seat 454 on the vertical wall 203. In use, the actuator 410, when energized during use of the lock 400, moves the movable portion 414 in an upward direction and pivots the first arm 430 and the second arm 440 at the first connection 424 about the vertical wall 203 in the upward direction into an unlock position. The tension spring 450 is configured to pivot the first arm 430 and the second arm 440 in a downward direction into a lock position when the actuator 410 is deenergized. The hook-shaped portion engages a target 420 on a lift platform 70 when the lift platform 70 is in the stowed position. When the lift platform 70 is in the stowed position, the lock assembly 400 is being in the lock position.

Power is provided to the actuator 410 via a small, solid state control board, that can be a part of the controller 160, located near the actuator 410. From the stowed position, when the lift "Deploy" function is activated, the lock control energizes the actuator 410 for approximately 0.75 seconds while the target 420, mounted to the lower part of the vertical arm 38, moves clear of the hook portion of the second arm 440. The target 420 is adapted with an enlarged head so as to prevent lateral disengagement Approximately half way along its length, the first arm 430 is retained by a first connection 424 to check the upward and downward motion of the hook portion. A tension spring 450 serves to return the second arm 440 to the locked position where the hook portion engages the target 420. The lock 400 is accessible for service when the lift platform 70 is at ground level.

The taper 449 on the front of the hook portion enables the system to be "self-locking" when the lift platform 70 is being stowed. As the lift platform 70 is stowed, the target 420 located on the side of the vertical arm 38 contacts the taper 449 of the hook portion. The contact angle is such that the hook portion is forced upwardly as the lift platform 70 reaches its stowed position. Once the target 420 clears the taper 449, the second arm 440 returns to the locked position with the target 420 being disposed within the notch 448.

Figure 17:
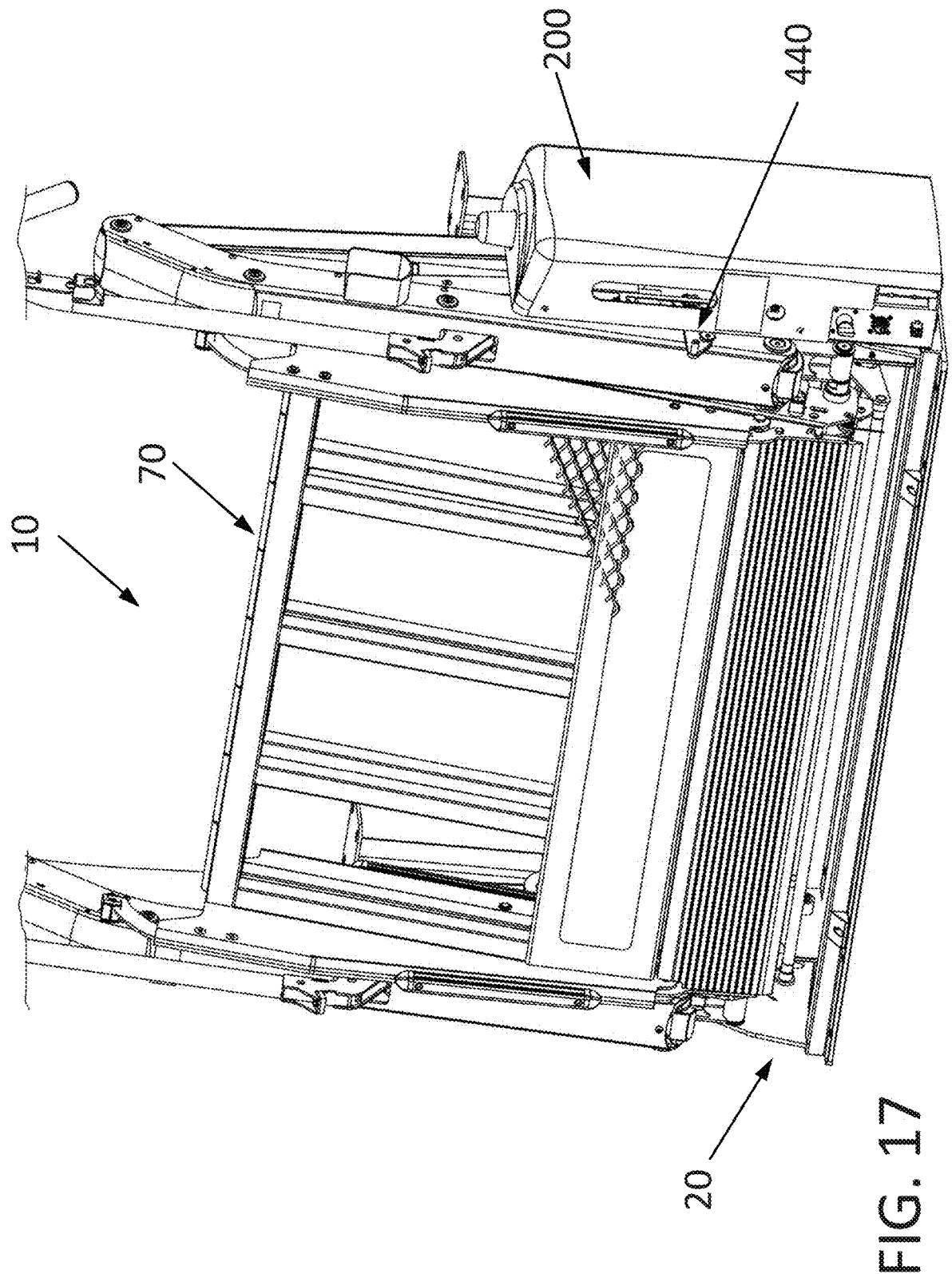
FIG. 17 illustrates a perspective view of the lift with a stow lock assembly shown in a locked position.
Figure 18:
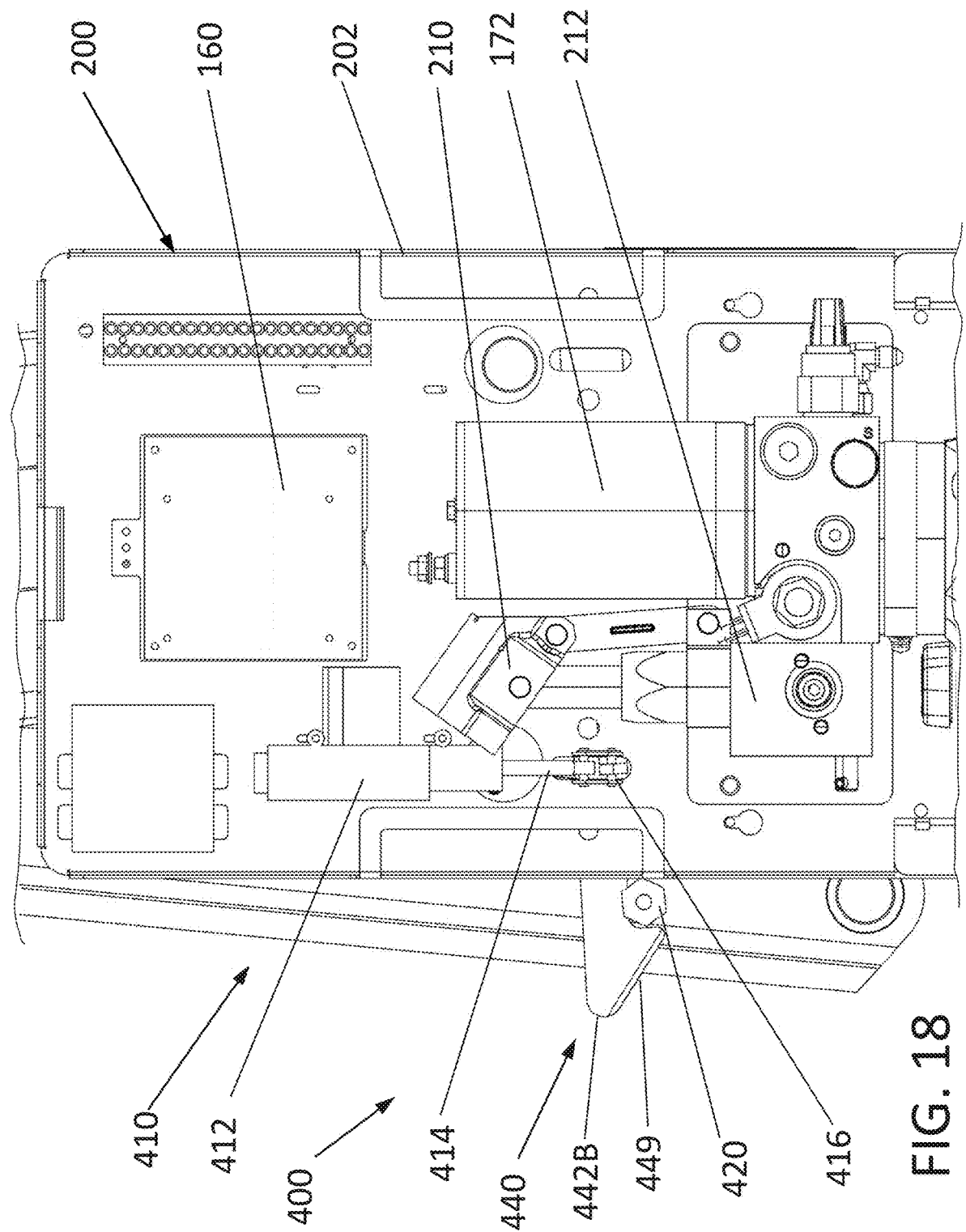
FIG. 18 illustrates a partial elevation view of the lift, particularly showing a stow lock actuator in the stow lock assembly.

When provided, the lock 400 is configured to hold the lift platform 70 in its stowed position should the lift's prime moving system slip over time while the lift platform 70 is stowed. In a non-limiting example, the slippage may occur due to seal degradation and leakage of the hydraulic fluid. The lock 400 is integrated into the control assembly 200. Being integrated into the control assembly 200, the lock 400 can be pre-assembled and mounted to the lift 10 as a unit, thus simplifying the assembly process, reducing the possibility of assembler error and increasing efficiency saving time and cost. Furthermore, the integrated lock 400 can be bench-tested independently of the lift platform 70, thus further reducing overall cost and improving efficiency. The lock 400 is illustrated in FIG. 17 as being mounted on the right side of the lift platform 70. However, the design is modular in that the same parts can be assembled to perform their intended function on the left side of the lift platform 70 in application where the control assembly 200 is also mounted on the left side of the lift 10.

In the event the lift platform 70 drifts out against the lock, the controller 160 is configured to activate the "Stow" function so as to unload the hook portion prior to enabling deployment of the lift platform 70.

It became apparent that locating the lock actuating system within the control assembly would simplify assembly. However, this would mean locking the lift platform 70 from only one side. Doing so has proven quite adequate.

Figure 19:
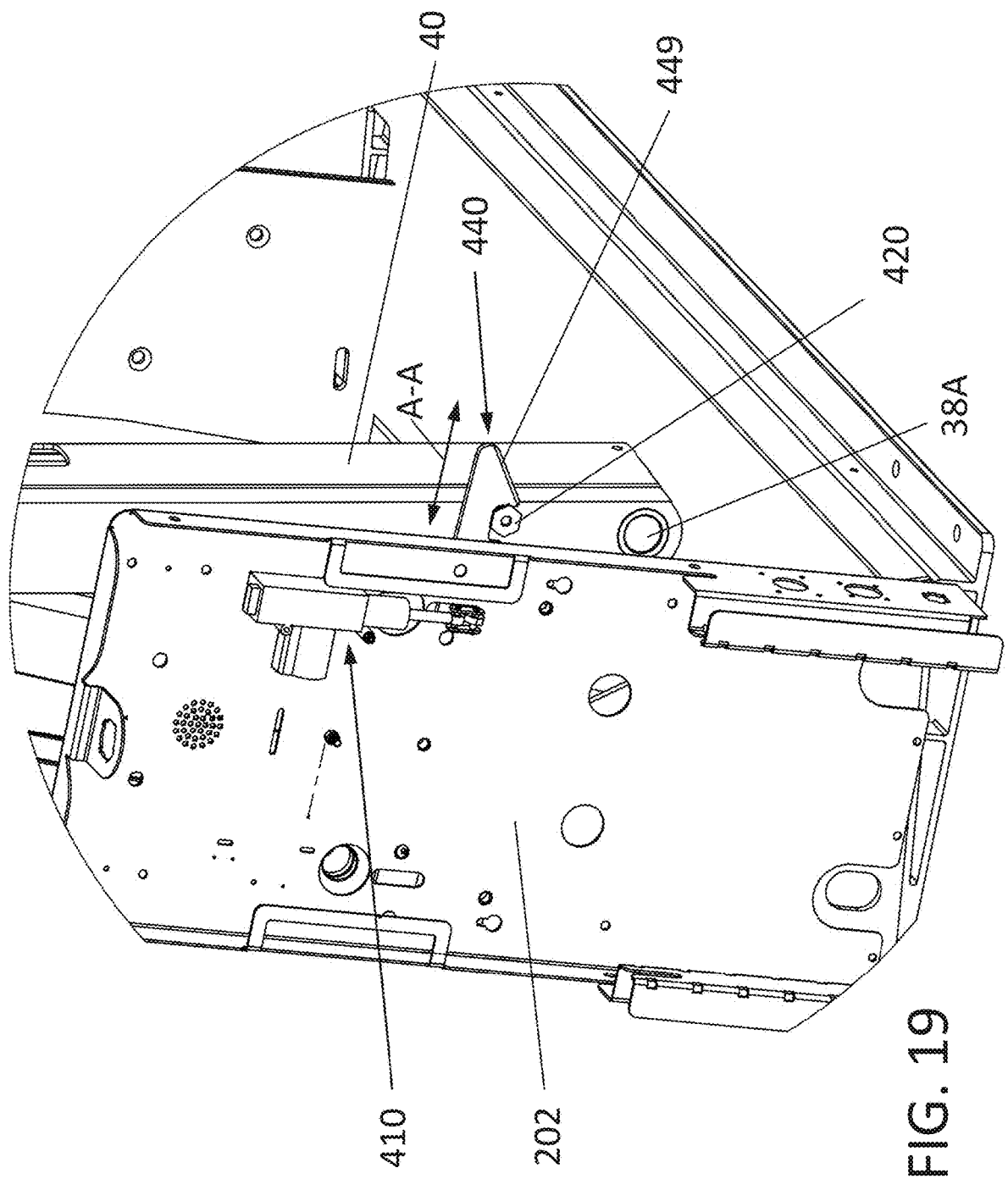
FIG. 19 illustrates a partial perspective view of the control enclosure close-up showing a locking arm of the stow lock assembly in a locked position.
Figure 20:
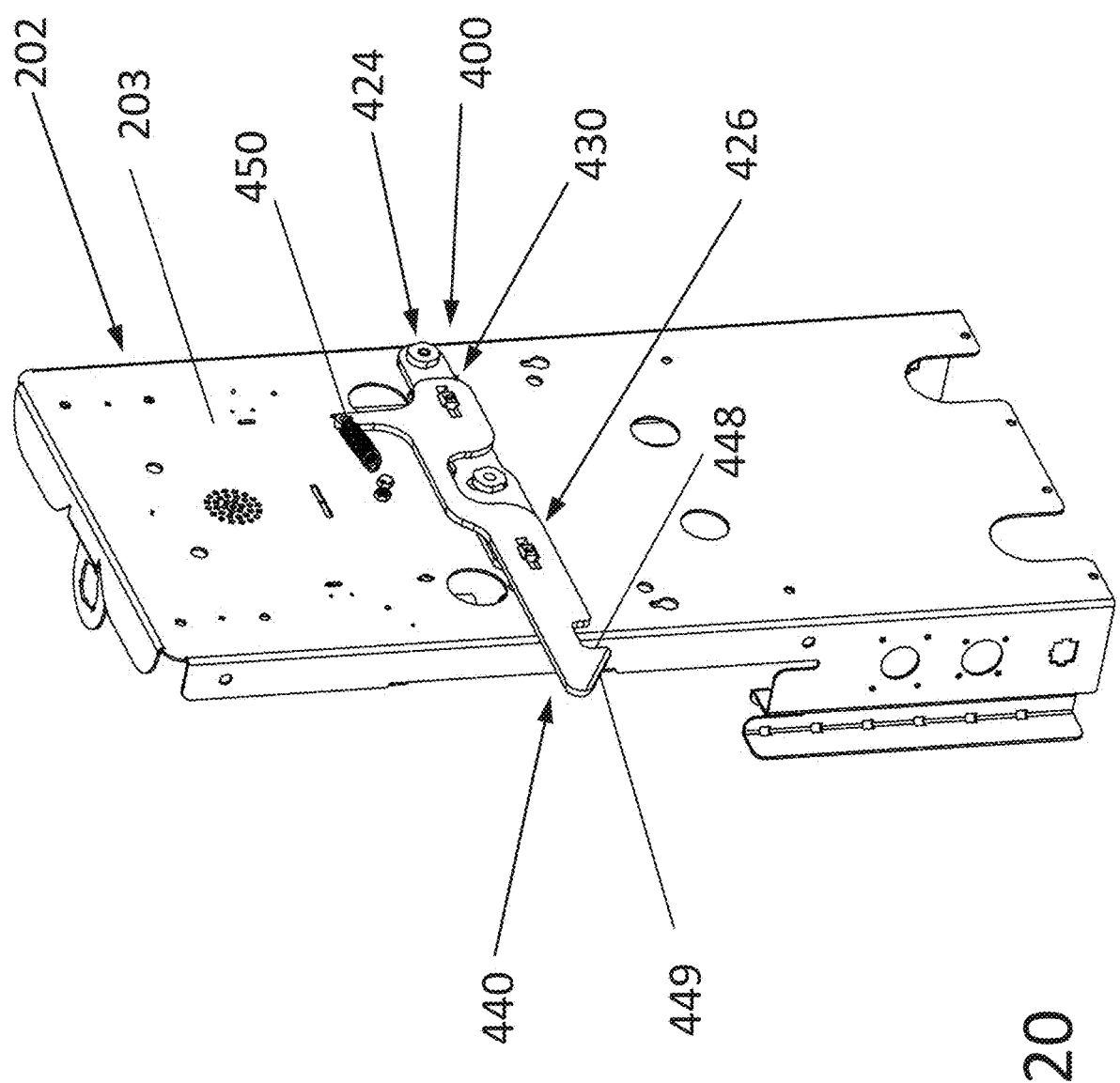
FIG. 20 illustrates a partial perspective view of the control enclosure, particularly illustrating locking arms in the stow lock assembly.
Figure 21:
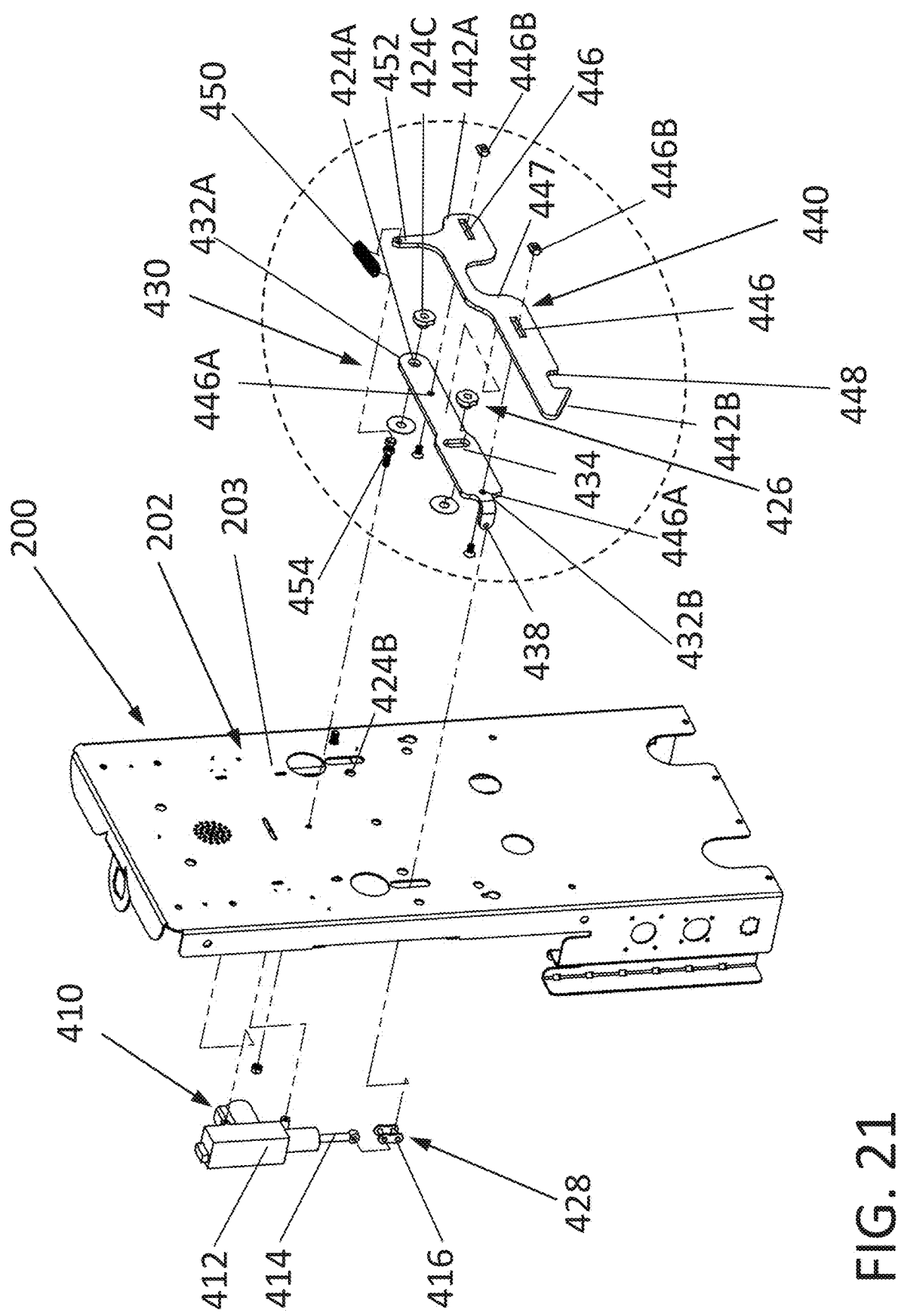
FIG. 21 illustrates an exploded view of the stow lock assembly in a relationship to the control enclosure, partially illustrated.

It would be understood the second connection 426 allows s linear movement of the second arm 440 relative to the first arm 430 along the arrows A-A, best illustrated in FIG. 19. Such linear movement allows an adjustment of the hook portion of the second arm 440 due to manufacturing and installation tolerances. Such adjustment allows repeated engagement between the second arm 440 and the target 420.

However, on the lift 10 that is not a subject to manufacturing and installation tolerances, it is contemplated herewithin that the lock 400 can be only provided with the first arm 430 that incorporates the notch 448 and the taper 449 and the spring seat 452 of the second arm 440. In an example, the apertures 424A and 424B can be made after the first arm 430 is fitted about the target 420. Thus, in this embodiment, the lock 400 comprises an actuator, the actuator mounted on a vertically disposed stationary wall, a movable portion thereof is configured to move in a vertical direction; an arm with a hook-shaped portion, the arm mounted in a pivotal connection with each of the actuator and the vertically disposed stationary wall; and a spring, the spring connected to each of the arm and the vertically disposed stationary wall; the actuator operable to pivot the arm upwardly into an unlock position; the spring operable to pivot the arm downwardly into a lock position; the hook-shaped portion engaging a target on a lift platform in the lock position during use of the lock.

When operating lift 10 in the diminished light conditions, for example such as evening, night or early morning) and/or diminished visibility conditions, for example such as fog, rain, snow and the like, it may be necessary not only to illuminate a top surface of the lift platform but also warn the traffic that the lift platform is being operated.

Figure 22:
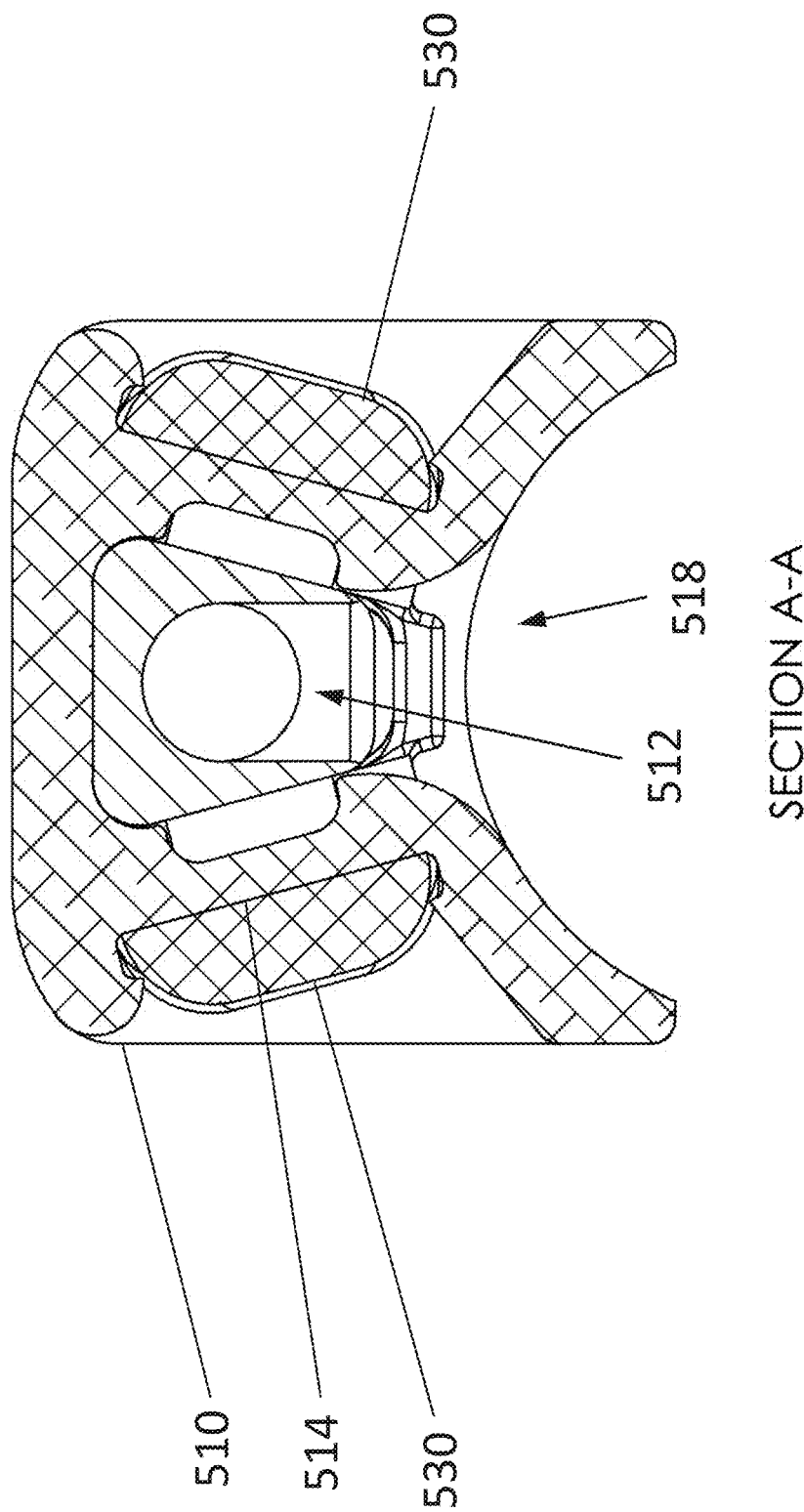
FIG. 22 illustrates a cross-section view of a light assembly along lines XXII-XXII of FIG. 4.
Figure 23:
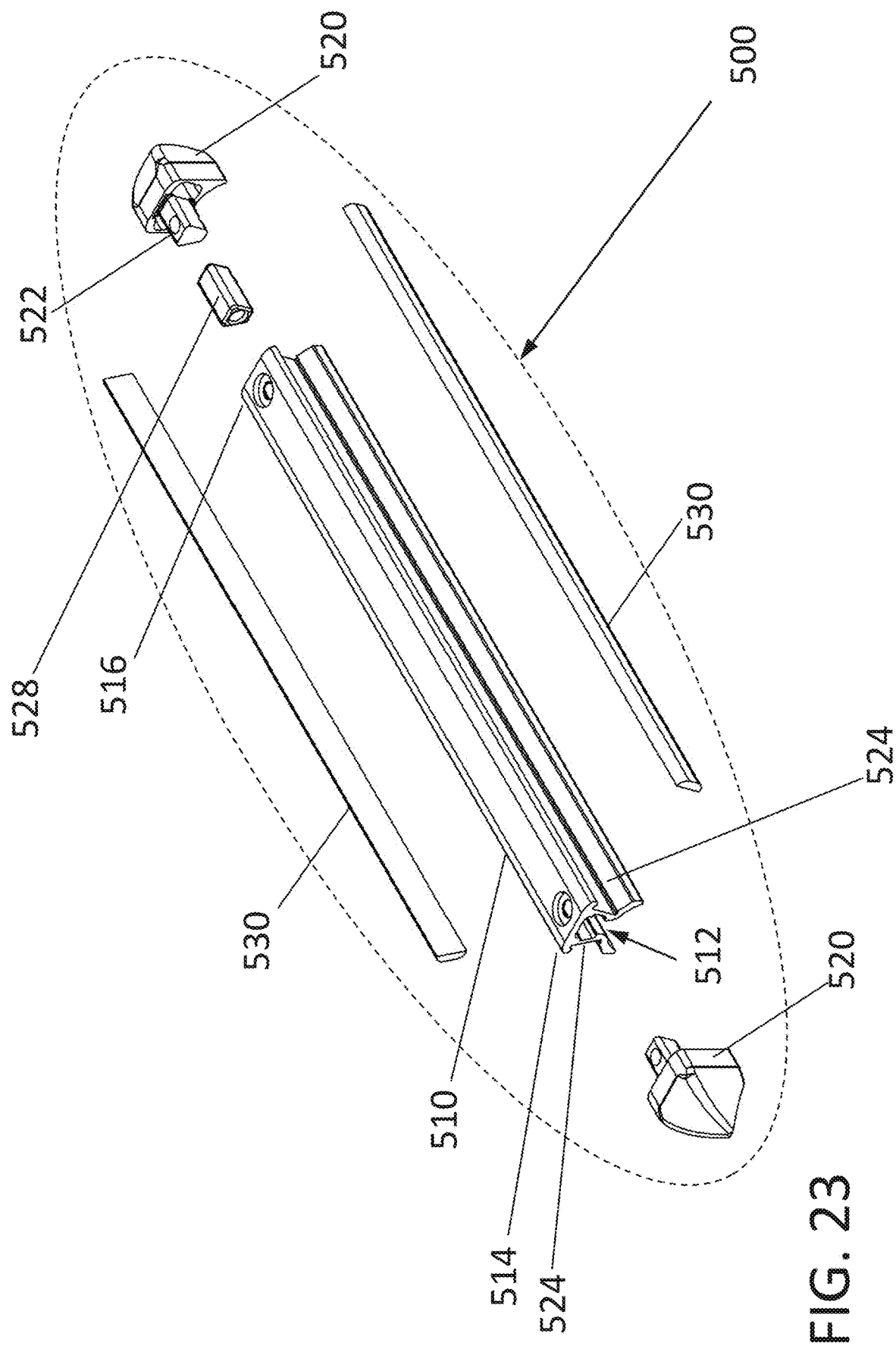
FIG. 23 illustrates an exploded view of the light assembly.

Accordingly, in an embodiment, the above described lift 10 can comprise an optional light 500 positioned and operable to be visible from the area outside of the lift platform 70 that can, among other things, notify traffic that the lift platform 70 has been deployed or in a process of being one of deployed and disposed in the floor level position or being retracted into the stowed position. Now in a reference to FIGS. 22-23, the light 500 is illustrated as a light assembly 500 that comprises a housing 510. The housing 510 can be provided as an extrusion. The extrusion can comprise any one of an aluminum material, a plastic material, a carbon fiber material and any combination thereof. The housing 510 can be provided as a casting comprising a metal. The housing 510 defines a hollow interior 512 and a pair of recessed exterior surfaces or grooves 524 that span the length of the housing 510. The housing 510 also defines a cavity 518 that runs along a length of the housing 510 between terminal ends 514, 516 and that becomes a bottom cavity during use of the lift 10. There are also two end caps 520, each with an abutment 522 sized and shaped to fit into the hollow interior 512. Each end cap 520 closes a respective open end 514, 516 of the housing 510. Each end cap 520 can comprise molded plastic or casted metal that can be an aluminum. The light assembly 500 further comprises two light members that can be provided as light strips 530. The light strip 530 comprises one or more LEDs. The light strip 530 being sized and shaped to fit into respective groove 524. In other words, the housing 510 is configured as a mounting member for the light strips 530. A replaceable ground contact 528 is also provided and also being sized and shaped to fit within the hollow interior 512. When two light strips 530 are provided, each light strip 530 can be configured to emit different color light. In a non-limiting example, one light strip 530 in the light assembly 500 can be configured to emit a clear light on one side, while another light strip 530 can be configured to emit an amber light on the other side. The clear light side can face the surface of the lift platform 70 while the amber side can face the outside of the lift platform 70. Furthermore, each light strip 530 can be operated to emit light of a different type.

In a non-limiting example, the inside light strip 530 can be operated as "constant on", the outside light strip 530 can be operated as a flashing light. Although, the outside amber light can be also operated as "constant on". Thus, different color LEDs are contemplated herewithin for at least one of the outside and inside light applications. It is also contemplated that individual LEDs can replace a continuous light strip 530.

Thus in an embodiment, a light assembly comprises an extrusion, the extrusion comprises, during operation of the modular light assembly, a bottom cavity along a length of the extrusion, a hollow interior and two side grooves along the length of the extrusion and on both sides thereof; two light emitting diode (LED) strips, each LED strip being sized and shaped to fit into a respective groove, the two LED strip coupled to a source of electric power during operation of the modular light assembly to illuminate both sides of the extrusion; a load bearing ground contact; and two ends caps, each end cap with an abutment sized and shaped to fit into the hollow interior, the each end cap terminating a respective end of the extrusion.

It would be understood that the light assembly 500 can be provided with a single light strip 530 even when the housing 510 is adapted with two grooves 524. It would be further understood that the light assembly 500 can be adapted with a single groove 524 and, accordingly, with a single light strip 530. The single light strip 530 can be positioned to either emit light toward the surface of the lift platform 70 or emit light external to the lift platform 70.

At least in reference to FIGS. 2-4, the lift 10 is illustrated as comprising four (4) light assemblies 500, each light assembly 500 being disposed on and along an exposed edge of the first lift platform section 74 and the second lift platform section 100. Although it is contemplated that less than four light assemblies 500 can be provided. In an example, two light assemblies 500 can be provided with each light assembly 500 being disposed on and along an exposed edge of the second lift platform section 100 or being disposed on and along an exposed edge of the first lift platform section 74.

As it can be seen in FIG. 6, the light assembly 500 and, more particularly, the light strips 530 are electrically coupled to the controller 160. The controller 160 controls operation of the light assembly 500 in controlling activation and deactivation of the light strips 530 based on the position or movement of the lift platform 70 as well as mode of operation.

It would be understood that the light assemblies 500 can provide both a means of lighting the platform surface and a (DOT compliant) means of warning to traffic that the lift platform 70 is being operated.

A method of using the lift 10 can comprise a step of lighting the lift platform 70, a step of lighting the area outside of the lift platform 70 and a further step of notifying, with a light visible external to the lift platform 70, an oncoming traffic that the lift platform 70 is one of being deployed at the ground, in a process of being deployed (lowered) toward the ground and in a process of being retracted (raised) toward the stowed position.

A method of annunciating operation of a vehicle's lift with a lift platform can comprise steps of providing one or more light members on the lift platform; and actuating the one or more light members to emit light visible external to the lift platform when the lift platform is being lowered or raised external to the vehicle.

A method of annunciating operation of a vehicle's lift with a lift platform can comprise steps of mounting one or more light members on the lift platform in a position to emit light visible external to the lift platform; and actuating the one or more light members to emit the light when the lift platform is at least one of being deployed at a ground, in a process of being lowered toward the ground and in a process of being raised toward a stowed position within the vehicle.

On some conventional platform lifts, halogen type lights are mounted to the vertical arms, about three feet from the ground mounted. On some conventional platform lifts, lights are mounted on the underside of the handrails. The nearer the light source is at the occupant's level, the less comfort occupants experience. As most occupants are in wheelchairs, the height of the vertical arm mounted lights can be at an eye-level for the majority of occupants. Position of the above described light assembly 500 on the side barriers of the lift platform 70 is inches from the surface of the lift platform 70 and well below the occupant's eye level, thus increasing occupant comfort. Furthermore, light strips 530 are placed within a modular housing 510, thus facilitating ease of replacement. A further advantage of the modular construction is that the light assembly 500 can be assembled with white light on one side and amber on the other. Combined with a means of flashing the amber light, such configuration provides not only a superior distribution of platform surface light but also superior visibility of the equipment at night to oncoming vehicles.

The underside of the lift platform 70 and lower extremities of the vertical arms 38 of the lift 10 come into a contact with the ground or any other surface (for example such as a boarding platform surface) during operation of the lift 10. When the ground is aggressive and uneven, the protective coatings on these extremities become scratched and damaged subjecting the underlying unit to corrosion during repetitive use. This condition is of special concern in areas where snow and ice prevail and even more so when sand and gravel are mixed in.

Figure 24:
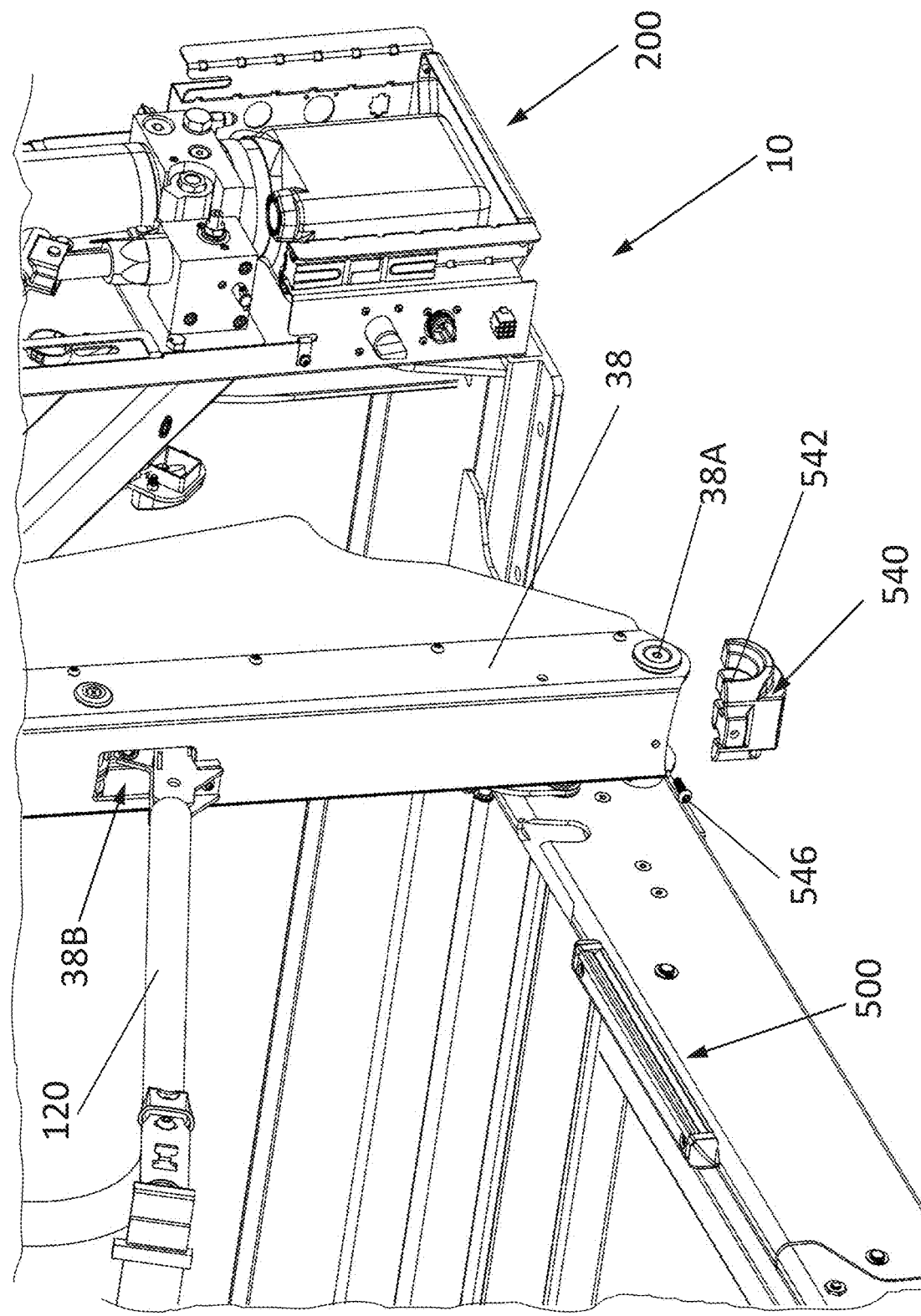
FIG. 24 illustrates a partial perspective view of the lift with a replaceable ground support structure.

Accordingly, in an embodiment of FIG. 24, the above described lift 10 can comprise a replaceable, load bearing ground contact device 540 that contacts the ground ahead of the lower extremity of the vertically disposed arms 38, thus significantly reducing the amount of painted surface that comes in contact with the ground thereby reducing coating damage and, correspondingly, the propensity for corrosion damage. As the ground contact device wears, it can be replaced and routine intervals at significantly less cost and "downtime" than repainting.

The replaceable, load bearing ground contact device 540 can be manufactured from molded plastic. The replaceable, load bearing ground contact device 540 comprises a cavity 542 that fits closely about the pivot 38A which is between the lift platform 70 and the lower end of arms 38. In so doing, as the replaceable, load bearing ground contact devices 540 touch the ground, the load is transferred evenly to the bearing support structure and into the vertical arm structure. In an example, a single fastener 546 can be used to hold the replaceable, load bearing ground contact device 540 in place. The wearable, replaceable surface on the lower end of each vertical arm 38 by way of ground contact device 540 reduces the likelihood of finish damage leading to corrosion. Further, because replaceable ground contact device 540 reduces the amount of the underside surface that contacts the ground, the amount of foreign matter (mud and slush) that can be picked up and transferred to the inside of the vehicle is also minimized.

Figure 25:
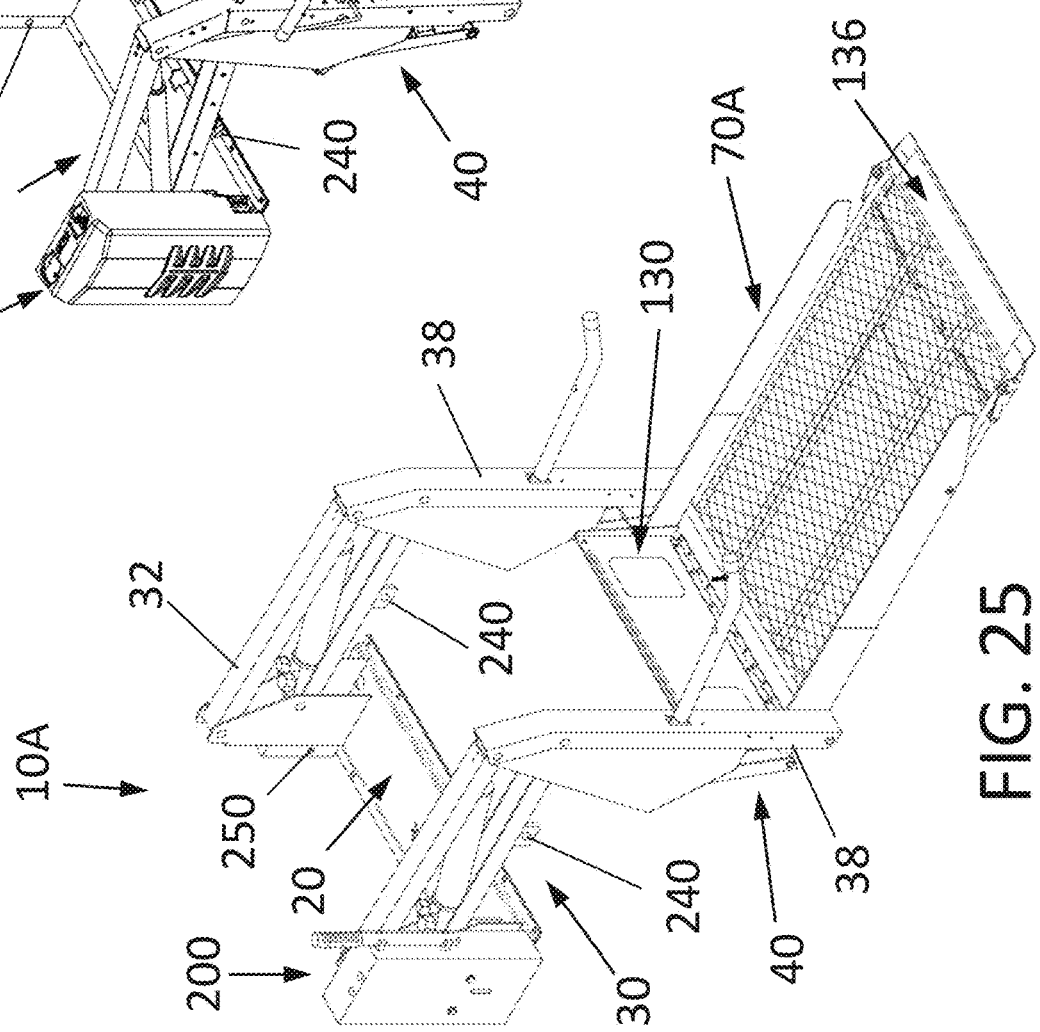
FIG. 25 illustrates a perspective view of a lift with a single lift platform being disposed in a deployed position.

FIG. 25 illustrates an exemplary lift 10A that comprises a base 20, a parallelogram mechanism 30 mounted on the base 20, a lift platform 70A that is carried by the parallelogram mechanism 30, a control assembly 200 for actuating the lift platform 70A through the parallelogram mechanism 30, an occupant retention apparatus that incorporates a bridgeplate 130 and an roll stop 136, both pivotally coupled to the lift platform 70A, and an electrical control circuit 159 to accomplish different motion patterns and annunciations. The lift platform 70A is illustrated as a single piece platform. Also illustrated are sensors 240 and 250. The control assembly 200 is illustrated as being disposed on the left side of the lift 10A. Light assembly 500 is not illustrated in FIG. 25 but can be installed in accordance with above described embodiments. Similarly, lock 400 can be integrated with the control assembly 200 on the left side of the lift 10A.

Figure 26:
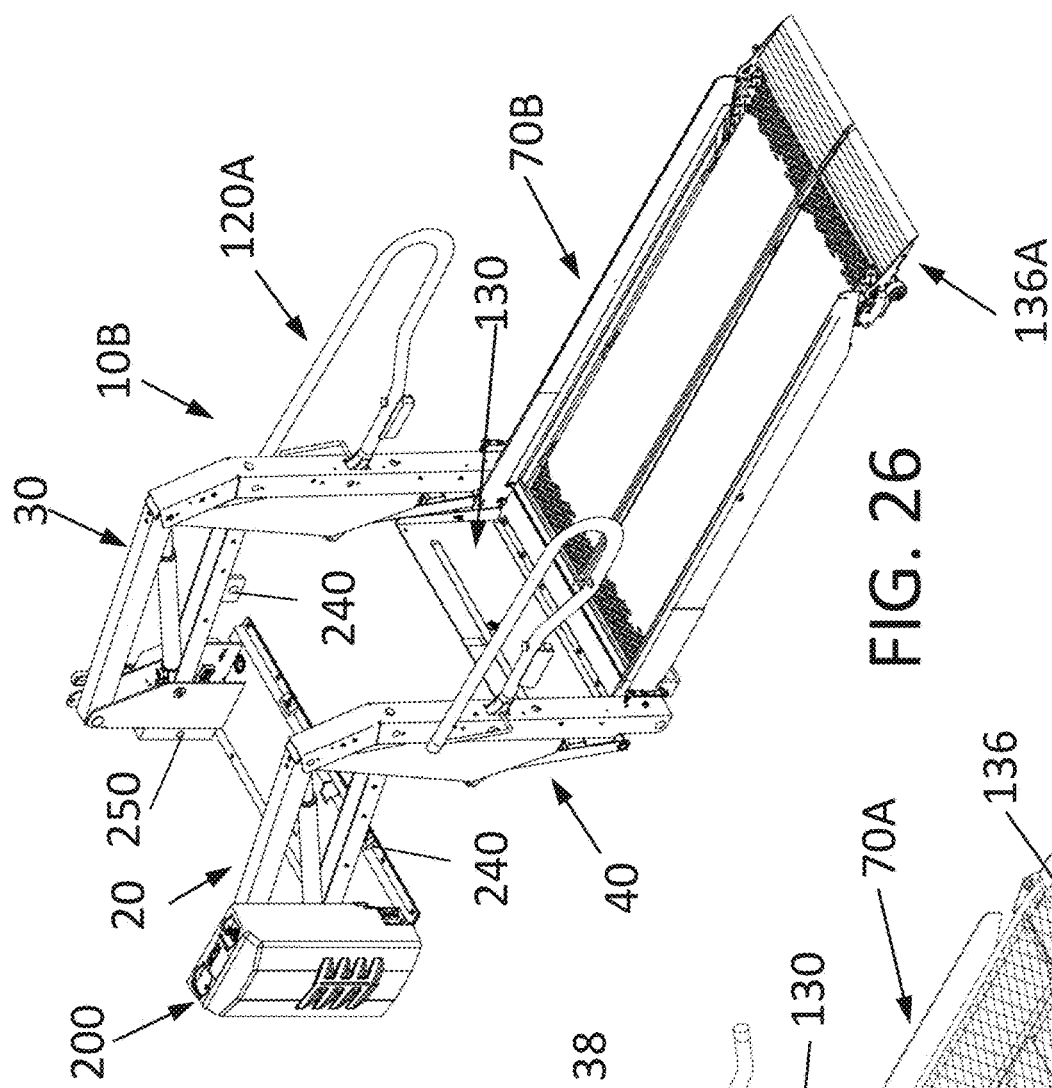
FIG. 26 illustrates a perspective view of a lift with a split lift platform being disposed in a deployed position and with a single bridgeplate being disposed in a barrier position.

FIG. 26 illustrates an exemplary lift 10B that comprises a base 20, a parallelogram mechanism 30 mounted on the base 20, a lift platform 70B that is carried by the parallelogram mechanism 30, a control assembly 200 for actuating the lift platform 70A through the parallelogram mechanism 30, an occupant retention apparatus that incorporates a bridgeplate 130 and an roll stop 136, both pivotally coupled to the lift platform 70B, and an electrical control circuit 159 to accomplish different motion patterns and annunciations. The lift platform 70B is illustrated as a two-piece split platform, hinged in a direction that is perpendicular to the base 20. Also illustrated are sensors 240 and 250. The control assembly 200 is illustrated as being disposed on the left side of the lift 10B. Light assembly 500 is not illustrated in FIG. 26 but can be installed in accordance with above described embodiments. Similarly, lock 400 can be integrated with the control assembly 200 on the left side of the lift 10B. The handrails 120A are being illustrated as essentially having a U-shape, however the above illustrated handrails 120A can be also used within any one of the above described lifts.

Figure 27:
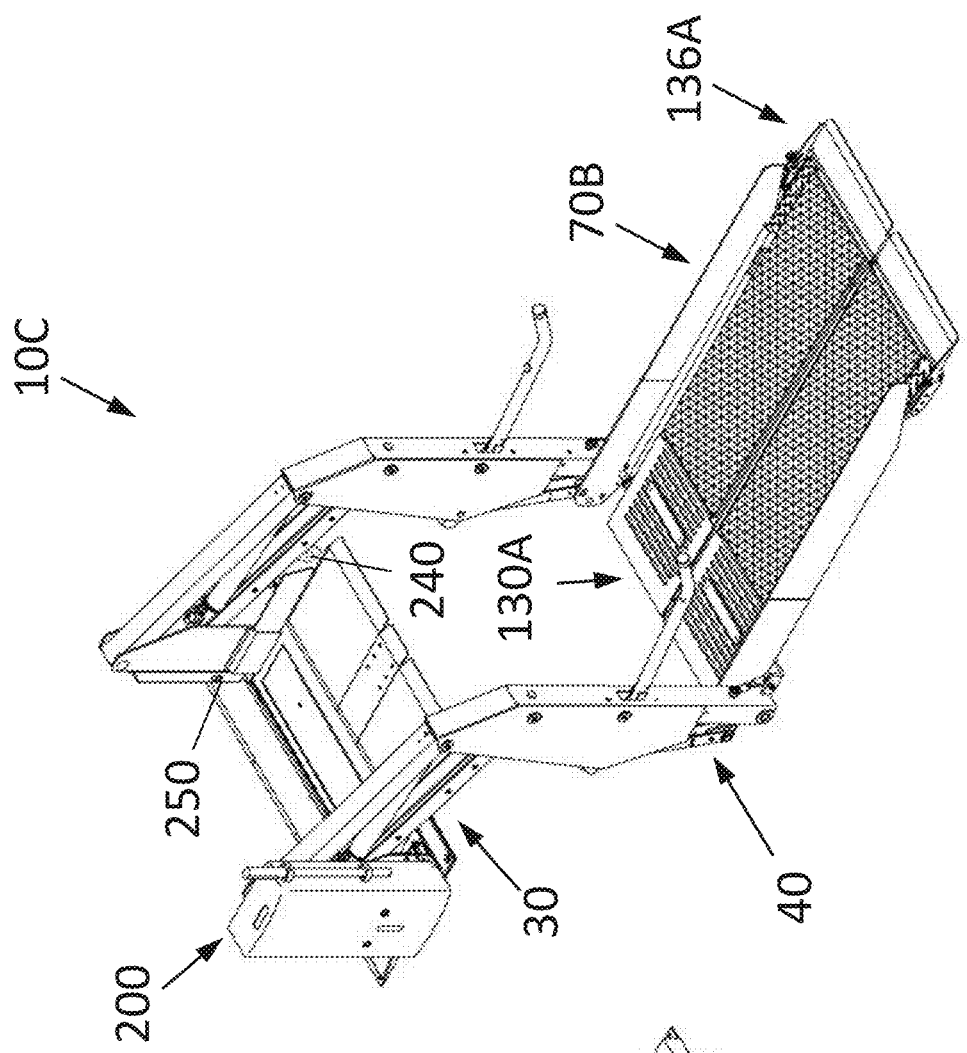
FIG. 27 illustrates a perspective view of a lift with a split lift platform being disposed in a deployed position and with a split bridgeplate being disposed in a barrier position.
Figure 28:
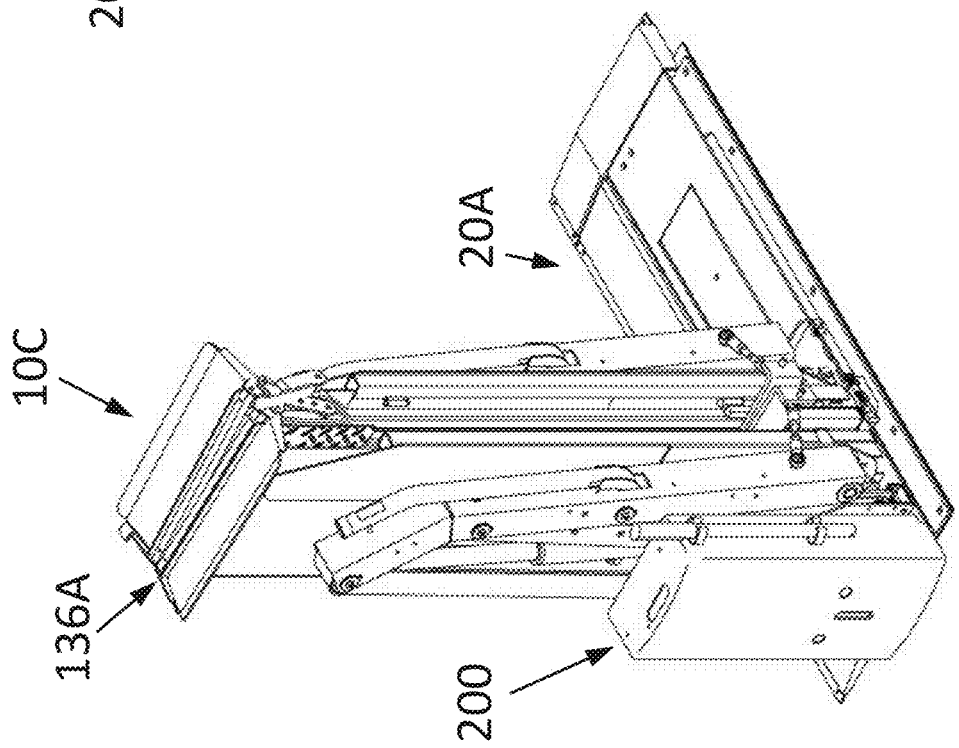
FIG. 28 illustrates a perspective view of the lift of FIG. 27 with a split bridgeplate in a stowed position, biased adjacent the control assembly.

FIGS. 27-28 illustrate an exemplary lift 10C that comprises a base 20A, a parallelogram mechanism 30 mounted on the base 20A, a lift platform 70B that is carried by the parallelogram mechanism 30, a control assembly 200 for actuating the lift platform 70B through the parallelogram mechanism 30, an occupant retention device that incorporates a bridgeplate 130A and an roll stop 136A, both pivotally coupled to the lift platform 70B, and an electrical control circuit 159 to accomplish different motion patterns and annunciations. The lift platform 70B is illustrated as a two-piece split platform, hinged in a direction that is perpendicular to the base 20. Also illustrated are sensors 240 and 250. The control assembly 200 is illustrated as being disposed on the left side of the lift 10C. Light assembly 500 is not illustrated in FIGS. 27-28 but can be installed in accordance with above described embodiments. Similarly, lock 400 can be integrated with the control assembly 200 on the left side of the lift 10C. Lift 10C is configured so that the lift platform 70B also slides across the base 20A to bias the lift platform 70B and the parallelogram mechanisms 30 toward the control assembly 200 in the stowed position.

Figure 29:
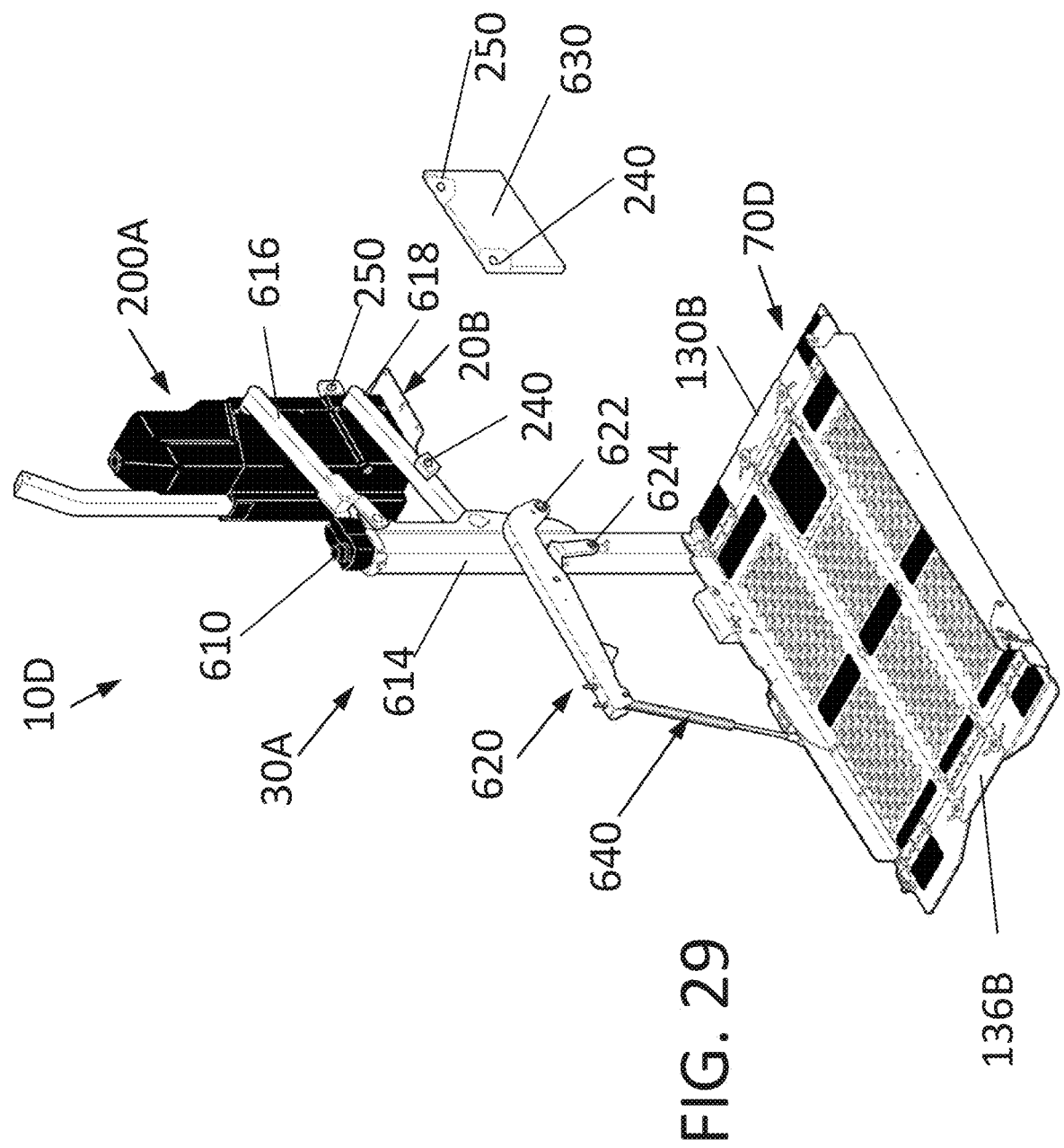
FIG. 29 illustrates a perspective view of a lift with a single arm carrying a one-piece lift platform, shown in the deployed position.

FIG. 29 illustrates an exemplary lift 10D that comprises a base 20B, a mechanism 30A mounted on the base 20A, a lift platform 70D that is carried by the mechanism 30A, a control assembly 200A for actuating the lift platform 70D through the mechanism 30A, an occupant retention apparatus that incorporates a bridgeplate 130B and an roll stop 136B, both pivotally coupled to the lift platform 70D, and an electrical control circuit 159 configured to accomplish different motion patterns and annunciations. The lift platform 70D is illustrated as a one-piece platform. Also illustrated are sensors 240 and 250. One sensor 240 is mounted to the lower arm, as is described above. The other sensor 240 is mounted on a remotely disposed mounting member 630, that can be a simple plate-shaped member. One sensor 250 is mounted external to the control assembly 200A. The other sensor 250 is mounted on a remotely disposed mounting member 630. The control assembly 200A is illustrated as being disposed on the left side of the lift 10B. Light assembly 500 is not illustrated in FIG. 29 but can be installed in accordance with above described embodiments. The mechanism 30A comprises a linear actuator 610 mounted within a hollow interior of a tubular member 614. The linear actuator 610 is configured to fold and unfold the lift platform 70D through an arm 44A0 and gas spring 640. The arm 620 is pivotally connected to the exterior of the tubular member 614 with pivots 622 and 624. Arms 616 and 618 are pivotally coupled to each of the control assembly 200A and the tubular member 614. Light assembly 500 is not illustrated in FIG. 29 but can be installed in accordance with above described embodiments.

Accordingly, in various embodiments:

Embodiment A. A lift for a vehicle, the lift comprising:

a platform configured to support an occupant thereon;

a parallelogram mechanism to move the platform between a stowed position and a deployed position, the parallelogram mechanism comprising two lower arms, two upper arms, two vertical arms and two cylinders, each cylinder is in a first pivotal connection between a stationary end of each cylinder and a lower arm and in a second pivotal connection between a movable end of each cylinder and an upper arm;

a base to mount the parallelogram mechanism to a vehicle floor, each lower arm is in a pivotal connection with each of the base and a respective vertical arm, each upper arm is in a pivotal connection with each of the base and the respective vertical arm;

a hydraulic system to move the platform through the parallelogram mechanism;

an occupant retention apparatus;

a bridgeplate mounted at one end of the platform for a movement between two terminal positions;

a control unit to control a movement of one of the platform, and the bridgeplate; and a platform movement control device.

Feature A. The lift of Embodiment A, wherein the platform movement control device comprises:

two first sensors, each sensor from the two first sensors mountable to a respective lower arm in the parallelogram mechanism, the two first sensors configured to monitor a transfer bridging plate area when the platform is at a vehicle floor level position;

two second sensors, each sensor from the two second sensors mountable, when installed on the vehicle, rearward of the two first sensors, the two second sensors configured to monitor vehicle door threshold area while the platform is at the vehicle floor level position;

collars, each collar mounting each sensor so that each sensor is oriented to generate a first detection plume between the two first sensors and a second detection plume between the two second sensors; and a platform position sensor comprising a potentiometer being mounted on one lower arm in the parallelogram mechanism, the potentiometer being actuatable by a pivot connecting one cylinder to the one lower arm, the potentiometer configured to incrementally provide signals associated with positions of the platform between the stowed position and a vehicle floor level position;

each sensor from the two first sensors and the two second sensors comprising a piezoelectric, ultrasonic device capable of creating a detection volume in front of each sensor during operation of the lift;

the two first sensors generating a first control signal when the first detection plume is being interrupted;

the two second sensors generating a second control signal when the second detection plume is being interrupted;

the controller being responsive to the signals from the potentiometer to selectively activate and deactivate the two first sensors and the two second sensors;

the controller being responsive to one of the first and second control signals to control a movement of the bridgeplate and providing and interlock to prevent the movement of the platform when an occupant detected within the transfer bridgeplate area or within the vehicle door threshold area.

Feature B. The lift of Embodiment A, wherein the platform movement control device comprises:

two sensors, each sensor from the two sensors mountable to a respective lower arm in the parallelogram mechanism, the two sensors mounted in locations to monitor a transfer bridgeplate area when the platform is at a vehicle floor level position, each sensor comprising a piezoelectric, ultrasonic device capable of generating a detection plume in front of each sensor during operation of the lift; and two collars, each collar mounting a respective sensor so that each sensor is oriented to generate the detection plume between the two sensors; and a platform position sensor comprising a potentiometer being mounted on one lower arm in the parallelogram mechanism, the potentiometer being actuatable by a pivot connecting one cylinder to the one lower arm, the potentiometer configured to incrementally provide signals associated with positions of the platform between the stowed position and a vehicle floor level position;

the two sensors generating a control signal when the detection plume is being interrupted when the detection plume is being interrupted;

the controller being responsive to the signals from the potentiometer to selectively activate and deactivate the acoustic sensors;

the controller being further responsive to the control signal from the acoustic sensors to control a movement of the platform and to prevent the movement of the platform.

Feature C. The lift of Embodiment A, wherein the platform movement control device comprises:

two acoustic sensors mounted in locations to monitor vehicle door threshold area while the platform is at the vehicle floor level position, each acoustic sensor from the two acoustic sensors comprising a piezoelectric, ultrasonic device capable of generating a detection plume in front of each sensor;

two collars, each collar mounting a respective acoustic sensor to generate the detection plume between the two acoustic sensors during operation of the lift; and a potentiometer being mounted on one lower arm in the parallelogram mechanism, the potentiometer being actuatable by a pivot connecting one cylinder to the one lower arm, the potentiometer configured to incrementally provide signals associated with positions of the platform between the stowed position and a vehicle floor level position;

the two acoustic sensors generating a control signal when the detection plume is being interrupted;

the controller being responsive to the signals from the potentiometer to selectively activate and deactivate the acoustic sensors;

the controller being further responsive to the control signal from the acoustic sensors to control a movement of the platform and to prevent the movement of the platform when the detection plume is being interrupted.

Feature D. The lift of Embodiment A, wherein the platform movement control device comprises:

two acoustic sensors, each acoustic sensor from the two acoustic sensors comprising a piezoelectric, ultrasonic device, the two acoustic sensors mounted and operable to generate a detection plume over one of a transfer bridgeplate area and vehicle door threshold area when the platform is at a vehicle floor level position;

two collars, each collar mounting a respective acoustic sensor to generate the detection plume between the two acoustic sensors during operation of the lift; and a potentiometer being mounted on one lower arm in the parallelogram mechanism, the potentiometer being actuatable by a pivot connecting one cylinder to the one lower arm, the potentiometer configured to incrementally provide signals associated with positions of the platform between the stowed position and a vehicle floor level position;

the two acoustic sensors generating a control signal when the detection plume is being interrupted;

the controller being responsive to the signals from the potentiometer to selectively activate and deactivate the acoustic sensors;

the controller being further responsive to the control signal from the acoustic sensors to control a movement of the platform and to prevent the movement of the platform when the detection plume is being interrupted.

Feature E. The lift of Embodiment A, wherein the platform movement control device comprises:

a flange on each end of the bridgeplate, the flange having two ends, an edge abutment disposed on one end, and an edge surface between the two ends, the edge surface having a convex edge surface portion and a concave edge surface portion disposed between the convex edge surface portion and the edge abutment, the edge abutment extending outwardly from the convex edge surface portion.

a first pivotal connection between another end of the flange and the one end of the platform;

two first arms, each first arm being disposed adjacent a respective flange and having an arc shaped defining two ends;

a second pivotal connection between one end of each first arm and the one end of the platform;

a rod rigidly connecting opposite ends of the two first arms;

two bearings, each bearing is mounted on the rod for a rotation thereabout and is being disposed adjacent a respective first arm, each bearing contacts a convex surface of a respective flange during operation of the lift;

two second arms, each second arm is mounted stationary on one end of the base, each second arm comprises an upwardly disposed straight edge surface portion, an upwardly disposed concave edge surface portion and a generally vertically disposed riser, the riser connecting the upwardly disposed straight edge surface portion with the upwardly disposed concave edge surface portion;

an extension on each lower arm in the parallelogram mechanism, the extension extending outwardly from a pivotal connection between each lower arm and the stationary end of each cylinder;

two movable links, each movable link comprising a Z-shaped body, a roller mounted for a rotation on one end of the link, a sheave mounted on an opposite end of the movable link, and a third pivotal connection between a respective extension and the sheave mediate ends thereof;

two tension devices, each tension device is mounted within a respective lower arm, each tension device comprising a spring;

two cable spools, each cable spool mounted within the respective lower arm adjacent a respective tension device; and two cables spaced apart with each other about a width of the platform, each cable having one end thereof affixed to a respective first arm and having another end thereof affixed to a respective tension device, each cable being wrapped around each of the sheave, the cable spool, the pivotal connection between the lower arm and the vertical arm, a sheave on the respective second arm and sheaves in the elbow;

each movable link moving upwardly on a respective second arm and outwardly from the one end of the platform when the parallelogram mechanism moves the platform from the stowed position toward the deployed position;

each cable, rotates a respective first arm in a first direction and extends a respective spring, in a response to an upward and outward movement of a respective movable link;

the respective first arm, when rotating in the first direction, causes, through a respective flange, a rotation of the bridgeplate into a generally vertical barrier position;

each movable link moving downwardly on a respective second arm and inwardly toward the one end of the platform when the parallelogram mechanism moves the platform from the deployed position toward the stowed position and when the respective spring compresses and returns to an original position;

each cable, rotates a respective first arm in a second direction, in a response to a downward and inward movement of the respective movable link;

the respective first arm, when rotating in the second direction, causes, through a respective flange, a rotation of the bridgeplate into a generally horizontal bridging position.

Feature F. The lift of Embodiment A, wherein the platform movement control device comprises:

a cam-shaped edge surface on each end of the bridgeplate;

two arms, each arm being pivotally mounted at a rear of the platform and being spring loaded for a downward bias such that in a default state the platform can be disposed generally horizontally in a bridging position, the two arms being rigidly connected therebetween so that the two arms substantially rotate in unison with each other, the two arms being in a contact with the platform;

two cables, each cable from the two cables having one end connected to a respective arm and having an opposite end connected to a lower arm of a platform moving mechanism; and a cam operated mechanism, the cam operated mechanism configured to pull the cable as the platform is being lowered, through the platform moving mechanism, from a floor level position;

each cable configured to pull against a respective arm, as the platform is being lowered from the floor level position and raising the respective arm against the cam-shaped edge surface into a generally vertical barrier position.

Feature G. The lift of Feature F, wherein the cam operated mechanism comprises:

two other arms, each other arm is mounted stationary on one end of the base, each other arm comprises another cam-shaped edge surface having an upwardly disposed straight edge surface portion, an upwardly disposed concave edge surface portion and a generally vertically disposed riser, the riser connecting the upwardly disposed straight edge surface portion with the upwardly disposed concave edge surface portion;

an extension on each lower arm in the parallelogram mechanism, the extension extending outwardly from a pivotal connection between each lower arm and the stationary end of each cylinder;

two movable links, each movable link comprising a Z-shaped body, a roller mounted for a rotation on one end of the link, a sheave mounted on an opposite end of the movable link, and a third pivotal connection between a respective extension and the sheave mediate ends thereof;

the roller rotating, during operation, on another cam-shaped edge surface.

Feature H. The lift of Feature F, wherein the platform movement control device further comprises a tension overload annunciation device installed within one lower arm, the tension overload annunciation device comprises:

a hollow housing deposed for a movement within the one lower arm, the hollow housing having a connection with one end of a respective cable;

a spring, the spring being seated, at one end, on a pivot between the one lower arm and a respective vertical arm, the spring resting against an exterior wall surface of the hollow housing.

a switch mounted stationary within the one lower arm and within the hollow housing, the switch being independent from the movement of the hollow housing; and a switch target being mounted with the hollow housing for the movement therewith;

the switch operable by the switch target to generate an output signal when the cable being overloaded due to a load on the platform.

Feature K. The lift of Embodiment A, wherein the platform movement control device comprises:

a first arm, the first arm having a first end, a second end spaced apart from the first end along a length of the first arm, a first elongated slot through a thickness of the first arm between the first and second ends, a length of the first elongated slot aligned normal to the length of the first arm;

a first connection, the first connection being between the first end and a vertically disposed wall of a stationary control enclosure, the first connection configured to allow a pivotal movement of the first arm about the vertically disposed wall, the first connection comprising a first aperture through the thickness of the first arm adjacent the first end thereof, a second aperture though a thickness of the vertically disposed wall and a fastener passing through the first and second apertures;

a second arm, the second arm having a first end, a second end spaced apart from the first end of the second arm along a length of the second arm, a spring seat upstanding on a first edge of the second arm adjacent the first end of the second arm, a first edge notch in the second arm between the first and second ends, the first edge notch sized and shaped to allow access to the first elongated slot during operation of the platform movement control device, a second edge notch in the second edge of the second arm and a taper in the second end of the second arm, the taper and the second notch defining a hook-shaped portion of the second arm;

a second connection, the second connection being between the first arm and the second arm so that the second arm pivots with the first arm, the second connection configured to move the second arm along a length of the first arm, the second connection comprising two third apertures through the thickness of the first arm between the first and second ends thereof, two second elongated slots through a thickness of the second arm between the first and second ends, a length of each second elongated slot aligned along the length of the first arm, each second elongated slot is aligned, during use, with a respective third aperture in the first arm, and fasteners fastening the second arm to the first arm at each second elongated slot aligned with the respective third aperture;

an actuator, the actuator having a stationary portion affixed to the vertically disposed wall and a movable portion disposed for a linear movement in a vertical direction;

a third connection, the third connection being between a free end of the movable portion and the first end of the first arm, the third connection comprising a link pivotally coupled to the free end of the movable portion and to a flange on the first end of the first arm; and a tension spring, the tension spring having a first end attached to a spring seat on the second arm and having an opposite second end attached to a spring seat on the vertically disposed wall;

the actuator, when energized during the operation of the platform movement control device, moves the movable portion in an upward direction and pivots the first arm and the second arm, at the first connection about the vertically disposed wall in the upward direction, into an unlock position;

the tension spring configured to pivot the first arm and the second arm in a downward direction into a lock position when the actuator is deenergized;

the hook-shaped portion selectively engages, during the operation, a target on a platform in the lock position and disengages the target in the unlock position;

the platform being prevented from a movement when the hook-shaped portion selectively engages the target.

Feature L. The lift of Embodiment A, wherein the platform movement control device comprises:

an actuator comprising a movable portion being configured to move in a vertical direction;

a first arm, the first arm mounted in a pivotal connection with each of the actuator and a stationary member;

a second arm with a hook-shaped portion, the second arm being fastened to the first arm, the second arm configured to move linearly along a length of the first arm and to pivot with the first arm; and a spring, the spring connected to each of the second arm and the stationary member;

the actuator operable to pivot the first and second arms upwardly into an unlock position;

the spring operable to pivot the first and second arms downwardly into a lock position;

the hook-shaped portion selectively engages, during an operation of a platform, a target on a platform in the lock position and disengages the target in the unlock position;

the platform being prevented from a movement when the hook-shaped portion selectively engages the target.

Feature M. The lift of Feature L, wherein the platform movement control device being attached to a control enclosure in the lift.

Feature N. The lift of Embodiment A, further comprising an electrical power connector, the electrical power connector defining an encapsulated decouplable power interface between a control enclosure and an external source of electric energy.

Feature P. The lift of Embodiment A, further comprising a light assembly, the light assembly being mounted on the platform.

Feature R. The lift of Feature P, wherein the light assembly comprises:

a housing, the housing comprises, during operation of the light assembly, a bottom cavity along a length of the housing, a hollow interior and two side grooves along the length of the housing, each side groove from the two side grooves being disposed within one side surface of the housing;

two light emitting diode (LED) strips, each LED strip being sized and shaped to fit into a respective side groove, the two LED strips coupled to a source of electric power during operation of the light assembly to illuminate both sides of the housing;

a load bearing ground contact; and two ends caps, each end cap having an abutment sized and shaped to fit into the hollow interior, each end cap terminating a respective end of the housing.

Embodiment B. A method of controlling a movement of a platform with a bridgeplate in a vehicle lift, the method comprises:

generating, with two first acoustic sensors, a first detection plume over a transfer bridgeplate area when the platform is at a vehicle floor level position;

generating, with two second acoustic sensors, a second detection plume over a vehicle door threshold area when the platform is at the vehicle floor level position;

receiving, at a controller, a signal being responsive to one of the first detection plume and the second detection plume being interrupted; and at least preventing, with a controller in a response to the signal, a movement of the platform from the vehicle floor level position toward a deployed ground level position.

Feature A. The method of Embodiment B, further comprising selectively actuating and deactuating the two first acoustic sensors and the two second acoustic sensors with a potentiometer operable to incrementally provide signals based on resistance associated with positions of the platform between a stowed position and below the vehicle floor level position.

Feature B. The method of Embodiment B, wherein the selectively actuating and deactuating the two first acoustic sensors and the two second acoustic sensors comprises operating the potentiometer with a pivot in a parallelogram mechanism in the lift, the parallelogram mechanism configured to at least move the platform between the vehicle floor level position and a deployed ground level position.

Feature C. The method of Embodiment B, wherein the generating the first detection plume comprises orienting each first sensor from the two first sensors with a collar, the collar receiving each first sensor therewithin.

Feature D. The method of Embodiment B, wherein the generating the second detection plume comprises orienting each second sensor from the two second sensors with a collar, the collar receiving each second sensor therewithin.

Embodiment C. A method of controlling a movement of a platform with a bridgeplate in a vehicle lift, the method comprises:

generating, with two acoustic sensors, a detection plume over one of a transfer bridgeplate area and vehicle door threshold area when the platform is at a vehicle floor level position;

receiving, at a controller, a signal being responsive to o the first detection plume being interrupted; and at least preventing, with a controller in a response to the signal, a movement of the platform from the vehicle floor level position toward a deployed ground level position.

Embodiment D. A method of controlling operation of a movable platform within a lift mountable in a vehicle, the method comprising the steps of:

mounting a pair of first sensors in a position to monitor a transfer bridging plate area when the lift platform is at a vehicle floor level position;

mounting a pair of second sensors in a position to monitor vehicle door threshold area while the lift platform is at the vehicle floor level position; and interlocking the pairs of first and second sensors with a controller for the lift or for the vehicle so as to prevent operation of the lift platform when the lift platform is being occupied.

Feature A. The method of Embodiment D, wherein each sensor from the pairs of first and second sensors comprises:

a piezoelectric, ultrasonic device capable of creating a detection volume; and a focusing collar receiving the piezoelectric, ultrasonic device.

Embodiment E. A platform lock, comprising:

a first arm, the first arm having a first end, a second end spaced apart from the first end along a length of the first arm, a first elongated slot through a thickness of the first arm between the first and second ends, a length of the first elongated slot aligned normal to the length of the first arm;

a first connection, the first connection being between the first end and a vertically disposed wall of a stationary lift control enclosure, the first connection configured to allow a pivotal movement of the first arm about the vertically disposed wall, the first connection comprising a first aperture through the thickness of the first arm adjacent the first end thereof, a second aperture though a thickness of the vertically disposed wall and a fastener passing through the first and second apertures;

a second arm, the second arm having a first end, a second end spaced apart from the first end of the second arm along a length of the second arm, a spring seat upstanding on a first edge of the second arm adjacent the first end of the second arm, a first edge notch in the second arm between the first and second ends, the first edge notch sized and shaped to allow access to the first elongated slot during operation of the platform lock, a second edge notch in the second edge of the second arm and a taper in the second end of the second arm, the taper and the second edge notch defining a hook-shaped portion of the second arm;

a second connection, the second connection being between the first arm and the second arm so that the second arm pivots with the first arm, the second connection configured to move the second arm along a length of the first arm, the second connection comprising two third apertures through the thickness of the first arm between the first and second ends thereof, two second elongated slots through a thickness of the second arm between the first and second ends, a length of each second elongated slot aligned along the length of the first arm, each second elongated slot is aligned, during use, with a respective third aperture in the first arm, and fasteners fastening the second arm to the first arm at each second elongated slot aligned with the respective third aperture;

an actuator, the actuator having a stationary portion affixed to the vertically disposed wall and a movable portion disposed for a linear movement in a vertical direction;

a third connection, the third connection being between a free end of the movable portion and the first end of the first arm, the third connection comprising a link pivotally coupled to the free end of the movable portion and to a flange on the first end of the first arm; and a tension spring, the tension spring having a first end attached to a spring seat on the second arm and having an opposite second end attached to a spring seat on the vertically disposed wall;

the actuator, when energized during the operation of the platform lock, moves the movable portion in an upward direction and pivots the first arm and the second arm, at the first connection about the vertically disposed wall in the upward direction, into an unlock position;

the tension spring configured to pivot the first arm and the second arm in a downward direction into a lock position when the actuator is deenergized;

the hook-shaped portion selectively engages, during the operation, a target on a platform in the lock position and disengages the target in the unlock position;

the platform being prevented from a movement when the hook-shaped portion selectively engages the target.

Embodiment F. A platform lock for a lift in a vehicle, the platform lock comprising:

an actuator comprising a movable portion being configured to move in a vertical direction;

a first arm, the first arm mounted in a pivotal connection with each of the actuator and a stationary member;

a second arm with a hook-shaped portion, the second arm being fastened to the first arm, the second arm configured to move linearly along a length of the first arm and to pivot with the first arm; and a spring, the spring connected to each of the second arm and the stationary member;

the actuator operable to pivot the first and second arms upwardly into an unlock position;

the spring operable to pivot the first and second arms downwardly into a lock position;

the hook-shaped portion selectively engages, during an operation of a platform, a target on a platform in the lock position and disengages the target in the unlock position;

the platform being prevented from a movement when the hook-shaped portion selectively engages the target.

Feature A. The platform lock of Embodiment F, wherein the stationary member comprises a vertically disposed exterior wall surface in a control enclosure, the control enclosure containing hydraulic components which are configured to move the platform between stow and deployed positions, the actuator is being mounted to the vertically disposed exterior wall surface.

Embodiment G. A platform lock for a lift in a vehicle, the platform lock comprising:

a first arm, the first arm having a first end, a second end spaced apart from the first end along a length of the first arm, a first elongated slot through a thickness of the first arm between the first and second ends, a length of the first elongated slot aligned normal to the length of the first arm;

a first connection, the first connection being between the first end and a vertically disposed wall of a stationary control enclosure, the first connection configured to allow a pivotal movement of the first arm about the vertically disposed wall, the first connection comprising a first aperture through the thickness of the first arm adjacent the first end thereof, a second aperture though a thickness of the vertically disposed wall and a fastener passing through the first and second apertures;

a second arm, the second arm having a first end, a second end spaced apart from the first end of the second arm along a length of the second arm, a spring seat upstanding on a first edge of the second arm adjacent the first end of the second arm, a first edge notch in the second arm between the first and second ends, the first edge notch sized and shaped to allow access to the first elongated slot during operation of the platform lock, a second edge notch in the second edge of the second arm and a taper in the second end of the second arm, the taper and the second notch defining a hook-shaped portion of the second arm;

a second connection, the second connection being between the first arm and the second arm so that the second arm pivots with the first arm, the second connection configured to move the second arm along a length of the first arm, the second connection comprising two third apertures through the thickness of the first arm between the first and second ends thereof, two second elongated slots through a thickness of the second arm between the first and second ends, a length of each second elongated slot aligned along the length of the first arm, each second elongated slot is aligned, during use, with a respective third aperture in the first arm, and fasteners fastening the second arm to the first arm at each second elongated slot aligned with the respective third aperture;

an actuator, the actuator having a stationary portion affixed to the vertically disposed wall and a movable portion disposed for a linear movement in a vertical direction;

a third connection, the third connection being between a free end of the movable portion and the first end of the first arm, the third connection comprising a link pivotally coupled to the free end of the movable portion and to a flange on the first end of the first arm; and a tension spring, the tension spring having a first end attached to a spring seat on the second arm and having an opposite second end attached to a spring seat on the vertically disposed wall;

the actuator, when energized during the operation of the platform lock, moves the movable portion in an upward direction and pivots the first arm and the second arm, at the first connection about the vertically disposed wall in the upward direction, into an unlock position;

the tension spring configured to pivot the first arm and the second arm in a downward direction into a lock position when the actuator is deenergized;

the hook-shaped portion selectively engages, during the operation, a target on a platform in the lock position and disengages the target in the unlock position;

the platform being prevented from a movement when the hook-shaped portion selectively engages the target.

Embodiment H. A lift for a vehicle, the lift comprising:
a platform configured to support a person thereon;
a bridgeplate pivotally mounted on one end of the platform for a movement between two terminal positions;
a prime moving system comprising at least a four-bar linkage mechanism, a cylinder and a hydraulic pump, the prime moving system operable to move the platform between a stowed position and a deployed position and to move the bridgeplate between the two terminal positions;
a controller configured to receive inputs and provide outputs necessary to move the platform between the stowed position and deployed positions, the controller comprises a control enclosure, the hydraulic pump being disposed within the control enclosure;
a retention apparatus; and
a stow lock assembly integrated into the control enclosure, the stow lock assembly configured to hold the platform in its stowed position when the prime moving system slips over time while the platform is stowed, the stow lock assembly comprising:
an arm,
a pivotal connection between the arm and an exterior wall surface of the control enclosure,
a hook on the arm, the hook is accessible for service when the platform is at ground level, the hook comprising an angled edge surface on a front of the hook that enables the system to be self-locking when the platform is being stowed, the angled edge surface is configured such that when the hook contacts a target on the platform, the hook is forced upward as the platform reaches its stowed position,
a lock actuator mounted on an interior wall surface of the control enclosure,
a pivotal connection between a movable portion of the lock actuator and the arm, and
a tension spring having one end connected to the arm and having another end connected to the exterior wall surface of the control enclosure;
the lock actuator operable to move the hook, in an upward direction, into an unlock position to disengage the target;
the spring configured to return the hook, in a downward direction, into a locked position.

Embodiment K. A stow lock assembly integrateable into a control enclosure in a lift for a vehicle, the stow lock assembly configured to hold a platform in its stowed position when a prime moving system in the lift slips over time while the platform is stowed, the stow lock assembly comprising:
an arm in a pivoting connection with a rear part of the control enclosure;
a pivotal connection between the arm and an exterior wall surface of the control enclosure;
a hook on the arm, the hook is accessible for service when the platform is at ground level, the hook comprising an angled edge surface on a front of the hook that enables the system to be self-locking when the platform is being stowed, the angled edge surface is configured such that when the hook contacts a target on the platform, the hook is forced upward as the platform reaches its stowed position;
a lock actuator mounted on an interior wall surface of the control enclosure,
a pivotal connection between a movable portion of the lock actuator and the arm, and
a tension spring having one end connected to the arm and having another end connected to the exterior wall surface of the control enclosure;
the lock actuator operable to move the hook, in an upward direction, into an unlock position to disengage the target;
the tension spring configured to return the hook, in a downward direction, into a locked position.

Embodiment L. A lift for a vehicle, the lift comprising:
a platform comprising a surface and two side barriers;
a bridgeplate pivotally mounted on one end of the platform for a movement between two terminal positions
a prime moving system comprising at least a four-bar linkage mechanism, a cylinder and a hydraulic pump, the prime moving system operable to move the platform between a stowed position and a deployed position and to move the bridgeplate between the two terminal positions;
a controller configured to receive inputs and provide outputs necessary to move the platform between the stowed position and deployed positions, the controller comprises a control enclosure, the hydraulic pump being disposed within the control enclosure;
an acoustic sensor array, comprising:
two first sensors, each of the two first sensors mountable to a respective lower arm in the four-bar linkage mechanism, the two first sensors configured to monitor a transfer bridging plate area when the platform is at a vehicle floor level position, and
two second sensors, each of the two second sensors mountable, when installed on the vehicle, rearward of the two first sensors, the two second sensors configured to monitor vehicle door threshold area while the platform is at the vehicle floor level position, each sensor from the two first sensors and two second sensors comprising a piezoelectric, ultrasonic device capable of creating a detection volume in front of each sensor, and a collar mounting each sensor so that each sensor is oriented to generate a first detection plume between the two first sensors and a second detection plume between the two second sensors; and a potentiometer being mounted on one lower arm in the four-bar linkage mechanism, the potentiometer being actuable by a pivot connecting the cylinder to the one lower arm, the potentiometer configured to incrementally provide signals associated with positions of the platform between the floor vehicle level position and a deployed ground level position;

the controller being responsive to the signals to prevent operation of the platform being occupied.

Embodiment M. A lift for a vehicle, the lift comprising:
a platform comprising a surface and two side barriers;
a bridgeplate pivotally mounted on one end of the platform for a movement between two terminal positions
a prime moving system comprising at least a four-bar linkage mechanism, a cylinder and a hydraulic pump, the prime moving system operable to move the platform between a stowed position and a deployed position and to move the bridgeplate between the two terminal positions;
a controller configured to receive inputs and provide outputs necessary to move the platform between the stowed position and deployed positions, the controller comprises a control enclosure, the hydraulic pump being disposed within the control enclosure; and
a replaceable load bearing ground contact device that contacts a ground ahead of a lower extremity of a vertical arm in the four-bar linkage mechanism and at least reduces a contact between the lower extremity of the vertical arm with the ground, the replaceable load bearing ground contact device comprises molded plastic material, the load bearing ground contact device is configured to be attached to the lower extremity with a single fastener.

Embodiment L. A lift, comprising:
a platform comprising a surface and two side barriers;
a bridgeplate at a rear of the platform;
a prime moving system comprising at least a four-bar linkage mechanism and a cylinder, the prime moving system operable to move the platform between a stowed position and a deployed position;
a controller configured to receive inputs and provide outputs necessary to move the platform between the stowed position and the deployed position, the controller comprises a control enclosure; and
a lock, the lock configured to lock the bridgeplate in a generally vertical barrier position, the lock comprising:
 a cam-shaped edge surface on each end of the bridgeplate;
 two arms, each arm being pivotally mounted at a rear of the platform and being spring loaded for a downward bias such that in a default state the platform can be disposed generally horizontally in a bridging position, the two arms being rigidly connected therebetween so that the two arms substantially rotate in unison with each other, the two arms being in a contact with the platform;
 two cables, each cable from the two cables having one end connected to a respective arm and having an opposite end connected to a lower arm of a platform moving mechanism; and
 a cam operated mechanism, the cam operated mechanism configured to pull the cable as the platform is being lowered, through the platform moving mechanism, from a floor level position;
 each cable configured to pull against a respective arm, as the platform is being lowered from the floor level position and raising the respective arm against the cam-shaped edge surface into a generally vertical barrier position.

Embodiment M. A lock for a lift with a platform and a bridgeplate, comprising:
a cam-shaped edge surface on each end of the bridgeplate;
two arms, each arm being pivotally mounted at a rear of the platform and being spring loaded for a downward bias such that in a default state the platform can be disposed generally horizontally in a bridging position, the two arms being rigidly connected therebetween so that the two arms substantially rotate in unison with each other, the two arms being in a contact with the platform;
two cables, each cable from the two cables having one end connected to a respective arm and having an opposite end connected to a lower arm of a platform moving mechanism; and
a cam operated mechanism, the cam operated mechanism configured to pull the cable as the platform is being lowered, through the platform moving mechanism, from a floor level position;
each cable configured to pull against a respective arm, as the platform is being lowered from the floor level position and raising the respective arm against the cam-shaped edge surface into a generally vertical barrier position.

Embodiment N. A light assembly, comprising:
a housing, the housing comprises, during operation of the light assembly, a bottom cavity along a length of the housing, a hollow interior and two side grooves along the length of the housing, each side groove from the two side grooves being disposed within one side surface of the housing;
two light emitting diode (LED) strips, each LED strip being sized and shaped to fit into a respective side groove, the two LED strips coupled to a source of electric power during operation of the light assembly to illuminate both sides of the housing;
a load bearing ground contact; and
two ends caps, each end cap having an abutment sized and shaped to fit into the hollow interior, each end cap terminating a respective end of the housing.

Embodiment R. A lift for a vehicle, the lift comprising:
a lift platform comprising a surface and two side barriers;
a bridgeplate pivotally mounted on one end of the lift platform for a movement between two terminal positions
a prime moving system comprising at least a four-bar linkage mechanism, a cylinder and a hydraulic pump, the prime moving system operable to move the lift platform between a stowed position and a deployed position and to move the bridgeplate between the two terminal positions;
a controller configured to receive inputs and provide outputs necessary to move the lift platform between the stowed position and deployed positions, the controller comprises a control enclosure, the hydraulic pump being disposed within the control enclosure;
light assemblies, each light assembly comprising:
a housing, the housing comprises, during operation of each light assembly, a bottom cavity along a length of the housing, the bottom cavity configured to interface with a top edge of a side barrier, a hollow interior and two side grooves along the length of the housing, each side groove from the two side grooves being disposed within one side surface of the housing, two light emitting diode (LED) strips, each LED strip being sized and shaped to fit into a respective side groove, the two LED strips coupled to a source of electric power during operation of the light assembly to illuminate both sides of the housing, a load bearing ground contact, and two ends caps, each end cap having an abutment sized and shaped to fit into the hollow interior, each end cap terminating a respective end of the housing;

each light assembly configured to illuminate an interior and an exterior of the lift platform during operation of the lift.

Embodiment S. A method of controlling operation of a vehicle lift with a movable lift platform having an occupant supporting surface and two side barriers, the method comprising the steps of:

mounting a light assembly on a top edge of one side barrier of the lift platform; and actuating the light assembly to emit light visible external to the lift platform when the lift platform is being lowered or raised external to a vehicle.

Feature A. The method of Embodiment S, wherein the step of mounting the light assembly comprises a step of mounting two light emitting members along opposite sides of the light assembly.

Feature B. The method of Embodiment S, wherein the step of mounting the light assembly comprises a step of mounting another light assembly on another side barrier and the step of actuating both light assemblies to emit light visible external to both sides of the lift platform when the lift platform is being lowered or raised external to a vehicle.

Feature C. The method of Feature B, further comprising a step of configuring each light assembly to emit light of a different color.

Embodiment T. A method of controlling operation of a vehicle lift with a movable platform having an occupant supporting surface and two side barriers, the method comprising:

mounting one or more light members on both barriers of the lift platform in a position to emit light visible external to the lift platform; and actuating the one or more light members to emit the light when the lift platform is at least one of being deployed at a ground, in a process of being lowered toward the ground and in a process of being raised toward a stowed position within a vehicle.

Embodiment U. A method of controlling operation of a movable platform within a lift mountable in a vehicle, the method comprising the steps of:

providing a cam-shaped edge surface on each end of a bridgeplate;

two arms, each arm being pivotally mounted at a rear of the platform and being spring loaded for a downward bias such that in a default state the platform can be disposed generally horizontally in a bridging position, the two arms being rigidly connected therebetween so that the two arms substantially rotate in unison with each other, the two arms being in a contact with the platform;

two cables, each cable from the two cables having one end connected to a respective arm and having an opposite end connected to a lower arm of a platform moving mechanism; and a cam operated mechanism, the cam operated mechanism configured to pull the cable as the platform is being lowered, through the platform moving mechanism, from a floor level position;

each cable configured to pull against a respective arm, as the platform is being lowered from the floor level position and raising the respective arm against the cam-shaped edge surface into a generally vertical barrier position.

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described exemplary embodiments of the disclosure may be made by those skilled in the art without departing from the spirit and scope of the disclosure as set forth in the appended claims.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Furthermore, the Abstract is not intended to be limiting as to the scope of the claimed subject matter and is for the purpose of quickly determining the nature of the claimed subject matter.

What is claimed is:

1. A lift for a vehicle, said lift comprising:

a platform configured to support an occupant thereon;

a parallelogram mechanism to move said platform between a stowed position and a deployed position, said parallelogram mechanism comprising two lower arms, two upper arms, two vertical arms and two cylinders, each cylinder is in a first pivotal connection between a stationary end of said each cylinder and a respective lower arm and in a second pivotal connection between a movable end of said each cylinder and a respective upper arm;

a base to mount said parallelogram mechanism to a vehicle floor, each lower arm is in a pivotal connection with each of said base and a respective vertical arm, each upper arm is in a pivotal connection with each of said base and said respective vertical arm;

a hydraulic system to move said platform through said parallelogram mechanism;

an occupant retention apparatus;

a bridgeplate mounted at one end of said platform for a movement between two terminal positions;

a controller; and a platform movement control device, comprising:

two acoustic sensors, each acoustic sensor from said two acoustic sensors comprising a piezoelectric, ultrasonic device, said two acoustic sensors mounted and operable to generate a detection plume over one of a transfer bridgeplate area and a vehicle door threshold area when said platform is at a vehicle floor level position, two collars, each collar mounting a respective acoustic sensor to generate said detection plume between said two acoustic sensors during operation of said lift, and a potentiometer being mounted on one lower arm in said parallelogram mechanism, said potentiometer being actuatable by a pivot connecting a cylinder in said parallelogram mechanism to said one lower arm, said potentiometer incrementally providing, due to a rotation of said pivot during said operation of said lift, signals associated with incremental positions of said platform based on resistance values, said two acoustic sensors generating a control signal when said detection plume is being interrupted, said controller being responsive to said signals from said potentiometer to selectively activate and deactivate said two acoustic sensors, said controller being further responsive to said control signal from said two acoustic sensors to prevent a movement of said platform when said detection plume is being interrupted.

2. The lift of claim 1, further comprising a light assembly, said light assembly being mounted on a side barrier of said platform.

3. The lift of claim 2, wherein said light assembly comprises:
a housing, said housing comprises, during operation of said light assembly, a bottom cavity along a length of said housing, a hollow interior and two side grooves along said length of said housing, each side groove from said two side grooves being disposed within one side surface of said housing;
two light emitting diode (LED) strips, each LED strip being sized and shaped to fit into a respective side groove, said two LED strips coupled to a source of electric power during operation of said light assembly to illuminate both sides of said housing;
a load bearing ground contact; and
two ends caps, each end cap having an abutment sized and shaped to fit said hollow interior, said each end cap terminating a respective end of said housing.

4. The lift of claim 1, wherein said two acoustic sensors are operable to generate said detection plume over said transfer bridgeplate area.

5. The lift of claim 1, wherein said two acoustic sensors are operable to generate said detection plume over said vehicle door threshold area.

6. The lift of claim 1, wherein said platform movement control device further comprises:
a flange on each end of said bridgeplate, said flange having two ends, an edge abutment disposed on one end, and an edge surface between said two ends, said edge surface having a convex edge surface portion and a concave edge surface portion disposed between said convex edge surface portion and said edge abutment, said edge abutment extending outwardly from said convex edge surface portion;
a first pivotal connection between another end of said flange and said one end of said platform;
two first arms, each first arm being disposed adjacent a respective flange and having an arc shaped defining two ends;
a second pivotal connection between one end of said each first arm and said one end of said platform;
a rod rigidly connecting opposite ends of said two first arms;
two bearings, each bearing is mounted on said rod for a rotation thereabout and is being disposed adjacent a respective first arm, said each bearing contacts a convex surface of a respective flange during operation of said lift;
two second arms, each second arm is mounted stationary on one end of said base, said each second arm comprises an upwardly disposed straight edge surface portion, an upwardly disposed concave edge surface portion and a generally vertically disposed riser, said riser connecting said upwardly disposed straight edge surface portion with said upwardly disposed concave edge surface portion;
an extension on each lower arm in said parallelogram mechanism, said extension extending outwardly from a pivotal connection between said each lower arm and said stationary end of said each cylinder;
two movable links, each movable link comprising a Z-shaped body, a roller mounted for a rotation on one end of said link, a sheave mounted on an opposite end of said movable link, and a third pivotal connection between a respective extension and said sheave mediate ends thereof;
two tension devices, each tension device is mounted within a respective lower arm, said each tension device comprising a spring;
two cable spools, each cable spool mounted within said respective lower arm adjacent a respective tension device; and
two cables spaced apart with each other about a width of said platform, each cable having one end thereof affixed to a respective first arm and having another end thereof affixed to a respective tension device, said each cable being wrapped around each of said sheave, said cable spool, said pivotal connection between said lower arm and said vertical arm, a sheave on said respective second arm and sheaves on said platform;
each movable link moving upwardly on a respective second arm and outwardly from said one end of said platform when said parallelogram mechanism moves said platform from said stowed position toward said deployed position;
said each cable, rotates a respective first arm in a first direction and extends a respective spring, in a response to an upward and outward movement of a respective movable link;
said respective first arm, when rotating in said first direction, causes, through a respective flange, a rotation of said bridgeplate into a generally vertical barrier position;
said each movable link moving downwardly on a respective second arm and inwardly toward said one end of said platform when said parallelogram mechanism moves said platform from said deployed position toward said stowed position and when a respective spring compresses and returns to an original position;
said each cable, rotates a respective first arm in a second direction, in a response to a downward and inward movement of said respective movable link;
said respective first arm, when rotating in said second direction, causes, through a respective flange, a rotation of said bridgeplate into a generally horizontal bridging position.

7. The lift of claim 1, wherein said platform movement control device further comprises:
- a cam-shaped edge surface on each end of the bridgeplate;
- two arms, each arm from said two arms being pivotally mounted at a rear of said platform, said two arms being rigidly connected therebetween so that said two arms substantially rotate in unison with each other, said two arms being in a contact with the platform;
- two cables, each cable from said two cables having one end connected to a respective arm and having an opposite end connected to a lower arm of a platform moving mechanism; and
- a cam operated mechanism, said cam operated mechanism configured to pull said cable as the platform is being lowered, through the platform moving mechanism, from a floor level position;
- said each cable configured to pull against a respective arm, as the platform is being lowered from the floor level position and raising said respective arm against said cam-shaped edge surface into a generally vertical barrier position.

8. The lift of claim 7, wherein said cam operated mechanism comprises:
- two other arms, each other arm is mounted stationary on one end of said base, said each other arm comprises another cam-shaped edge surface having an upwardly disposed straight edge surface portion, an upwardly disposed concave edge surface portion and a generally vertically disposed riser, said riser connecting said upwardly disposed straight edge surface portion with said upwardly disposed concave edge surface portion;
- an extension on each lower arm in said parallelogram mechanism, said extension extending outwardly from a pivotal connection between said each lower arm and said stationary end of said each cylinder; and
- two movable links, each movable link comprising a Z-shaped body, a roller mounted for a rotation on one end of said link, a sheave mounted on an opposite end of said movable link, and a third pivotal connection between a respective extension and said sheave mediate ends thereof;
- said roller rotating, during operation, on said another cam-shaped edge surface.

9. The lift of claim 7, wherein said platform movement control device further comprises a tension overload annunciation device installed within one lower arm, said tension overload annunciation device comprises:
- a hollow housing deposed for a movement within said one lower arm, said hollow housing having a connection with one end of a respective cable;
- a spring, said spring being seated, at one end, on a pivot between said one lower arm and a respective vertical arm, said spring resting against an exterior wall surface of said hollow housing;
- a switch mounted stationary within said one lower arm and within said hollow housing, said switch being independent from said movement of said hollow housing; and
- a switch target being mounted with said hollow housing for said movement therewith;
- said switch operable by said switch target to generate an output signal when said cable being overloaded due to a load on said platform.

10. The lift of claim 1, wherein said platform movement control device comprises:
- a first arm, said first arm having a first end, a second end spaced apart from said first end along a length of said first arm, a first elongated slot through a thickness of said first arm between said first and second ends, a length of said first elongated slot aligned normal to said length of said first arm;
- a first connection, said first connection being between said first end and a vertically disposed wall of a stationary control enclosure, said first connection configured to allow a pivotal movement of said first arm about the vertically disposed wall, said first connection comprising a first aperture through said thickness of said first arm adjacent said first end thereof, a second aperture though a thickness of the vertically disposed wall and a fastener passing through said first and second apertures;
- a second arm, said second arm having a first end, a second end spaced apart from said first end of said second arm along a length of said second arm, a spring seat upstanding on a first edge of said second arm adjacent said first end of said second arm, a first edge notch in said second arm between said first and second ends, said first edge notch sized and shaped to allow access to said first elongated slot during operation of the platform movement control device, a second edge notch in said second edge of said second arm and a taper in said second end of said second arm, said taper and said second notch defining a hook-shaped portion of said second arm;
- a second connection, said second connection being between said first arm and said second arm so that said second arm pivots with said first arm, said second connection configured to move said second arm along a length of said first arm, said second connection comprising two third apertures through said thickness of said first arm between said first and second ends thereof, two second elongated slots through a thickness of said second arm between said first and second ends, a length of each second elongated slot aligned along said length of said first arm, each second elongated slot is aligned, during use, with a respective third aperture in said first arm, and fasteners fastening said second arm to said first arm at said each second elongated slot aligned with said respective third aperture;
- an actuator, said actuator having a stationary portion affixed to the vertically disposed wall and a movable portion disposed for a linear movement in a vertical direction;
- a third connection, said third connection being between a free end of said movable portion and said first end of said first arm, said third connection comprising a link pivotally coupled to said free end of said movable portion and to a flange on said first end of said first arm; and
- a tension spring, said tension spring having a first end attached to a spring seat on said second arm and having an opposite second end attached to a spring seat on the vertically disposed wall;
- said actuator, when energized during said operation of said platform movement control device, moves said movable portion in an upward direction and pivots said first arm and said second arm, at said first connection about the vertically disposed wall in said upward direction, into an unlock position;
- said tension spring configured to pivot said first arm and said second arm in a downward direction into a lock position when said actuator is deenergized;

said hook-shaped portion selectively engages, during said operation, a target on a platform in said lock position and disengages the target in said unlock position;

said platform being prevented from a movement when said hook-shaped portion selectively engages said target.

11. The lift of claim 1, wherein said platform movement control device further comprises:

an actuator comprising a movable portion being configured to move in a vertical direction;

a first arm, said first arm mounted in a pivotal connection with each of said actuator and a stationary member;

a second arm with a hook-shaped portion, said second arm being fastened to said first arm, said second arm configured to move linearly along a length of said first arm and to pivot with said first arm; and a spring, said spring connected to each of said second arm and the stationary member;

said actuator operable to pivot said first and second arms upwardly into an unlock position;

said spring operable to pivot said first and second arms downwardly into a lock position;

said hook-shaped portion selectively engages, during an operation of a platform, a target on said platform in said lock position and disengages the target in said unlock position;

said platform being prevented from a movement when said hook-shaped portion selectively engages said target.

12. The lift of claim 11, wherein said platform movement control device being attached to a control enclosure in said lift.

13. The lift of claim 1, further comprising an electrical power connector, said electrical power connector defining an encapsulated decouplable power interface between a control enclosure and an external source of electric energy.

14. A platform movement control device for a vehicle lift comprising a platform configured to support an occupant thereon, a parallelogram mechanism and a hydraulic system to move the platform between a stowed position and a deployed position, a base to mount the parallelogram mechanism to a vehicle floor, a bridgeplate mounted at one end of the platform, and a controller, said platform movement control device comprising:

two acoustic sensors, each acoustic sensor from said two acoustic sensors comprising a piezoelectric, ultrasonic device, said two acoustic sensors operable, when installed in the vehicle lift, to generate a detection plume between said two acoustic sensors during operation of the vehicle lift and over one of a transfer bridgeplate area and a vehicle door threshold area when the platform is at a vehicle floor level position;

two collars, each collar mounting a respective acoustic sensor to one end of the base; and a potentiometer being mounted on one lower arm in the parallelogram mechanism, said potentiometer being actuatable by a pivot connecting a cylinder in the parallelogram mechanism to the one lower arm, said potentiometer incrementally providing, due to a rotation of the pivot during the operation of the vehicle lift, signals associated with incremental positions of the platform based on resistance values;

said two acoustic sensors generating a control signal when said detection plume is being interrupted;

said two acoustic sensors being selectively activated and deactivated with the controller being responsive to said signals from said potentiometer;

the controller being further responsive to said control signal from said two acoustic sensors to prevent a movement of the platform when said detection plume is being interrupted.

15. A platform movement control device for a vehicle lift comprising a platform configured to support an occupant thereon, a parallelogram mechanism and a hydraulic system to move the platform between a stowed position and a deployed position, a base to mount the parallelogram mechanism to a vehicle floor, a bridgeplate mounted at one end of the platform, and a controller, said platform movement control device comprising:

two first sensors, each first sensor from said two first sensors mountable to a respective lower arm in said parallelogram mechanism, said two first sensors configured to generate a first detection plume over a transfer bridgeplate area when said platform is at a vehicle floor level position;

two second sensors, each second sensor from said two second sensors mountable, when installed on the vehicle, rearward of said two first sensors, said two second sensors configured to generate a second detection plume over vehicle door threshold area while said platform is at said vehicle floor level position;

collars, each collar mounting said each first sensor and said each second sensor; and a platform position sensor comprising a potentiometer being mounted on one lower arm in said parallelogram mechanism, said potentiometer being actuatable by a pivot connecting one cylinder to said one lower arm, said potentiometer configured to incrementally provide signals associated with positions of said platform based on resistance values;

each sensor from said two first sensors and said two second sensors comprising a piezoelectric, ultrasonic device capable of creating a detection volume in front of said each sensor during operation of said lift;

said two first sensors generating a first control signal when said first detection plume is being interrupted by an occupant within said transfer bridgeplate area;

said two second sensors generating a second control signal when said second detection plume is being interrupted by said occupant within said vehicle door threshold area;

said controller being responsive to said signals from said potentiometer to selectively activate and deactivate said two first sensors and said two second sensors;

said controller being responsive to one of said first and second control signals to prevent a movement of said platform.

16. A method of controlling a movement of a platform with a bridgeplate in a vehicle lift, said method comprises:

generating, with two first acoustic sensors, a first detection plume over a transfer bridgeplate area when said platform is at a vehicle floor level position;

generating, with two second acoustic sensors, a second detection plume over a vehicle door threshold area when said platform is at said vehicle floor level position;

receiving, at a controller, a signal being responsive to one of said first detection plume and said second detection plume being interrupted; and preventing, with said controller in a response to said signal, a movement of said platform from said vehicle floor level position toward a ground level position.

17. The method of claim 16, further comprising selectively actuating and deactuating said two first acoustic sensors and said two second acoustic sensors with a potentiometer operable to incrementally provide signals based on resistance associated with positions of said platform between a stowed position and a position which is below said vehicle floor level position.

18. The method of claim 17, wherein said selectively actuating and deactuating said two first acoustic sensors and said two second acoustic sensors comprises operating said potentiometer with a pivot in a parallelogram mechanism in said lift, said parallelogram mechanism configured to at least move said platform between said vehicle floor level position and said ground level position.

19. The method of claim 16, wherein said generating said first detection plume comprises orienting each first sensor from said two first sensors with a collar, said collar receiving said each first sensor therewithin.

20. The method of claim 16, wherein said generating said second detection plume comprises orienting each second sensor from said two second sensors with a collar, said collar receiving said each second sensor therewithin.

* * * * *